US012457108B2

(12) United States Patent
Wilson et al.

(10) Patent No.: US 12,457,108 B2
(45) Date of Patent: *Oct. 28, 2025

(54) BLOCKCHAIN RECORDS WITH THIRD PARTY DIGITAL SIGNATURES AS A TRUST ELEMENT FOR HIGH-RISK DIGITAL CONTENT

(71) Applicant: Tenet 3, LLC, Dayton, OH (US)

(72) Inventors: Kelce S. Wilson, Murphy, TX (US);
Jeff A. Hughes, Dayton, OH (US);
Tyler J. Moody, Fairborn, OH (US);
Derek E. Doran, Hilliard, OH (US);
Gary R. Tuttle, Middletown, OH (US);
Joel B. Rieman, Xenia, OH (US)

(73) Assignee: Tenet 3, LLC, Dayton, OH (US)

(*) Notice: Subject to any disclaimer, the term of this patent is extended or adjusted under 35 U.S.C. 154(b) by 208 days.

This patent is subject to a terminal disclaimer.

(21) Appl. No.: 18/513,235

(22) Filed: Nov. 17, 2023

(65) Prior Publication Data

US 2024/0097907 A1    Mar. 21, 2024

Related U.S. Application Data

(63) Continuation of application No. 17/139,672, filed on Dec. 31, 2020, now Pat. No. 11,863,679.
(Continued)

(51) Int. Cl.
*G06F 21/64* (2013.01)
*H04L 9/32* (2006.01)
(Continued)

(52) U.S. Cl.
CPC ............ *H04L 9/3218* (2013.01); *G06F 21/64* (2013.01); *H04L 9/3239* (2013.01);
(Continued)

(58) Field of Classification Search
CPC ... H04L 9/3218; H04L 9/3239; H04L 9/3247; H04L 63/1483; H04L 9/50; H04L 9/3297; G06F 21/64; G06F 21/645
See application file for complete search history.

(56) References Cited

U.S. PATENT DOCUMENTS 4,074,066 A   2/1978  Ehrsam
4,309,569 A   1/1982  Merkle
(Continued)

OTHER PUBLICATIONS

Guardtime; Black Lantern Cybersecurity Platform; date unknown; printed on Jul. 31, 2016; 6 pages; available at: https://guardtime.com/cybersecurity-platform#ksi-service.
(Continued)

*Primary Examiner* — Lynn D Feild
*Assistant Examiner* — Vladimir I Gavrilenko
(74) *Attorney, Agent, or Firm* — Kelce Wilson

(57) ABSTRACT

A permissioned blockchain, using off-chain storage, provides advantages over blockchains that rely on consensus and/or store information within the blockchain. Advantages include enhanced viability, compactness, and the ability to register material with distribution limitations (e.g., military classified). Examples create an immutable public record of data signatures that confirm when data is intact, without distributing the data itself, so that widespread availability of the blockchain (beyond those privileged to see the data) advantageously increases the size of the community that is able to detect spoofing or forgery attempts. A permissioning entity limits submissions to manage blockchain growth, foreclosing problematic material that may risk long-term viability. Examples render blockchain operations resistant to advanced persistent threats (APTs), leverage digital signatures as additional trust elements for high-risk data, link records to track pedigree and enable identification of super-
(Continued)

seded (obsolete) data, and leverage out-of-band date proof to enable independent verification of integrity and no-later-than data-of-existence.

20 Claims, 30 Drawing Sheets

Related U.S. Application Data

(60) Provisional application No. 63/113,943, filed on Nov. 15, 2020, provisional application No. 63/070,363, filed on Aug. 26, 2020.

(51) Int. Cl.
*H04L 9/40* (2022.01)
*H04L 9/00* (2022.01)

(52) U.S. Cl.
CPC ........ *H04L 9/3247* (2013.01); *H04L 63/1483* (2013.01); *H04L 9/50* (2022.05)

(56) References Cited

U.S. PATENT DOCUMENTS

| | | | |
|---|---|---|---|
| 5,136,646 A | 8/1992 | Haber | |
| 5,136,647 A | 8/1992 | Haber | |
| 5,530,757 A | 6/1996 | Krawczyk | |
| 5,781,629 A | 7/1998 | Haber | |
| 5,832,502 A | 11/1998 | Durham | |
| 5,956,404 A | 9/1999 | Schneier | |
| 6,044,350 A | 3/2000 | Weiant | |
| 6,233,340 B1 | 5/2001 | Sandru | |
| 6,237,096 B1 | 5/2001 | Bisbee | |
| 6,285,999 B1 | 9/2001 | Page | |
| 6,321,339 B1 | 11/2001 | French | |
| 6,327,656 B2 | 12/2001 | Zabetian | |
| 6,381,696 B1 | 4/2002 | Doyle | |
| 6,549,624 B1 | 4/2003 | Sandru | |
| 6,584,565 B1 | 6/2003 | Zamek | |
| 6,792,110 B2 | 9/2004 | Sandru | |
| 6,799,176 B1 | 9/2004 | Page | |
| 7,058,628 B1 | 6/2006 | Page | |
| 7,203,838 B1 | 4/2007 | Glazer | |
| 7,269,587 B1 | 9/2007 | Page | |
| 8,903,839 B2 | 12/2014 | Wilson | |
| 9,679,276 B1 | 6/2017 | Cuende | |
| 9,754,131 B2 | 9/2017 | Wilson | |
| 10,826,685 B1 * | 11/2020 | Campagna | H04L 9/3247 |
| 11,394,538 B2 | 7/2022 | Ramirez | |
| 11,606,211 B2 * | 3/2023 | Liem | H04L 9/0643 |
| 11,863,679 B2 * | 1/2024 | Wilson | G06F 21/645 |
| 2001/0027450 A1 | 10/2001 | Shinoda | |
| 2002/0023220 A1 | 2/2002 | Kaplan | |
| 2002/0169971 A1 | 11/2002 | Asano | |
| 2003/0023847 A1 | 1/2003 | Ishibashi | |
| 2003/0028774 A1 | 2/2003 | Meka | |
| 2003/0130032 A1 | 7/2003 | Martinek | |
| 2003/0145206 A1 | 7/2003 | Wolosewicz | |
| 2003/0163686 A1 | 8/2003 | Ward | |
| 2004/0080777 A1 | 4/2004 | Smith | |
| 2004/0093493 A1 | 5/2004 | Bisbee | |
| 2004/0230572 A1 | 11/2004 | Omoigui | |
| 2004/0236761 A1 | 11/2004 | Both | |
| 2005/0149739 A1 | 7/2005 | Hopkins | |
| 2005/0283442 A1 | 12/2005 | Powell | |
| 2006/0041550 A1 | 2/2006 | Bennett | |
| 2006/0052083 A1 | 3/2006 | Whewell | |
| 2006/0277459 A1 | 12/2006 | Lemoine | |
| 2007/0174865 A1 | 7/2007 | Jing | |
| 2007/0294537 A1 | 12/2007 | Peyravian | |
| 2008/0016358 A1 | 1/2008 | Filreis | |
| 2008/0091954 A1 | 4/2008 | Morris | |
| 2008/0195543 A1 | 8/2008 | Turner | |
| 2009/0006842 A1 | 1/2009 | Ross | |
| 2016/0292672 A1 | 10/2016 | Fay | |
| 2017/0075938 A1 | 3/2017 | Black | |
| 2017/0366353 A1 | 12/2017 | Struttman | |
| 2018/0211467 A1 | 7/2018 | Babic | |
| 2018/0302417 A1 | 10/2018 | Wilson | |
| 2019/0073666 A1 | 3/2019 | Ortiz | |
| 2020/0106605 A1 * | 4/2020 | Mord | H04L 9/0825 |
| 2020/0244463 A1 | 7/2020 | Wilson | |
| 2020/0267163 A1 | 8/2020 | Wilson | |
| 2020/0382283 A1 | 12/2020 | Irazabal | |
| 2021/0014065 A1 * | 1/2021 | Gourisetti | H04L 9/0637 |
| 2021/0126923 A1 | 4/2021 | Kim | |
| 2021/0182773 A1 | 6/2021 | Padmanabhan | |
| 2021/0350458 A1 | 11/2021 | Gaur | |
| 2021/0357928 A1 | 11/2021 | Matsunaga | |
| 2021/0374693 A1 * | 12/2021 | La Salle | G06Q 20/0655 |
| 2022/0179869 A1 | 6/2022 | Gaur | |

OTHER PUBLICATIONS

Guardtime; KSI Blockchain Technology; date unknown; printed on Jul. 31, 2016; 8 pages; available at: https://guardtime.com/technology/ksi-technology.

Guardtime; A Distributed Consensus Engine for Digital Transactions; date unknown; printed on Jul. 31, 2016; 4 pages; available at: https://guardtime.com/technology/ksi-ledger.

Haber, Stuart; Stornetta, W. Scott (Jan. 1991). "How to time-stamp a digital document". Journal of Cryptology. 3 (2): 99-111. Retrieved Jul. 4, 2017.

Bayer, Dave; Haber, Stuart; Stornetta, W. Scott (Mar. 1992). "Improving the Efficiency and Reliability of Digital Time-Stamping". Sequences. 2: 329-334. Retrieved Jul. 4, 2017.

Mazieres, David; Shasha, Dennis (Jul. 2002). "Building secure file systems out of Byzantine storage". Proceedings of the Twenty-First ACM Symposium on Principles of Distributed Computing. 2002: 108-117. (Feb. 4, 2018) Available at: http://www.scs.stanford.edu/nyu/02fa/sched/sundr.pdf.

Brookings; Beyond bitcoin: The future of blockchain and disruptive technologies; Jan. 14, 2006; printed on Jan. 27, 2016; 3 pages; available at http://www.brookings.edu/events/2016/01/14-beyond-bitcoin-blockchain-disruptive-financial-technologies.

Brookings; Beyond Bitcoin (conference agenda); Jan. 14, 2006; retrieved on Jan. 27, 2016; 2 pages; available at http://www.brookings.edu/~/media/events/2016/01/14-bitcoin/20160114-roundtable-agenda.pdf.

Law360; 4 Ways Bitcoin's Tech May Soon Change Lawyers' Lives; Feb. 10, 2016; available at Law360.com; printed on Feb. 16, 2016; 3 pages.

Law360; Blockchain: Preparing For Disruption Like It's The '90s; Mar. 14, 2016; available at Law360.com; printed on Mar. 17, 2016; 4 pages.

Law360; An Inside Look At A Law Firm Diving Into Bitcoin Tech; Mar. 10, 2016; available at Law360.com; printed on Mar. 14, 2016; 3 pages.

Belgian Federal Office for Scientific, Technical and Cultural Affairs; TIMESEC, Digital Timestamping and the Evaluation of Security Primitives; Dec. 1999; 11 pages.

H. Massias , X. Serret Avila , J.-J. Quisquater; Design Of A Secure Timestamping Service With Minimal Trust Requirement; published 1999; 8 pages; printed on Apr. 5, 2016 The 20th Symposium on Information Theory in the Benelux.

Wikipedia; Timestamp; Feb. 27, 2007; available at http://en.wikipedia.org/wiki/Time_stamp; printed on Mar. 19, 2007; 3 pages.

E-Timestamp; How a digital timestamp works; date unknown; available at http://www.e-timestamp.com/timestamp.htm; printed on Apr. 22, 2007; 2 pages.

Wikipedia; Trusted timestamping; Apr. 1, 2008; available at http://en.wikipedia.org/wiki/Trusted_timestamping; printed on Apr. 1, 2008; 3 pages.

Speedylook Encyclopedia; Wrap Soleau; date unknown; available at http://www.speedylook.com/wrap_soleau.html; printed on Apr. 1, 2009; 1 page.

(56) References Cited

OTHER PUBLICATIONS

Data Formats of the NSRL Reference Data Set (RDS) Distribution; date unknown; printed on Jul. 19, 2011; 6 pages; available at http://www.nsrl.nist.gov/documents/Data-Formats-of-the-NSRL-Reference-Data-Set-12.pdf.
Satoshi Nakamoto; Bitcoin: A Peer-to-Peer Electronic Cash System; Oct. 31, 2008; 8 pages; available at https://bitcoin.org/bitcoin.pdf; printed on Jun. 2, 2015.
Cryptography@metzdowd.com mailing list; Bitcoin P2P e-cash paper (dated announcement of Satoshi Nakamoto Bitcoin paper); Oct. 31, 2008; printed on Apr. 5, 2016; 1 page; available at http://article.gmane.org/gmane.comp.encryption.general/12588/.
Wikipedia; Merkle Tree; available at https://en.wikipedia.org/wiki/Merkle_tree; printed on Sep. 30, 2018; 6 pages.

\* cited by examiner

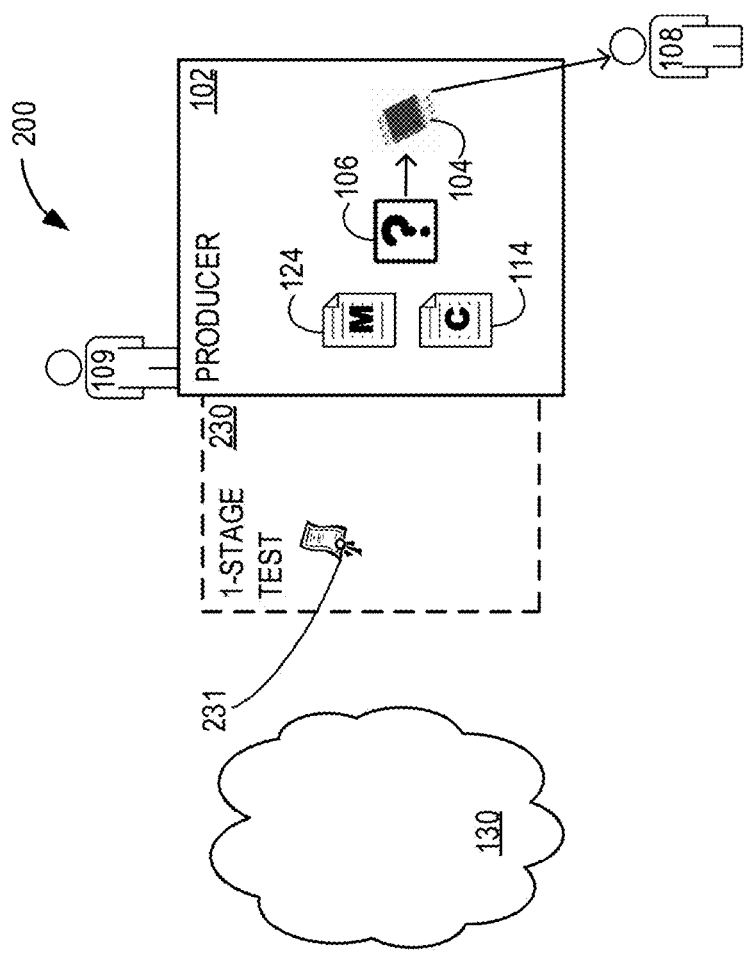
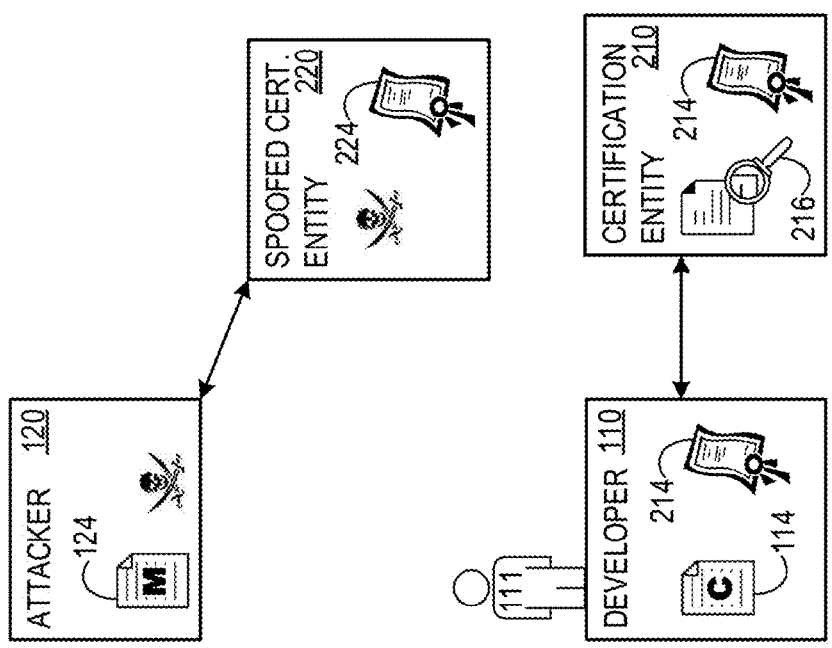

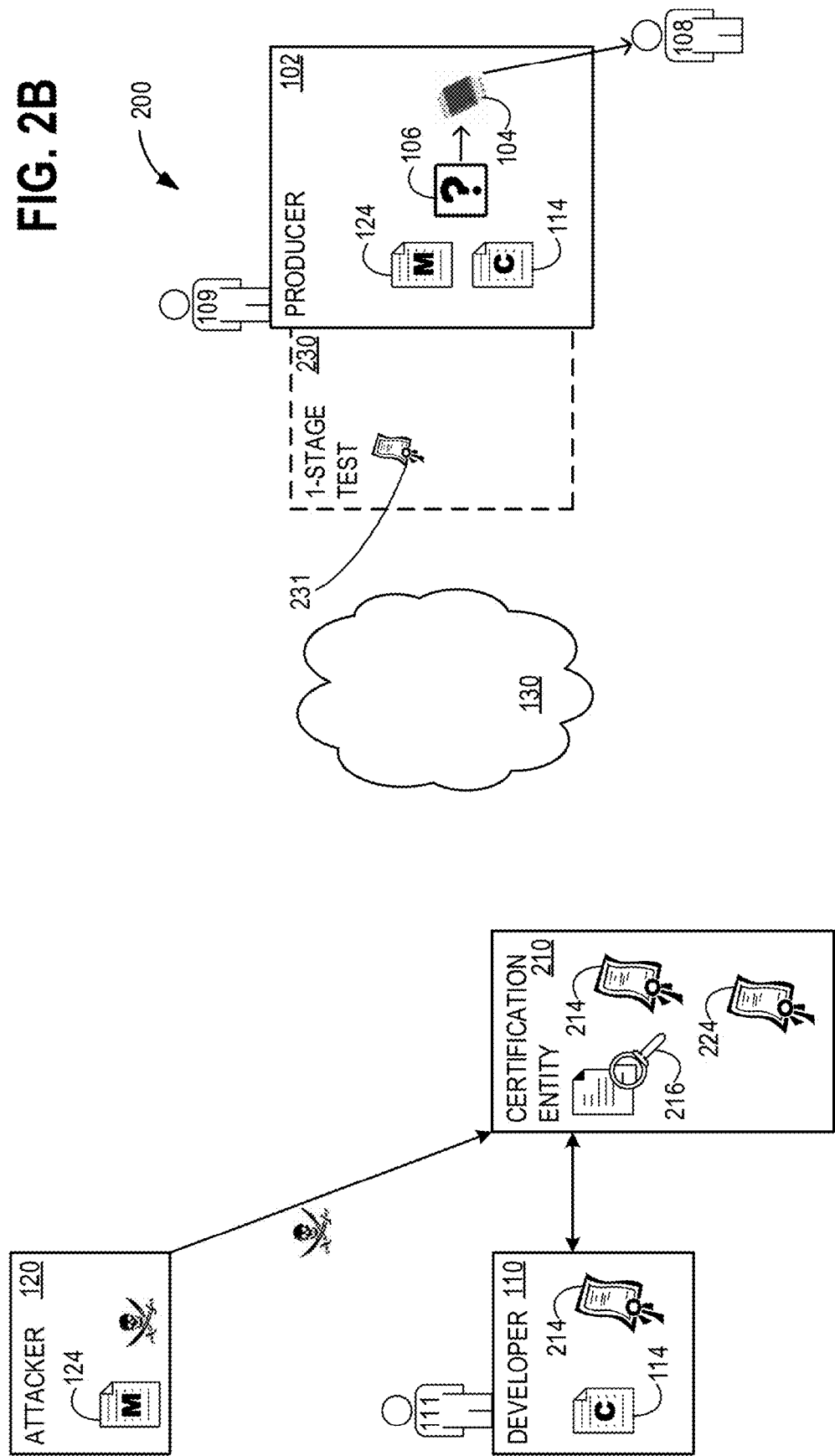

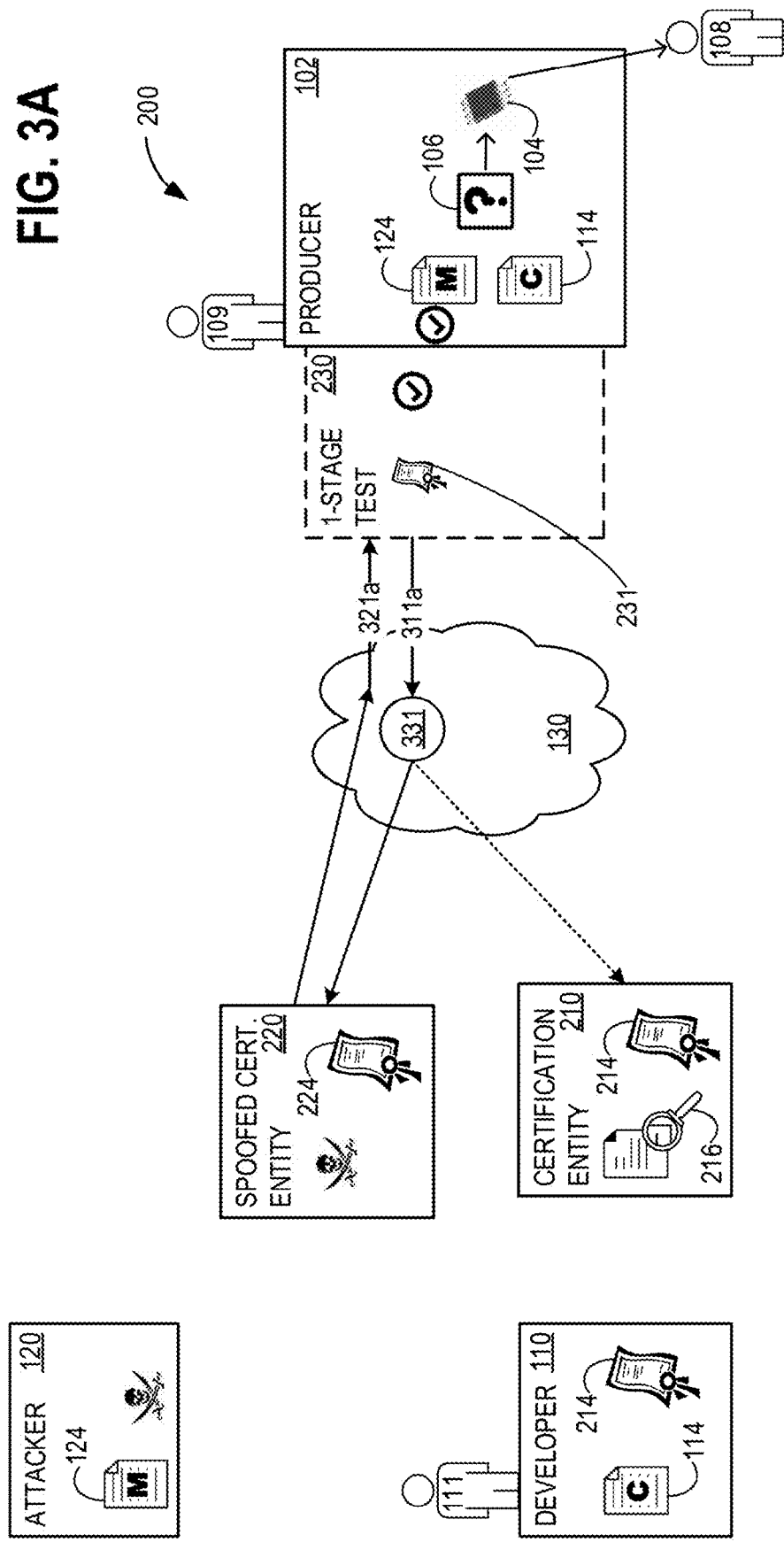

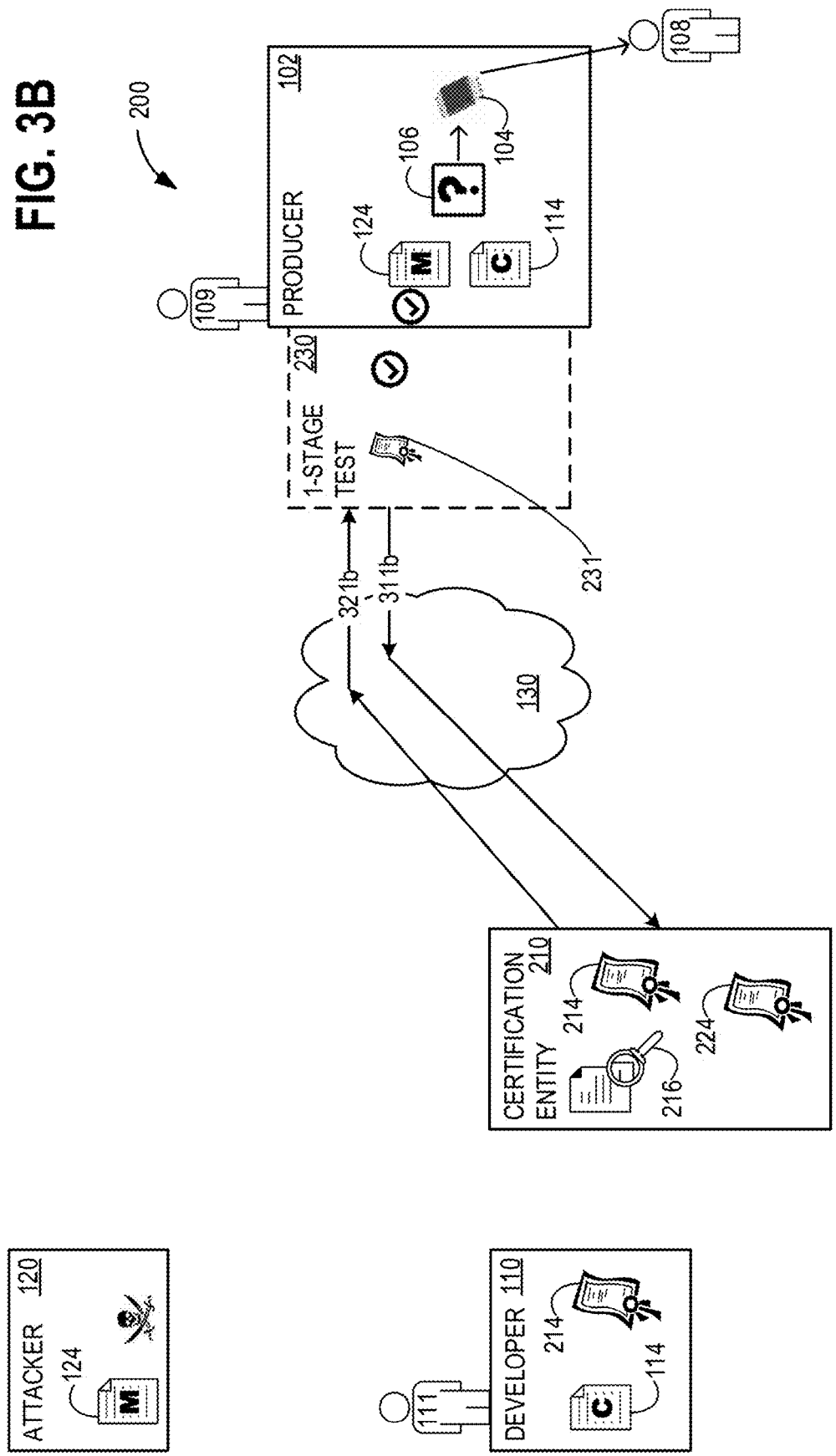

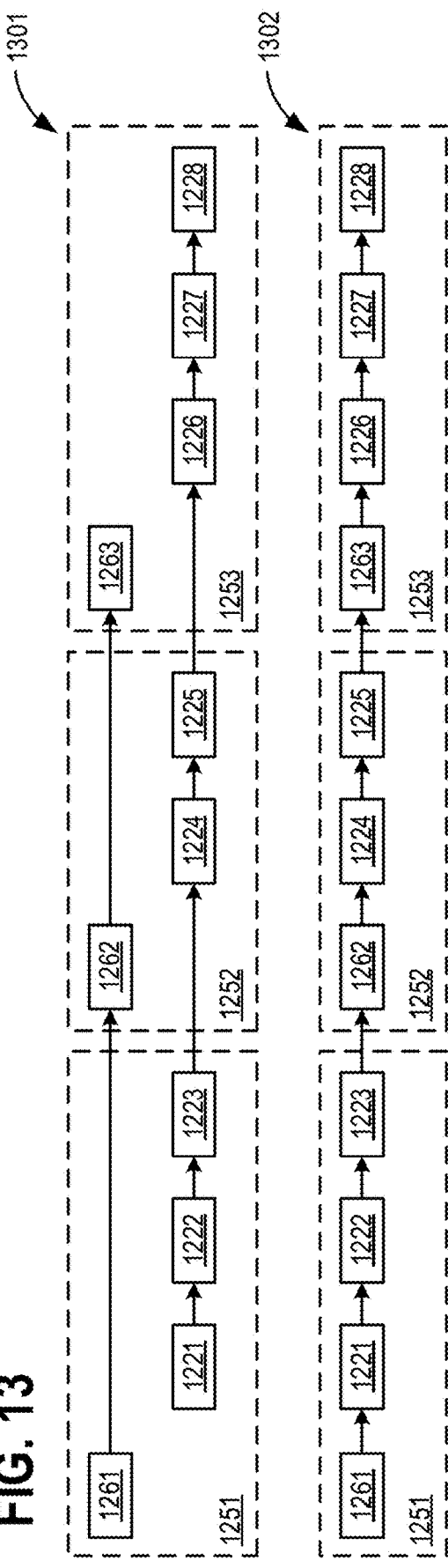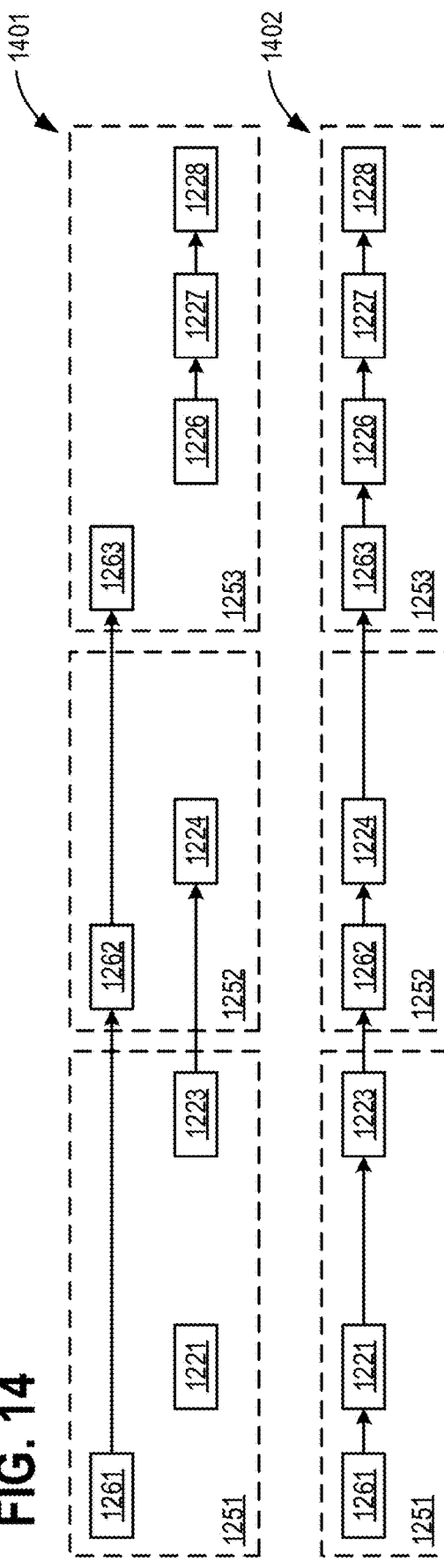

Primary Payload 1510
| MESSAGE DIGEST (HASH VALUE, IVC) OF SUBJECT DIGITAL CONTENT | 1511 |

Record Chaining 1520
| MESSAGE DIGEST OF PRIOR RECORD | 1521 |
| INDEX OF RECORD WITHIN RECORD CHAIN (RECORD CHAIN INDEX) | 1522 |

Data Owner Fields 1530
| DATA OWNER (DEVELOPER, DISTRIBUTER) DIGITAL SIGNATURE(S) | 1531 |
| DATA OWNER TIMESTAMP(S) | 1532 |
| DATA OWNER'S IDENTIFICATION OF DIGITAL CONTENT | 1533 |
| OTHER | 1534 |

Data Custodian Fields 1540
| DATA CUSTODIAN DIGITAL SIGNATURE(S) | 1541 |
| DATA CUSTODIAN TIMESTAMP(S) | 1542 |
| DATA CUSTODIAN'S IDENTIFICATION OF DIGITAL CONTENT | 1543 |
| OTHER | 1544 |

Perm. Entity Fields 1550
| PERMISSIONING ENTITY DIGITAL SIGNATURE(S) | 1551 |
| PERMISSIONING ENTITY TIMESTAMP(S) | 1552 |
| PERMISSIONING ENTITY'S IDENTIFICATION OF DIGITAL CONTENT | 1553 |
| OTHER | 1554 |

Linking Fields 1560
| VERSIONING LINK | 1561 | VERSIONING LINK | 1562 |
| CERTIFICATION LINK | 1563 | CERTIFICATION LINK | 1564 |
| OTHER LINK | 1565 | OTHER LINK | 1566 |
| OTHER LINK | 1566 | OTHER LINK | 1568 |

Admin Fields 1570
| SOFTWARE VERSION | 1571 | SOFTWARE VERSION | 1572 |
| OTHER ADMINISTRATIVE DATA | 1573 |
| INDEX OF RECORD WITHIN BLOCK | 1574 |

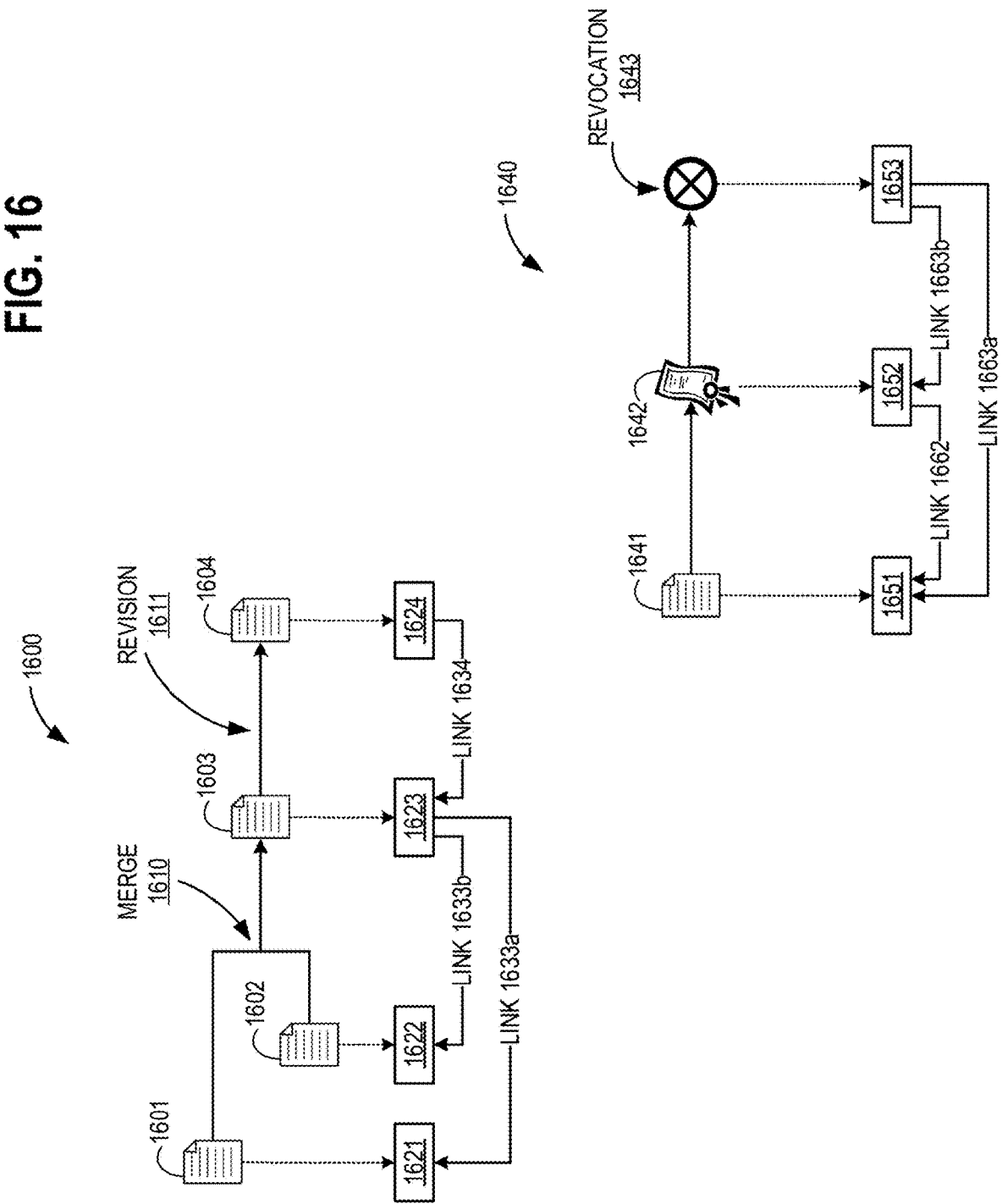

BLOCKCHAIN RECORDS WITH THIRD PARTY DIGITAL SIGNATURES AS A TRUST ELEMENT FOR HIGH-RISK DIGITAL CONTENT

CROSS-REFERENCE TO RELATED APPLICATIONS

This application is a continuation of commonly-owned and co-pending U.S. patent application Ser. No. 17/139,672, filed Dec. 31, 2020, entitled "Blockchain Records with Third Party Digital Signatures as a Trust Element for High-Risk Digital Content," which claims the benefit of U.S. Provisional Patent Application No. 63/070,363, filed Aug. 26, 2020, entitled "Multi-Stage Integrity Verification Using a Blockchain", the entirety of which is hereby incorporated by reference herein, and which also claims the benefit of U.S. Provisional Patent Application No. 63/311,943, filed Nov. 15, 2020, entitled "Blockchain With Multi-Tier Chaining", the entirety of which is hereby incorporated by reference herein.

GOVERNMENT RIGHTS

This invention was made with government support under contract 47QFLA19D0015 awarded by the General Services Administration. The government has certain rights in the invention.

BACKGROUND

A blockchain (a.k.a. block chain) provides a trust element that may be leveraged to improve trust in digital content, such as distributed ledgers and even stand-alone digital files. There are multiple differing aspects of blockchain design that are relevant here. Some include whether chain growth is controlled by community consensus or instead is centrally managed and controlled by a permissioning entity; and whether the blockchain itself stores the data (e.g., a distributed ledger or distributed database) or instead uses off-chain storage and the blockchain stores only hash values (message digests) of registered data (digital content). Another relevant aspect is whether the blockchain provides only ordinal date proof (i.e., the order in which records are received, or blocks are added to the chain, but not a provable calendar date) or instead provides an out-of-band date proof that may be used to independently establish a no-later-than date-of-existence for a block, which then establishes a no-later-than date-of-existence for each record within that block, which then establishes a no-later-than date-of-existence for digital content covered by one of the records within that block.

A permissioned blockchain, using off-chain storage, provides advantages over blockchains that rely on consensus and/or store information within the blockchain. Advantages include enhanced viability, compactness, and the ability to register material with distribution limitations (e.g., military classified). Examples create an immutable public record of data signatures that confirm when data is intact, without distributing the data itself, so that widespread availability of the blockchain (beyond those privileged to see the data) advantageously increases the size of the community that is able to detect spoofing or forgery attempts. A permissioning entity limits submissions to manage blockchain growth, foreclosing problematic material that may risk long-term viability. Examples render blockchain operations resistant to advanced persistent threats (APTs), leverage digital signatures as additional trust elements for high-risk data, link records to track pedigree and enable identification of obsolete (e.g., superseded) data, and leverage out-of-band date proof to enable independent verification of integrity and no-later-than data-of-existence.

In general, consensus blockchains that include distributed ledgers are superior for cryptocurrencies, because the absence of a central manager renders such blockchains somewhat immune to external influence and the distributed ledger makes the relevant information (i.e., the spending history of a token) easily available to the people who need to trust the ledger (e.g., the people who will be accepting tokens for value). This highlights a significant issue: a distributed ledger is not a trust element because it contains the ledger information (i.e., the spending history of a token, so that double-spending attempts may be detected). Rather, the trust in a blockchain arises from its widespread distribution outside the control of any single party, such that (hopefully), any attempt to alter any content within the blockchain and attempt to represent the altered content as accurate will be detected by others with a high degree of certainty. This trust mechanism, however, can also be accomplished by off-chain storage blockchains where hash values are stored on the chain that act as digital fingerprints of digital content stored off of the blockchain, although additional steps are required: retrieving the digital content, hashing it, and comparing the result with the contents of the blockchain.

However, in general, permissioned, off-chain storage blockchains are superior trust elements for digital data that may not be suitable for uncontrolled, widespread distribution (e.g., military-related information, financial records, legal documents, trade secret information, and personal information). The use of a permissioning entity is not a problem for many types of information, for example information produced by regulated industries or industries operated by publicly-held corporations (e.g., financial, legal, manufacturing, infrastructure, defense), because the prospect of government interference is not as much of a potential concern as it may be for come cryptocurrency users. Also, beyond challenges to long-term viability introduced by consensus (as described below), distributed ledgers and distributed databases have multiple additional disadvantages relative to off-chain storage. Every copy of a distributed ledger (or database, used synonymously, here) is a potential leak point for any sensitive or distribution-limited information.

For information that has a distribution limitation (e.g., ITAR, military classified information, subject to NDA), any surplus copies present security risks. Any storage solution for such information that uses a distributed ledger has an unnecessary, designed-in security risk. All copies of a distributed ledger must be stored according to the distribution limitation of the most tightly-controlled information, resulting in either a plurality of different blockchains, or if only a single blockchain is used, it is accessible to only the smaller population having the highest security clearance (thereby reducing utility). Blockchains that use off-chain storage, however, may inter-mingle records for digital content having differing distribution limitations, because the records do not contain the actual digital content that is subject to the distribution limitations. Thus, the trust element may be widely-distributed, maximizing trust, using a common blockchain for multiple levels of distribution limitations, while the digital content itself may be stored securely, and segregated as needed using access controls that enforce the particular distribution limitations.

Storage is considerably easier and less expensive for off-chain storage blockchains, because the records will typically be smaller than the digital content that is represented by a record. Thus, multiple people can download and store copies of the blockchain, and only retrieve the smaller amount of digital content that they need, and only when they do need it. Although distributed ledgers do provide a backup functionality, once some sensible number of backup copies exist (which may be traditional backups and not require a blockchain), further copies provide diminishing returns for the alleged backup utility. Additionally, the blockchain itself may have looser distribution limitations, precluding the need for more expensive storage that is cleared for the most tightly-controlled digital content.

Unfortunately, trust in blockchains is often misplaced or may be greater than is warranted. For example, blockchains that use mining and community consensus to grow the chains, and motivate miners with valuable tokens as rewards, face multiple threats that may undercut trust at some point in the future. That is, token mining as a mechanism for ensuring participation in a blockchain community introduces an inevitable sunset (end date) on the viability of a blockchain. Blockchains that use a permissioning entity to control the content and growth of the chain do not require consensus or mining, although they face a different set of risks to the trust that they provide.

In the absence of a permissioning entity regulating which records are admitted into a blockchain, and controlling the growth of the chain, two risks become apparent that may threaten the viability of such a distributed blockchain. One is that problematic material may enter the blockchain, such as obscene material, material that violates someone's privacy, material that violates a copyright, and/or material that is otherwise illegal to publicly disclose. Even if material is not apparently problematic upon entry into the blockchain, a subsequent development may render the material problematic to retain. For example, under the European General Data Protection Regulation (GDPR), a right to erasure (Article 17) permits a person to demand that certain information be deleted from certain data sets, in certain circumstances, and such a demand then becomes legally enforceable with penalties specified in the GDPR for non-compliance. If that person's information appears within a blockchain, deletion may not be possible without destroying the integrity of the chain. Additionally, with no gate-keeper on content insertion, obscene material may be put into a blockchain, as has already occurred with Bitcoin. Although currently this does not present a legal liability for people possessing copies of an affected blockchain, there is no guarantee that, decades from now, the presence of illegal material within decentralized blockchains (i.e., blockchains lacking a permissioning entity) will not be used by some governments to try eliminating cryptocurrencies as competition for their national currencies. If this occurs, then the "protection" of documents and files by affected blockchains may deteriorate.

Consensus is used in decentralized blockchains as a means of selecting which blocks will be added to a blockchain, in the absence of a permissioning entity that makes such decisions. Mining was introduced in Bitcoin (and some other blockchains) as a way to ensure a relatively large community of miners, who double as independent verification entities for the integrity of a blockchain and provide the consensus. Unfortunately, the economic reality of inherent efficiencies of scale provides an incentive for large miming farms to supplant small-scale independent miners. Initially, small-scale miners (e.g., individuals) may likely be drawn from a pool of "early adopters," although after the value of mining is established, larger numbers of people may become involved, including institutional investors and even some governments that are able to support large-scale operations. Large-scale operations, that intelligently allocate the mining search space among nodes within a farm or coordinate across multiple farms controlled by friendly entities, are likely to achieve a higher return on investment (ROI) than small-scale miners may be able to achieve. This is because ROI is proportional to the expected count of earned tokens, divided by the cost of mining operations. Spreading fixed costs over a larger number of units (e.g., mining nodes) typically reduces per-unit cost, even as the expected count of earned tokens grows approximately linearly with the number of units. The result is that the small-scale miners, who proved the technology by early adoption, are then eventually displaced by a smaller number of large-scale mining operations.

The original Bitcoin paper by Satoshi Nakamoto foresaw a large number of "honest nodes" (miners) keeping the Bitcoin blockchain trustworthy. (Note that the term "blockchain" originated later, and not in the original Bitcoin paper. Note also that the framework for a permissioned, off-chain storage blockchain preceded the original Bitcoin paper, using the term "edition chain," and is described in U.S. Pat. No. 7,904,450, filed April 2008.) The inevitable tendency of mining efforts to consolidate into a shrinking number of increasingly large mining farms, controlled by entities (such as the Chinese, North Korean, and Russian governments) with potentially hostile motives toward an economy that had accumulated significant cryptocurrency wealth may not have been foreseen by Nakamoto. However, at some point, independent, small-scale miners may come to view mining as too expensive and, as they abandon mining operations, the growth of some blockchains may then be largely controlled by entities that are hostile to the interests of the USA. When this happens, the scenario of an attacker placing forged entries into the blockchain becomes feasible, because the attacker and/or the attacker's allies may control a significant portion (even if less than half) of the total mining capacity.

Although the use of quantum computing for token mining would be considered to be a significant waste of resources, due to the relative value of tokens in view of the cost of obtaining quantum computing capability, if controlling the growth of a decentralized blockchain provides other value, rational attackers may attempt to wrest control from "honest nodes," if even for only a short period of time. Consider a possibility in which a country's government relies upon a particular blockchain for registering important documents, and a significant percentage of that country's population has accumulated wealth in a cryptocurrency that relies upon that particular blockchain. A hostile government may see value in an economic warfare attack that seeks to destroy the accumulated wealth and undermines trust in the government's important documents. Even if the threats described above (e.g., obscene material rendering possession of a blockchain copy illegal, and mining being controlled by hostile interests) do not materialize for years or decades, their possible inevitability places a potential end date on trust for information that is supposedly protected by such blockchains. A blockchain without such risks to its long-term viability may provide a superior trust element.

Ironically, a solution to such risks preceded, by nearly two decades, the explosive growth of blockchains that was brought on by Bitcoin. The Haber-Stornetta solution, which dates back to the early 1990's, uses a permissioning entity that adds records to an ever-growing chain. The permissioning entity is able to screen submissions and publishes records that are safe for possession (i.e., they do not contain problematic material). The records include hash values (message digests) in the form of hexadecimal numbers, and some labels that are likely to be innocuous. Such a solution has the potential of longevity for as long as the permission entity is operating in a trustworthy manner, has sufficient funding, and does not depend on the continued existence of a widespread honest mining community.

Additionally, the Haber-Stornetta solution also introduces an out-of-band date proof in the form of a classified advertisement, containing a hash value of the most recent content that is chained to prior content by earlier hash values. This trust element is published in a permanent public record, the New York Times newspaper. However, the Haber-Stornetta solution was designed to enhance trust in a timestamping agency (TSA, a.k.a. trusted timestamping authority), rather than being designed to facilitate fully independent, external verification of the integrity and no-later-than date-of-existence of digital content (i.e., verification may be accomplished by external actors, independently, without needing to involve the TSA in any manner). Although the Haber-Stornetta solution was designed to enable the TSA to prove that its timestamping values are accurate (at least to within the timeframe supported by the classified advertisement publications), a new threat has emerged to blockchains operated by permissioning entities.

Even an honest permissioning entity (i.e., a permissioning entity staffed by honest people who do not attempt to forge or otherwise falsify records, despite potential bribery and blackmail attempts) may have its computer networks infiltrated by an advanced persistent threat (APT). If, for example, a particular blockchain is used by one government for important military-related information, attackers that are paid by or are otherwise sympathetic to a second, hostile government may attempt to hide malicious logic (i.e., an APT) on the computer network of the blockchain's permissioning entity. Such malicious logic may alter received records (or timestamps associated with those records) that are accumulating and awaiting generation of the hash value for the classified advertisement or other out-of-band date proof. Independent, external verification of a blockchain's integrity may do more than merely insulate a permissioning entity from accusations of falsifying records. In some scenarios, it may enable detection of APT activity that is occurring on the permissioning entity's computer network that affects blockchain records, but yet has not been noticed by the permissioning entity itself.

Examples of important information that may require integrity verification include large data sets produced by the operation of sensitive industrial systems. Plain text data files may feature millions of records of quantitative readings. The size and density of information in some of the files may permit an attacker to hide modifications (e.g., a single altered value in a large data record may escape detection) until after damage occurs. For example, such an attack has the potential to spoil the authenticity of sensitive data, thereby destroying the value of the entire data set for downstream analytics that rely upon its long-term integrity.

BRIEF DESCRIPTION OF THE DRAWINGS

The disclosed examples are described in detail below with reference to the accompanying drawing figures listed below:

FIGS. 1, 2A, 2B, 3A, 3B, 4A, 4B, 5A, and 5B illustrate exemplary stages of an attacker attempting to induce a producer into inserting malicious digital content into a product for a user.

FIG. 13 illustrates various options for the multi-tier chaining.

FIG. 14 illustrates various options for deduplication with multi-tier chaining.

FIG. 15 illustrates various options for record content.

FIG. 16 illustrates various uses for record link fields.

DETAILED DESCRIPTION

A blockchain is disclosed that provides multiple advantageous features simultaneously or independently, including rendering blockchain operations resistant to advanced persistent threats (APTs), providing third party digital signatures as an additional trust element for high-risk digital content, linking blockchain records to track pedigree and identify obsolete digital content (i.e., digital content registered in the blockchain that has been superseded), and other advantages. Aspects of the disclosure include chaining records as they are submitted and then including those records, still chained, within blocks that are chained—thus providing two tiers of chaining: record chaining and block chaining. Multiple options exist for interleaving the chaining of records with the chaining of the blocks, and handling duplicate records. Aspects of the disclosure include integrating an out-of-band date proof with third party digital signatures, such as the permissioning entity's digital signature on a record submission and a certification entity digital signature indicating that the digital content associated with a blockchain record has been examined and is trustworthy (e.g., the certification entity has expertise to certify that the digital content is free from malicious logic), in addition to the digital signature of the developer of the digital content (or other data owner). Aspects of the disclosure include using link fields to track pedigree of digital content, by enabling a data user (e.g., a data owner or a data consumer) to track revision history within the blockchain, and also to enable the data user to ascertain whether the digital content being investigated is the current copy or whether a superseding copy has been registered in the blockchain.

Of the five pillars of information assurance: (1) availability, (2) authenticity, (3) confidentiality, (4) integrity, and (5) non-repudiation, aspects of the disclosure directly address providing for improved assurances of authenticity and integrity. In some examples, improved non-repudiation may also be provided. Common availability and confidentiality measures are compatible with this disclosure, and may be provided using standard techniques such as encryption and recovery systems. Aspects of the disclosure leverage a simple, yet powerful, concept: one of the few places that an attacker ("hacker") cannot break into is a calendar date that has already passed. That is, a sufficiently skilled attacker with sufficient resources may breach systems that are highly secure, and may even plant APTs that remain undetected for many years, but no attacker is able to get into a time machine, go back in time, and perform a task as simple as placing a classified advertisement in a newspaper at a date that has already passed. This is one of the rare certainties in an environment in which few systems may be considered to be solidly secure against any attack.

Figure 1:
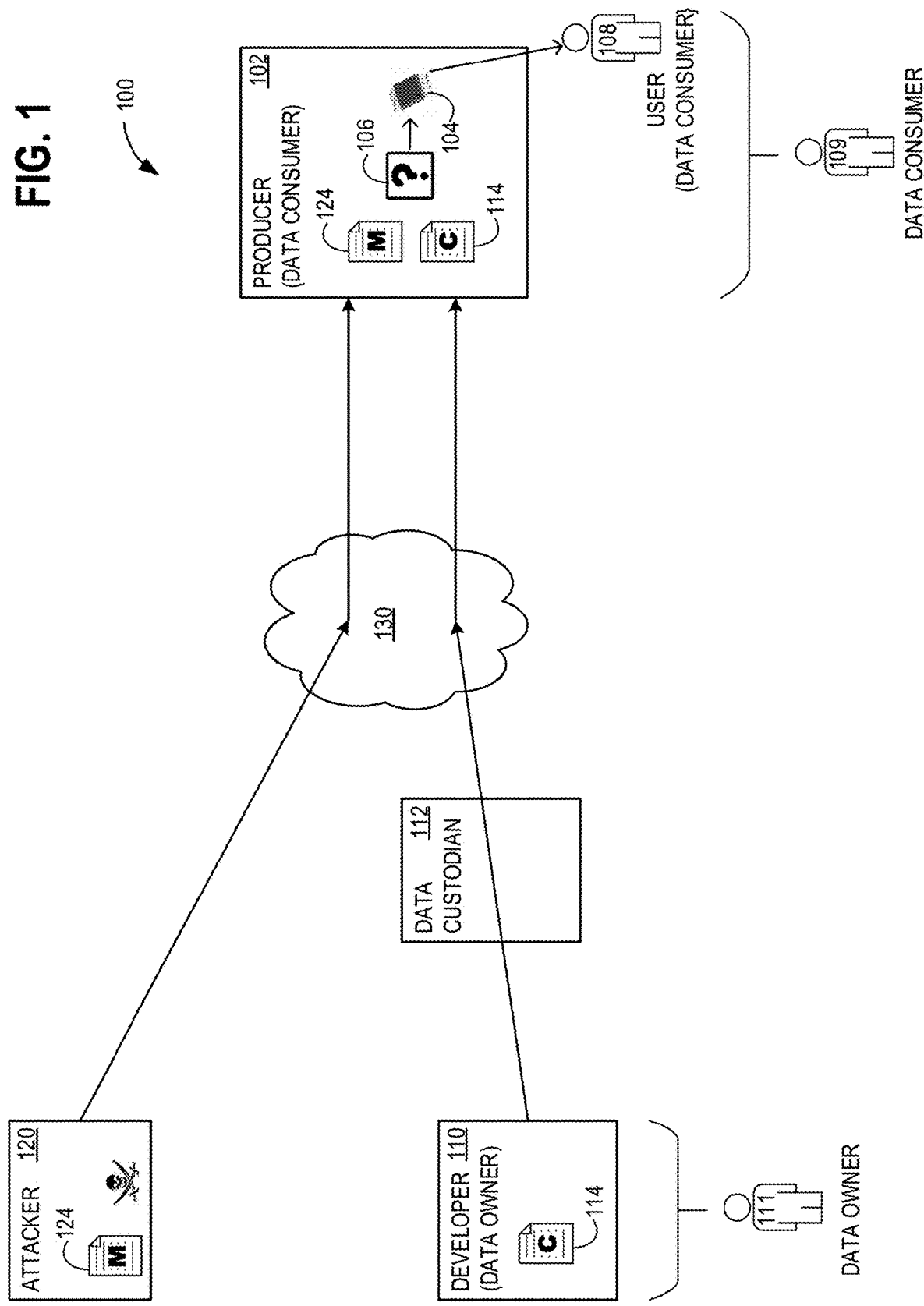

FIGS. 1, 2A, 2B, 3A, 3B, 4A, 4B, 5A, and 5B illustrate exemplary stages of an attacker attempting to induce a producer into inserting malicious digital content into a product for a user. FIG. 1 demonstrates a problem that may be solved using aspects of the disclosure. In an arrangement 100, a producer 102 is providing a product 104 to a user 108. Product 104 may be an integrated circuit (IC) or another complex computing product. Producer 102 intends to use digital content, such as digital content 114 from a developer 110 within product 104. Digital content 114 is annotated with a "C" to indicate that it is clean of malicious logic. If producer 102 were able to obtain digital content 114 by taking physical delivery from developer 110 in a secure manner, producer 102 could authenticate the identity of developer 110, developer 110 could assure producer 102 of the integrity of digital content 114, and developer 110 could not repudiate digital content 114. In this arrangement, developer 110 acts in the role of a data owner 111, and both producer 102 and user 108 act in the roles of data consumers 109. It should be understood that some other entity may take possession of digital content 114 from developer 110 and act in the role of data owner 111, to distribute digital content 114 and assure its integrity (as described below for developer 110).

Unfortunately, however, rather than taking physical delivery of digital content 114 from developer 110 in a secure manner, producer 102 obtains digital content 114 remotely, over a network 130. This means that authenticity, integrity, and non-repudiation require additional effort. For example, producer 102 may not have certainty that the digital content received is not malicious digital content 124 (annotated with an "M" to indicate malicious content) from an attacker 120.

Attacker 120 may be attempting to insert malicious logic into the supply chain of products by user 108. In general, producer 102 and user 108 may be considered to be data consumers 109. In some examples, producer 102 obtains at least digital content 114 from a data custodian 112 that may provide storage of digital content 114. For example, developer 110 may submit digital content 114 to data custodian 112 for storage and later retrieval by data consumers 109 (e.g., producers 102 and/or users 108). In some examples, data custodian 112 is the entity that submits digital content 114 into a blockchain 410 and/or acts as a permissioning entity 440 for blockchain 410 (see FIG. 4A and its description below). For clarity of illustration, data custodian 112 is not shown in the subsequent figures, although it should be considered to be a possible actor in any of the scenarios described below, along with a potential malicious (spoofed) data custodian that facilitates the activities of attacker 120 in inserting malicious digital content 124 into the supply chain relied upon by user 108.

Figure 6A:
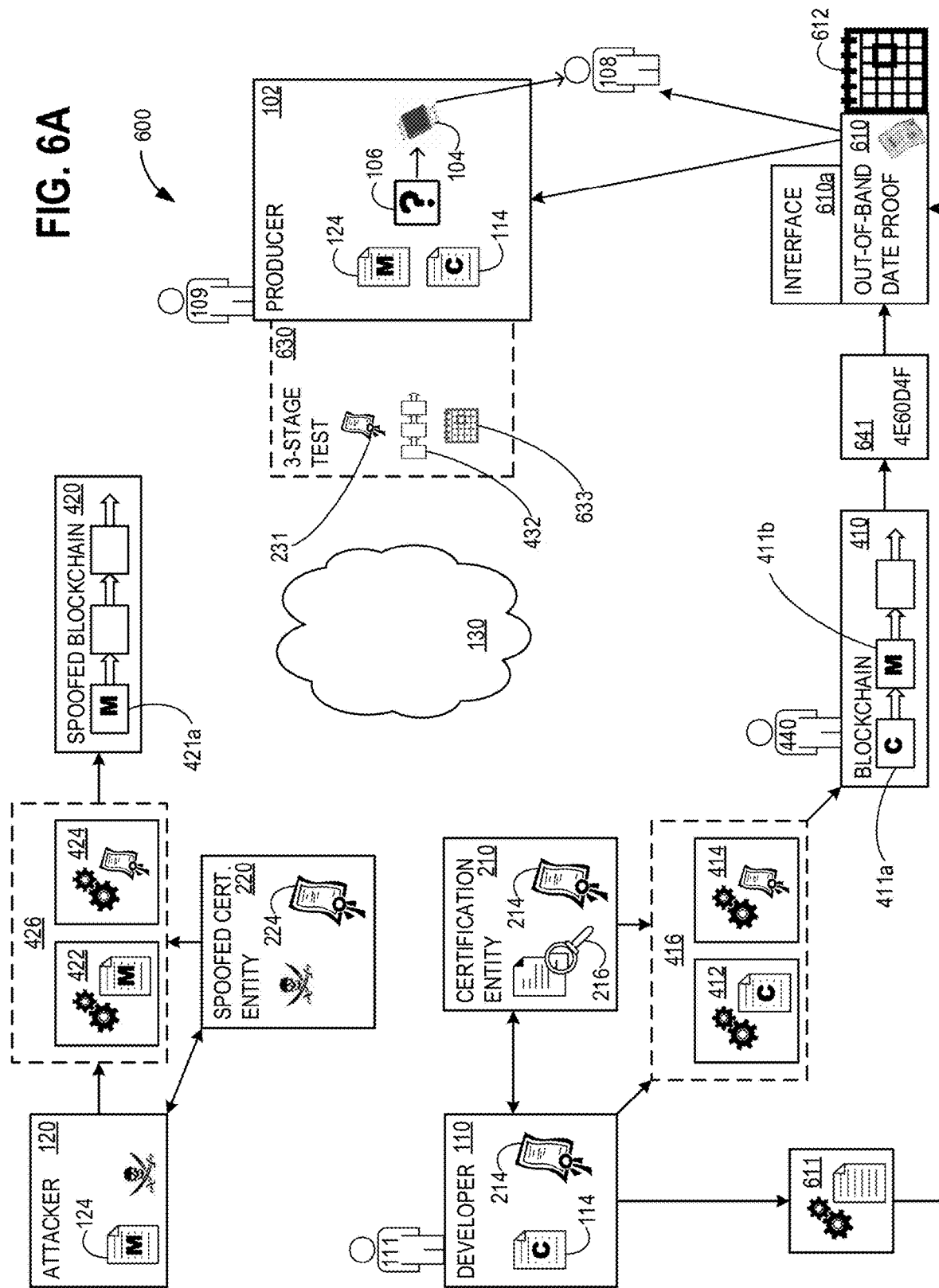
FIG. 6A illustrates an exemplary scenario in which a developer leverages a blockchain with out-of-band date proof to pre-emptively frustrate the attacker's efforts shown in FIGS. 1-5B.
Figure 9:
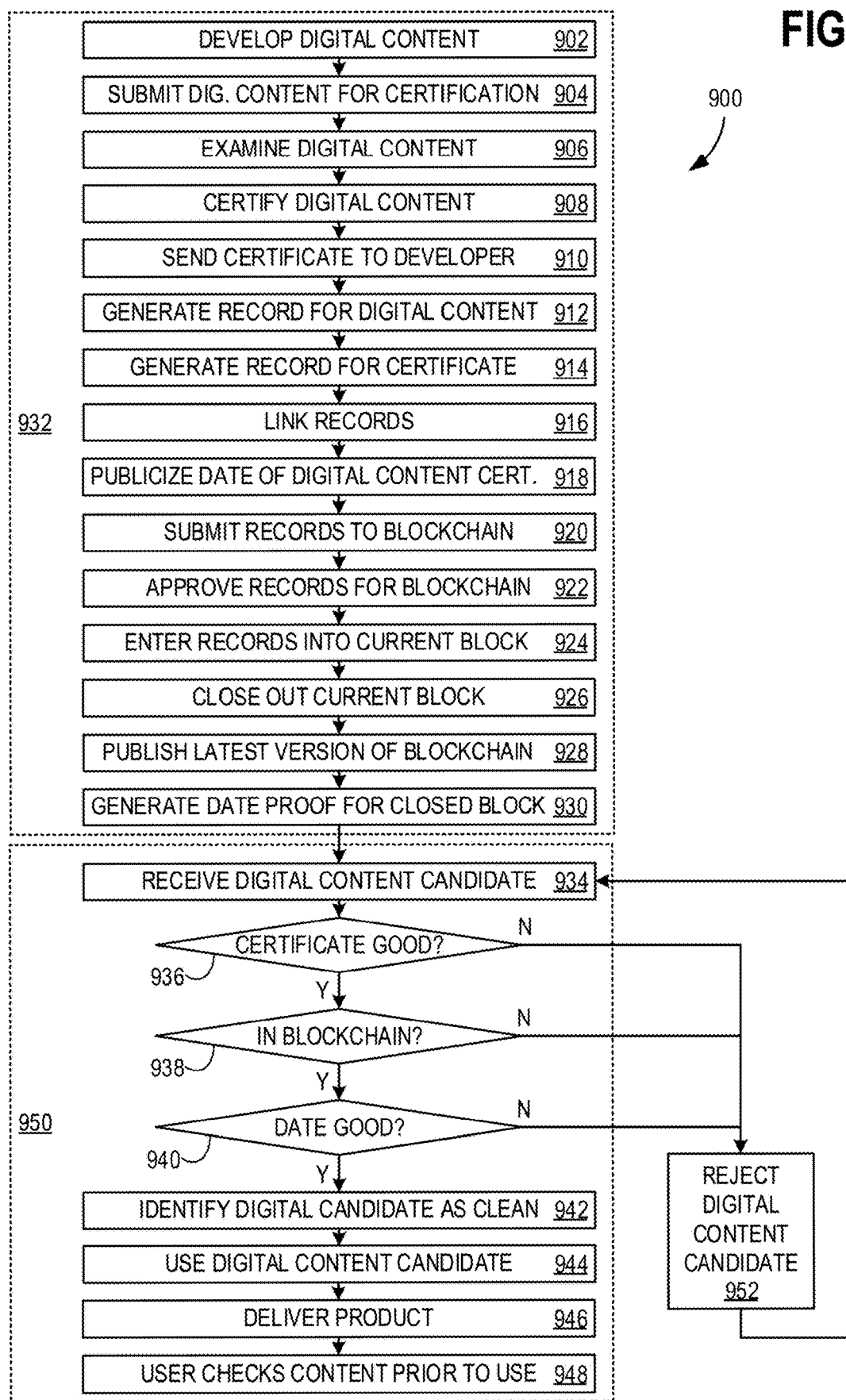
FIGS. 9 and 10 illustrate a process that may be used with the scenario depicted in FIGS. 7 and 8.
Figure 10:
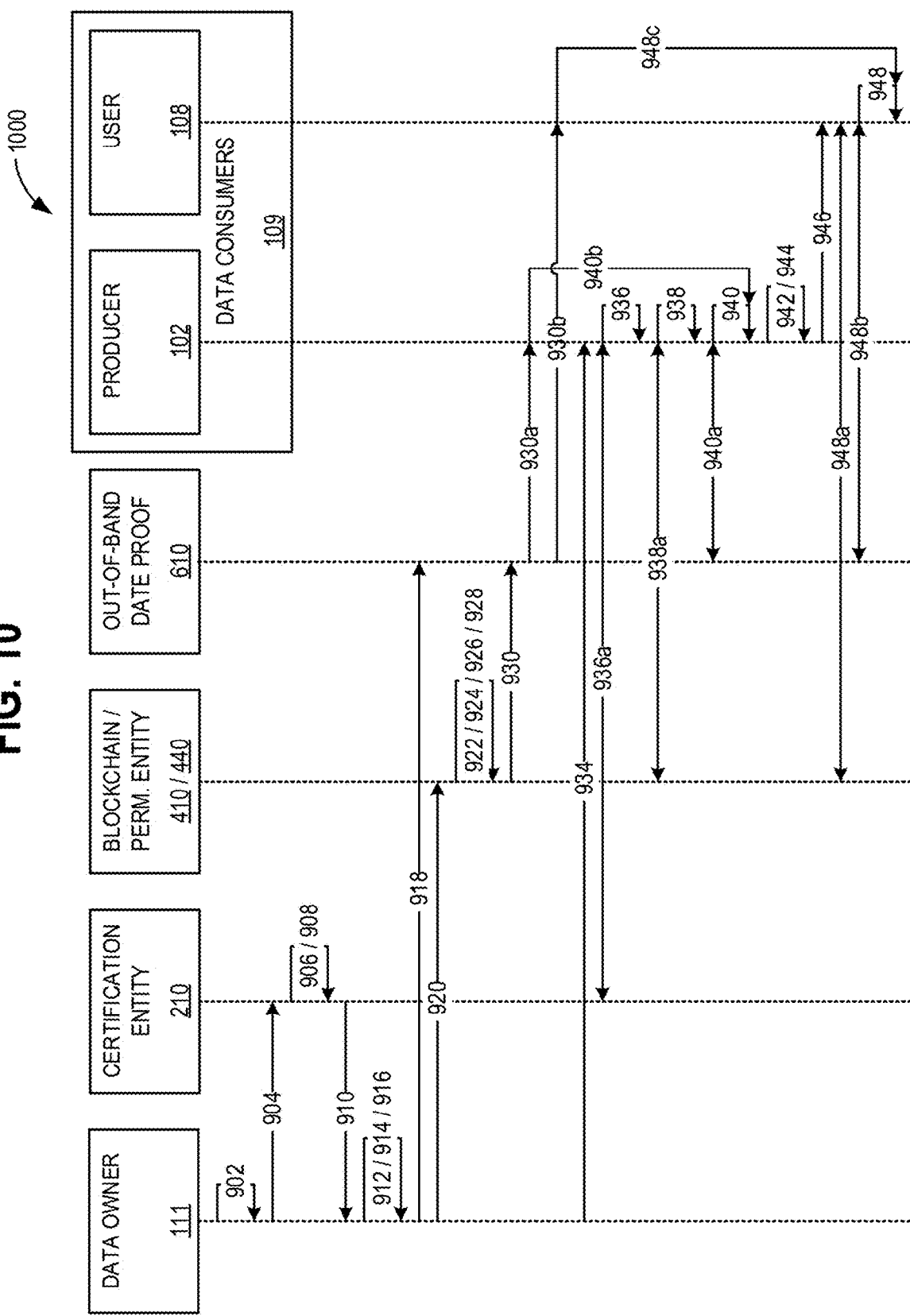

Authenticity and integrity may be established using, for example, an arrangement 600 shown in FIG. 6A and a process shown in FIGS. 9 and 10. Non-repudiation may be achieved by developer 110 digitally signing digital content 114, and further improved upon by using optional aspects of arrangement 600 and the process shown in FIGS. 9 and 10.

FIGS. 2A-5B illustrate attempts to establish authenticity and integrity that retain vulnerability to attacker 120 (commonly called a "hacker") inducing producer 102 to use malicious digital content 124 in place of clean digital content 114. As illustrated in FIG. 1, producer 102 is in possession of both clean digital content 114 and malicious digital content 124, and must decide, with a decision process 106, which of digital content 114 and malicious digital content 124 to place in product 104 for delivery to user 108. Malicious digital content 124 is annotated with an "M" to indicate that it contains malicious logic. In the scenarios depicted herein, attacker 120 is attempting to compromise product 104, for example, by surreptitiously exfiltrating data collected or generated by user 108, selectively impairing the functionality of product 104, or performing some other cyber-attack that leverages pre-positioned malicious logic. For the scenarios depicted herein, attacker 120 is sufficiently skilled at hiding malicious logic that decision process 106 might not reliably detect hidden malicious logic within malicious digital content 124.

FIG. 2A shows an arrangement 200 that introduces a certification entity 210. Certification entity 210 generates a certificate 214 that certifies digital content 114 as being clean of malicious logic (e.g., has been examined and is trustworthy). Certificate 214 may be a digital certificate, digitally signed by certification entity 210. Certification entity 210 uses analysis and/or testing in a certification process 216 that is able to detect malicious logic within digital content with a high degree of certainty. In some examples, the expertise and function of certification entity 210 is provided by producer 102, which provides a form of self-certification. In some examples, the expertise and function of certification entity 210 is provided by permissioning entity 440. In some examples, the function of certification entity 210 is not provided. In some examples, the expertise and function of certification entity 210 is provided by a dedicated entity, neither producer 102, nor permissioning entity 440.

Concentrating the expertise within a special, dedicated certification entity 210, rather than expecting each of multiple producers 102 to have comparable capability, may provide efficiencies. For example, there may be a single certification entity 210 supporting multiple producers 102. A single certification entity 210 may then specialize in detailed analysis of digital content, searching for malicious logic, employing a more select set of subject matter experts in the relevant technology field. The multiple producers 102 then do not require the same degree of expertise, so they may concentrate on generating products rather than fighting over a possibly small set of subject matter experts. In some examples, there may be a combination of self-certification, in which each producer 102 certifies that certain secure practices had been followed, and certification entity 210 certifies that there had been an independent assessment (i.e., either an audit of the practices of producer 102, and/or an independent assessment of the content of digital content 114).

Developer 110 submits digital content 114 to certification entity 210 for certification. Certification entity 210 examines digital content 114 for malicious logic and, finding none, certifies digital content 114 as being clean of malicious logic with certificate 214. Certification entity 210 then sends certificate 214 back to developer 110. Producer 102 is aware of certification entity 210 and seeks to operate efficiently by leveraging the expertise of certification entity 210. Thus, producer 102 develops a one-stage test 230 for received digital content, and incorporates one-stage test 230 into decision process 106. The single stage is a certificate test 231.

Unfortunately, attacker 120 is also aware of certification entity 210 and one-stage test 230, and so spawns a spoofed certification entity 220 that produces a false certificate 224. False certificate 224 falsely certifies malicious digital content 124 as being clean of malicious logic. For this attack set-up to succeed, producer 102 will be misdirected to spoofed certification entity 220, either instead of (or even in addition to) rather than legitimate certification entity 210. Spoofing websites is an achievable attack, by multiple methods, for a sufficiently-skilled attacker.

FIG. 2B is an alternative set-up by attacker 120, in which attacker 12 surreptitiously inserts false certificate 224 into a database of certificates issued by certification entity 210. Surreptitiously inserting malicious data, into even supposedly secure websites, is an achievable attack for a sufficiently-skilled attacker (e.g., a nation-state attacker or a well-funded organization). Thus, despite certification entity 210 attempting to maintain security, the presence of surreptitiously-inserted falsified data should be considered to be a possibility in many scenarios.

FIG. 3A demonstrates the exploitation of the attack set-up of FIG. 2A. As part of one-stage test 230, producer 102 sends an inquiry 311*a*, which may have been intended for certification entity 210. However, inquiry 311*a* is diverted to spoofed certification entity 220, which responds with false certificate 224 in a response 321*a*. For example, a router compromise 331 may intercept the internet protocol (IP) address of a server run by certification entity 210 (sent from an internet browser or other software run by data consumer 109 in an attempt to obtain certificate 214) and replace it with the IP address of spoofed certification entity 220. Certificate test 231 then passes, improperly, because data consumer 109 received false certification 224, believing it to be legitimate certificate 214. Mistakenly trusting false certificate 224, producer 102 improperly identifies malicious digital content 124 as good (i.e., clean of malicious logic) and uses malicious digital content 124 in product 104. Product 104 is thus compromised, potentially harming user 108 or providing attacker 120 with data that user 108 had intended to keep confidential.

FIG. 3B demonstrates the exploitation of the attack set-up of FIG. 2B. As part of one-stage test 230, producer 102 sends an inquiry 311*b* to certification entity 210, and feels confident in one-stage test 230 because response 321*b* can be authenticated as coming from certification entity 210. However, because inquiry 311*b* was generated for malicious digital content 124, and certification entity 210 possesses false certificate 224 (due to surreptitious insertion) certification entity 210 responds with false certificate 224. Thus, certification entity 210 mistakenly validates malicious digital content 124. This may occur because response 321*b* may be automated and/or because of the reliance of certification entity 210 on digital records. When an automated system relies upon digital records, the possibility of the automated system providing improper responses (due to surreptitiously-inserted falsified data) should be considered to be a possibility in many scenarios.

Figure 4A:
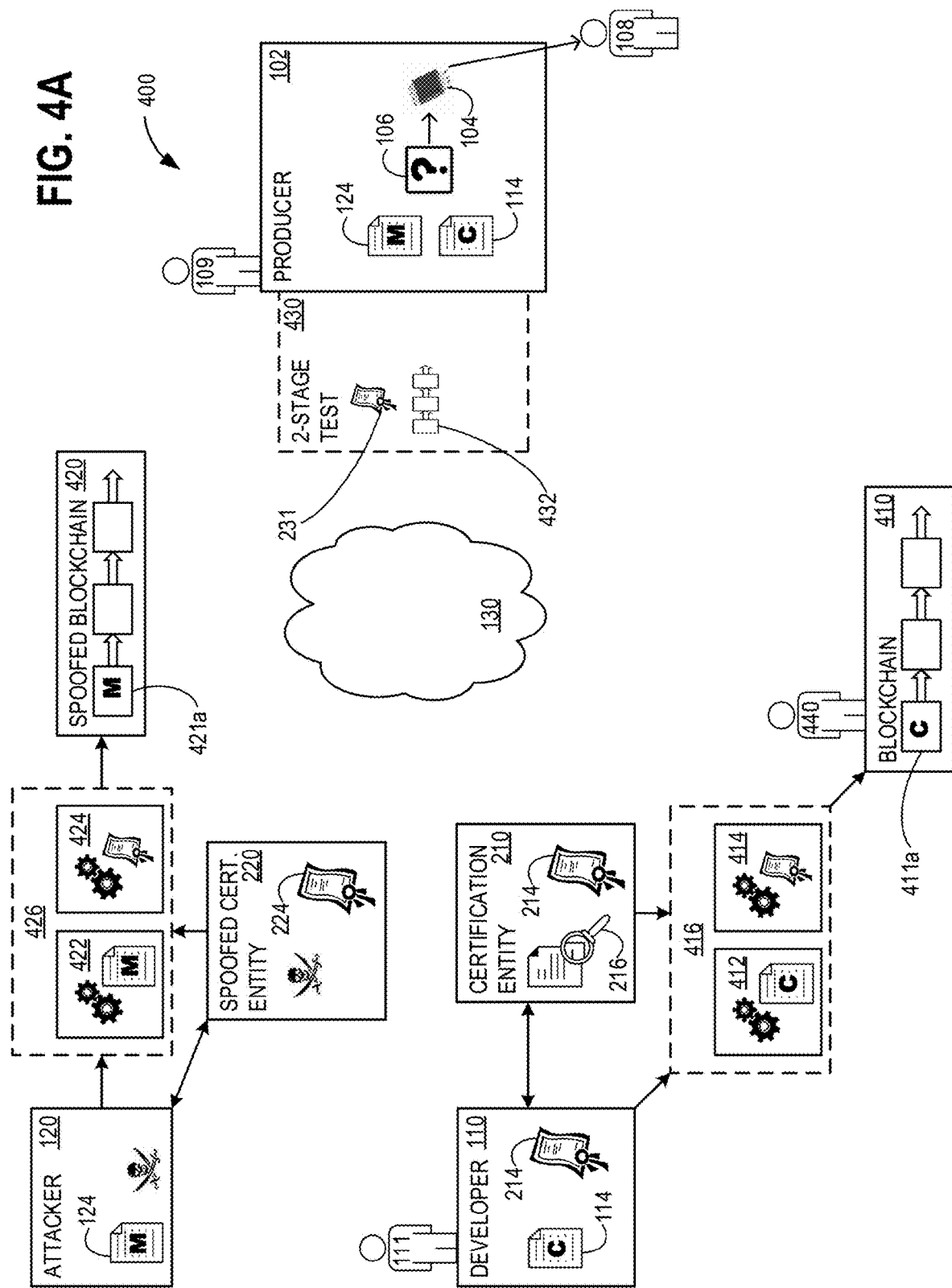

FIG. 4A shows an arrangement 400 that additionally introduces a blockchain 410. In some examples, blockchain 410 uses off-chain storage, in which document content is not stored within blockchain 410, but instead documents are represented by records that contain hash values (hash function message digests) of the documents. The SHA-256 hash function is commonly used in blockchains, although using a combination of SHA-512 and SHA-1, so that a document record contains both a SHA-512 message digest and a SHA-1 message digest, may offer superior resistance to second preimage attacks. A second preimage attack may occur when an attacker alters a first part of a document (which would produce a different message digest) and then alters a second part of the document so that hashing the document produces the original message digest. The advent of quantum computing and some countries' governments funding research by mathematicians means that second preimage attacks against the SHA-256 hash function should not be considered to be computationally infeasible indefinitely. One consideration is that a hash function should be used that accommodates the number of potential data owner entries submitted to the blockchain over its viable operational lifetime, while mitigating hash value collisions.

In some examples, blockchain 410 is operated by a permissioning entity 440 that approves or denies the inclusion of records in blockchain 410. Permissioning entity 440 enforces rules for records, such as format, content (i.e., only message digests and administrative data, such as record linking data), and that the submitter be approved for submitting to the blockchain (i.e., the submitter belongs to a particular organization and/or pays a required fee for the right to submit records). Off-chain storage offers advantages including a more compact blockchain, the ability to exclude problematic material, and the ability to distribute copies of blockchain 410 widely, without also distributing copies of the documents registered within blockchain 410.

Developer 110 and/or certification entity 210 generates records 412 and 414 for digital content 114 and certificate 214, respectively, and submits records 412 and 414 to blockchain 410. For example, record 412 is generated for digital content 114 and record 412 is generated for certificate 214, and may include message digests for digital content 114 and certificate 214, respectively. Further detail on format and content for records is provided in relation to FIGS. 15 and 16, and further detail on generation of message digests is provided in relation to FIG. 11. In some examples, records 412 and 414 are linked with a record link 416. In some examples, record link 416 is the creation of a single record that includes message digests for both digital content 114 and certificate 214. This may be accomplished by hashing the concatenation of digital content 114 and certificate 214, or alternatively by hashing the concatenation of a message digest for digital content 114 and a message digest for certificate 214. In some examples, record link 416 may be cross-reference (or one-way) linking information placed within individual records 412 and/or 414 that reference the other record, as indicated in FIGS. 15 and 16. In some examples, records 412 and 414 are generated using digital signatures of developer 110 and/or certification entity 210, in order to provide for non-repudiation. Digital signatures may be signatures of the data itself (e.g., digital content 114 or certificate 214) or of message digests of the data.

Records 412 and 414 are submitted to permissioning entity 440, along with record link 416, who approves the records and record link 416 for inclusion in blockchain 410. Records 412 and 414, along with record link 416, appear in block 411a of blockchain 410. Block 411a is annotated with a "C" to indicate that it contains record 412 for clean digital content 114. With the availability of blockchain 410 to hold records for digital content 114 and certificate 214, producer 102 adds a second stage, blockchain test 432 (i.e., added to certificate test 231), thereby creating a two-stage test 430 for received digital content. Producer 102 incorporates two-stage test 430 into decision process 106.

Unfortunately, attacker 120 is also aware of blockchain 410 and two-stage test 430, and so spawns a spoofed blockchain 420 that may appear to any user over network 130 to be legitimate blockchain 410. Spoofed blockchain 420 holds a record 422 for malicious digital content 124, a record 424 for false certificate 224, and a record link 426 that links records 422 and 424. Records 422 and 424 and record link 426 may have the same format as records 412 and 414 and record link 416, and therefor appear (at least superficially) to be legitimate. Records 422 and 424, along with record link 426, appear in block 421a of spoofed blockchain 420. Block 421a is annotated with an "M" to indicate that it contains record 422 for malicious digital content 124, which contains malicious logic.

However, together, spoofed blockchain 420 and spoofed certification entity 220 provide the appearance that malicious digital content 124 and false certificate 224 may be as legitimate as digital content 114 and certificate 214. If producer 102 is unaware that attacker 120 (or an entity cooperating with attacker 120) has spawned spoofed blockchain 420 and spoofed certification entity 220, producer 102 may improperly trust spoofed blockchain 420 and spoofed certification entity 220 and include malicious digital content 124 in product 104.

Figure 4B:
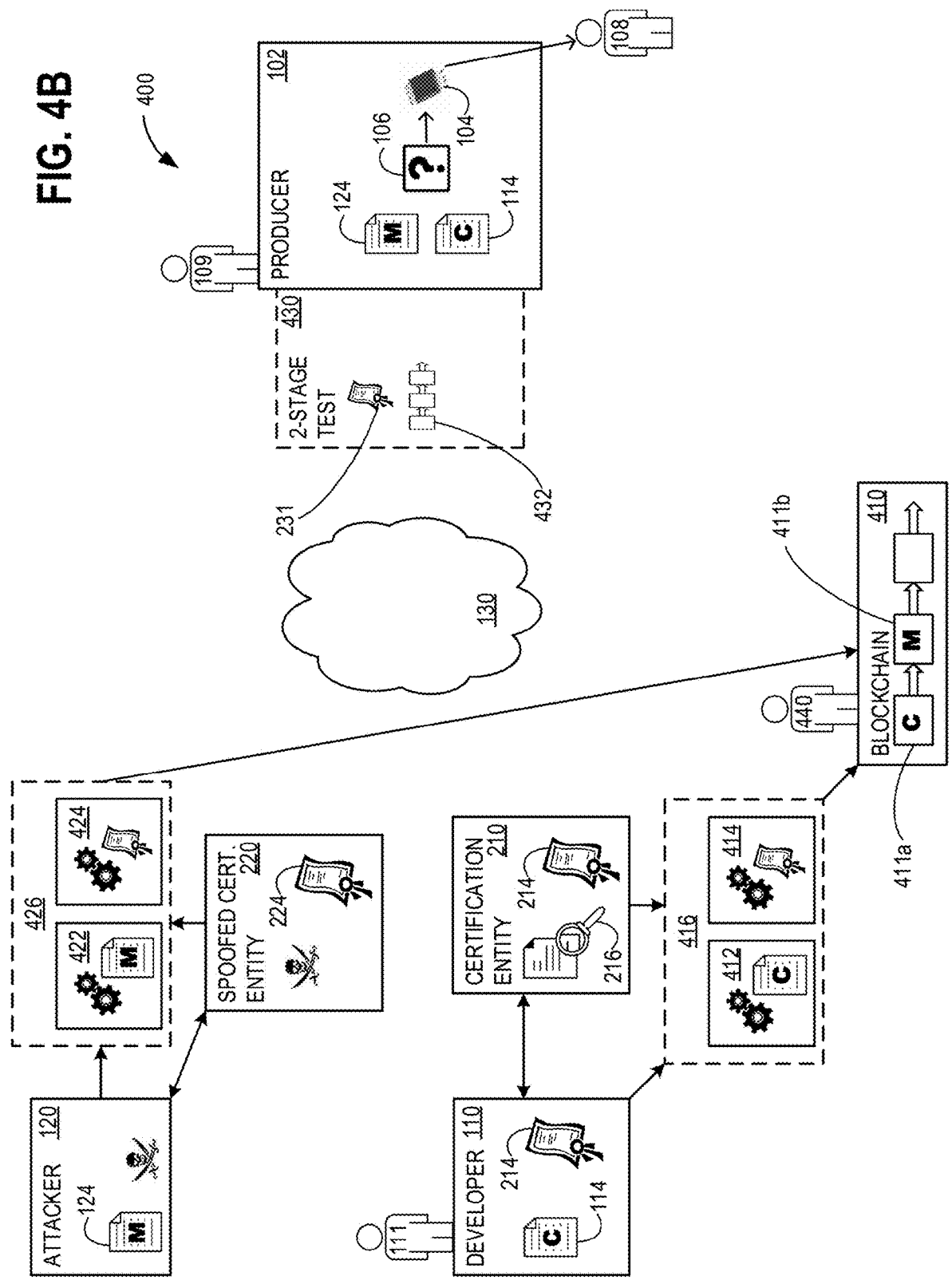

FIG. 4B is an alternative set-up by attacker 120, in which attacker 120 submits records 422 and 424 and record link 426 to blockchain 410. Permissioning entity 440 includes records 422 and 424 and record link 426, either by mistake or because attacker 120 had obtained the credentials necessary to submit records to blockchain 410. Because record 422 contains a message digest for malicious digital content 124, rather than the actual content of malicious digital content 124, permissioning entity 440 is unable to ascertain whether record 422 represents anything containing malicious logic.

An important note, however, is that if the blocks of blockchain 410 are closed out at a sufficiently rapid pace, by the time attacker 120 is able to produce all of malicious digital content 124, record 422, false certificate 224, record 424, and record link 426, block 411 has already been closed. The earliest block for which records 422 and 424 and record link 426 may be included is block 411b of blockchain 410. This may be expected, because attacker may not be aware of the opportunity to produce a malicious logic version of digital content 114 until after digital content 114 is completed. This assumption requires that developer 110 maintain proper security during development so that attacker 120 does not have a head start on producing malicious digital content 124, record 422, false certificate 224, record 424, and record link 426.

Block 411b is annotated with an "M" to indicate that it contains record 422 for malicious digital content 124, which contains malicious logic. This later appearance of record 422 in block 411b (or 421a—which will also be later than block 411a for the reasons described) may be leveraged as described in relation to FIGS. 7 and 8. Unfortunately, arrangement 400 is not configured to use this time difference in the manner that arrangement 600 of FIG. 6 is able do. With brief reference back to FIG. 4A, it is important to note than even though block 421a will be closed after 411a according to true timekeeping, spoofed blockchain 420 may falsify timestamps in order to assist attacker 120 with maintaining the deception that malicious digital content 124 is legitimate.

Figure 5A:
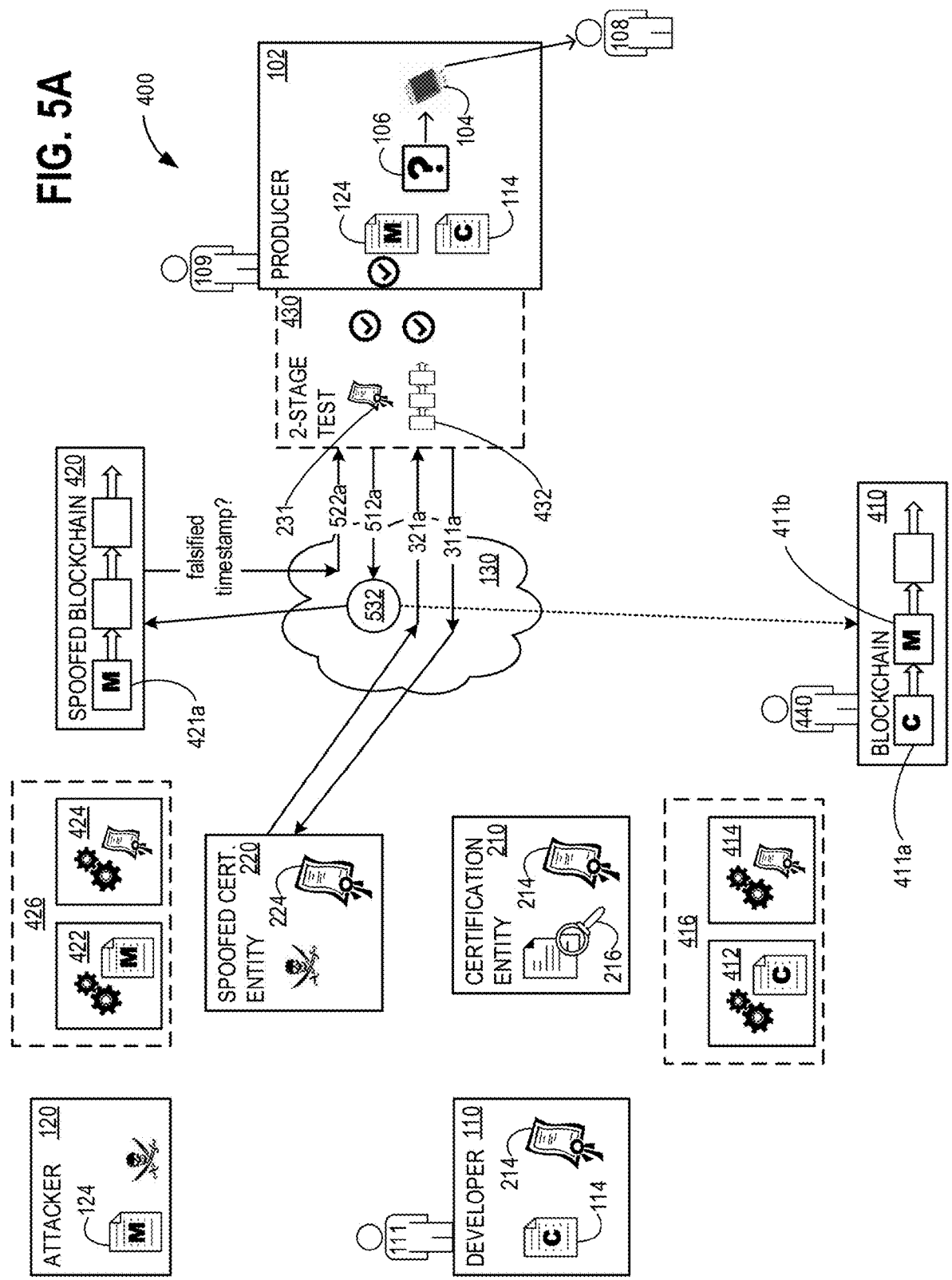

FIG. 5A demonstrates the exploitation of the attack set-up of FIG. 4A. As part of two-stage test 430, producer 102 sends an inquiry 512a, which may have been intended for blockchain 410. However, inquiry 512a is diverted to spoofed blockchain 420, which responds with records 422 and 424 and record link 426 in a response 522a. For example, a router compromise 532 may intercept the IP address of a server holding blockchain 410 (sent from an internet browser or other software run by data consumer 109 in an attempt to obtain a copy of blockchain 410) and replace it with the IP address of spoofed blockchain 420. In some scenarios, response 522a includes a falsified timestamp. Producer 102 has no way to independently validate a timestamp received from spoofed blockchain 420, and so blockchain test 432 passes, improperly. Mistakenly trusting false certificate 224, because of finding records 422 and 424 and record link 426 within spoofed blockchain 420 (and trusting a potentially falsified timestamp), producer 102 improperly identifies malicious digital content 124 as good (i.e., clean of malicious logic) and uses malicious digital content 124 in product 104. Product 104 is thus compromised, potentially harming user 108 or providing attacker 120 with data that user 108 had intended to keep confidential.

Figure 5B:
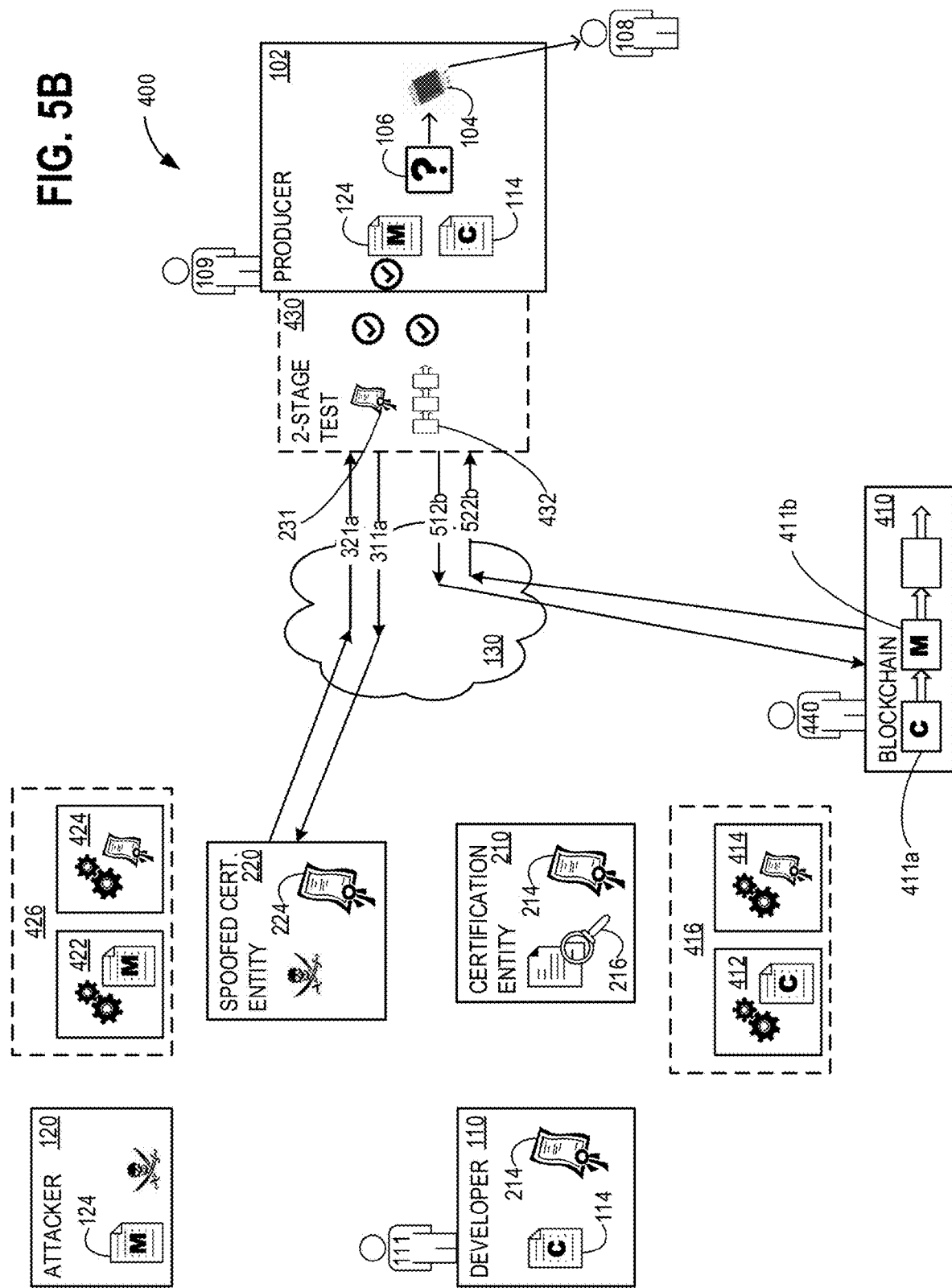

FIG. 5B demonstrates the exploitation of the attack set-up of FIG. 4B. As part of two-stage test 430, producer 102 sends an inquiry 512b to blockchain 410, and feels confident in two-stage test 430 because response 522b can be authenticated as coming from blockchain 410. However, because inquiry 512b was generated for records 422 and 424 and record link 426, which do appear within blockchain 410, the assurance supposedly provided by blockchain 410 should not be trusted. It should be understood that, although blockchains can validate the presence and location of records, they do not actually verify the accuracy or correctness of the contents of those records. Thus, blockchain 410 offers limited value. It does offer value, but the limitations of its value should be properly appreciated.

Figure 6B:
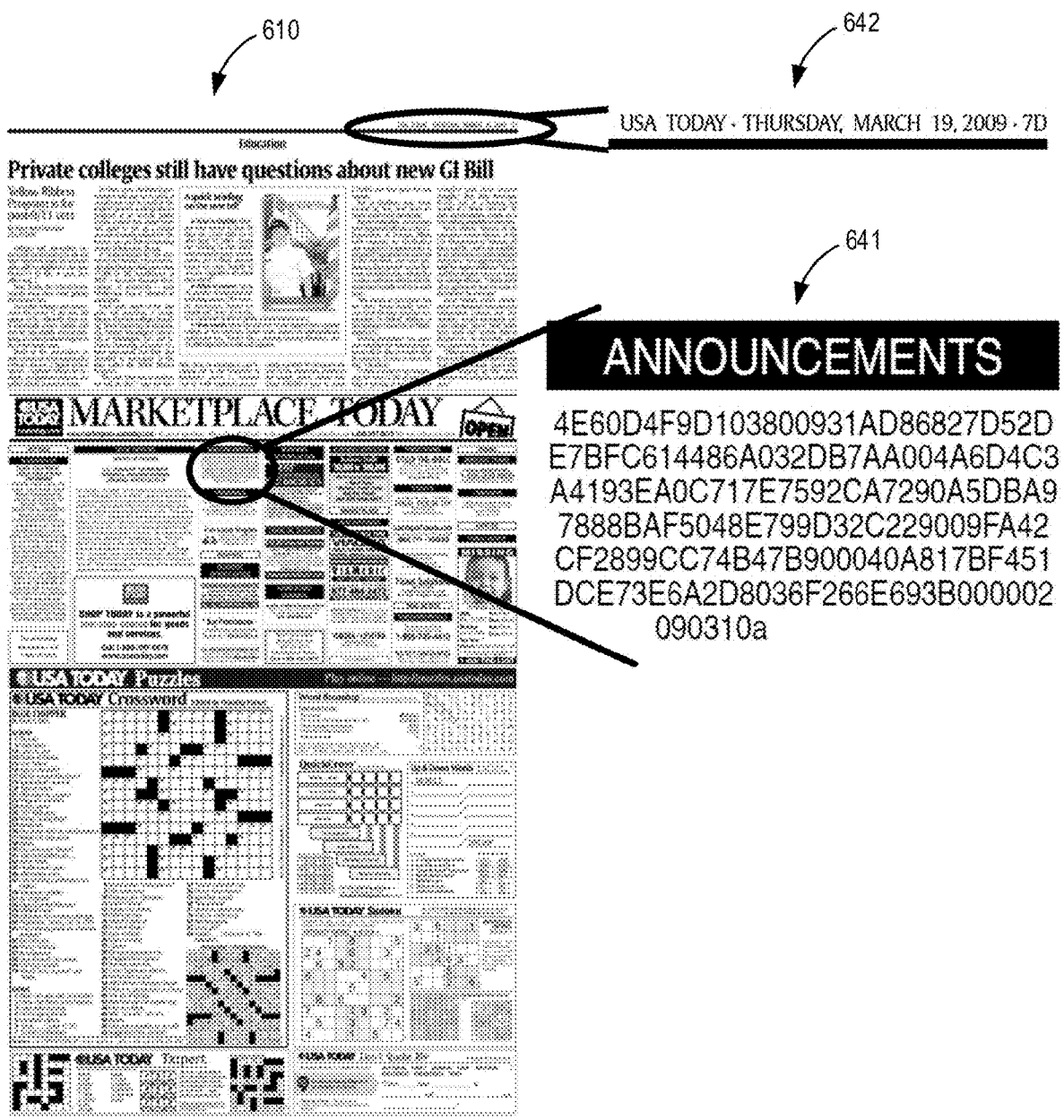
FIG. 6B illustrates an exemplary out-of-band date proof.

FIG. 6A illustrates an exemplary scenario in which a developer leverages a blockchain with out-of-band date proof to pre-emptively frustrate the attacker's efforts shown in FIGS. 1-5B. FIG. 6A shows an arrangement 600 that additionally introduces an out-of-band date proof 610 that may be used to validate timestamps in blockchain 410. Out-of-band date proof 610 may be a public record with easy date verification, and such widespread dissemination that attacker 120 cannot possibly hope to forge all copies of out-of-band date proof 610 that may be available to producer 102. An example out-of-band date proof 610 is illustrated in FIG. 6B, which is a page from the USA Today newspaper. Another example out-of-band date proof 610 may be a notice placed in the Federal Gazette, or another widely-disseminated news source.

Out-of-band date proof 610 has a specific date proof element 641 for a closed block of an example blockchain. Specific date proof element 641 includes a concatenation of a SHA-512 message digest and a SHA-1 message digest for a closed block. Anyone who obtains a copy of that block, and independently hashes it, will be able to trust that the block had existed no later than a provable date 642, merely by comparing the independently-calculated message digests with specific date proof element 641. Provable date 642 may be identified as a specific day on a common calendar 612.

Returning to FIG. 6A, arrangement 600, which is able to advantageously leverage provable date 642 for a record within blockchain 410 will be further described. In addition to obtaining certificate 214, and registering records 412 and 414 and record link 416 in blockchain 410, developer 110 generates a publicity element 611, identifying or describing digital content 114 (e.g., by name and/or function), for out-of-band date proof 610. For example, publicity element 611 may include a description of digital content 114, along with a message digest (e.g., SHA-1, SHA-256, SHA-512, or any concatenated combination). In some examples, publicity element 611 identifies block 411a and/or specific date proof element 641.

A desirable aspect of out-of-band date proof 610 is that, upon publication, it is disseminated so widely that the information contained in the publication is outside the control of anyone. This means that, once published, no one is able to forge a copy without detection, because multiple original (unforged copies) will remain in the possession of a large number of parties, each with disparate interests. For example, producer 102 and user 108 may obtain copies of out-of-band date proof 610 shortly after its publication with publicity element 611 and/or specific date proof element 641. Producer 102 and user 108 may retain their own copies, under their own control, so that at a later time, when they receive digital content 114 (i.e., producer 102 receives digital content 114 directly, whereas user 108 receives digital content 114 within product 104), producer 102 and user 108 have the ability to independently verify a no-later-than date-of-existence for digital content 114 using out-of-band date proof 610. This means that, if attacker 120 did not have time to forge malicious digital content 124 prior to the verifiable no-later-than date-of-existence for digital content 114, producer 102 and user 108 have the ability to screen out malicious digital content 124 from use by user 108 in product 104, no matter how skilled attacker 120 may be in disguising the malicious logic. In some examples, out-of-band date proof 610 provides an electronic interface 610a, such as a searchable website storing archives of past publications.

This provides an advantageous feature of the disclosure over blockchains that do not leverage an out-of-band date proof mechanism. Aspects of the disclosure provide for independent, external verification of blockchain content. Such a feature may not be available in traditional blockchains.

Upon entering records 412 and 414 and record link 416 in blockchain 410, and closing block 411a, permissioning entity 440 publishes blockchain 410 for dissemination and generates specific date proof element 641 for closed block 411a. Out-of-band date proof 610 publishes specific date proof element 641 and publicity element 611, and disseminates copies so widely, that attacker 120 has no opportunity to forge all of the copies. Certification entity 210 may also publicize the date that certification entity 210 certifies digital content 114, as this date may likely be delayed due to length of the certification process 216. This provides a second out-of-band date proof to mitigate possible collusion between developer 110 and attacker 120 who might attempt to undermine certification entity 210. In some examples, certification entity 210 may be a government entity, for example a Department of Defense (DoD) or other US government entity.

Permissioning entity 440 may use the later out-of-band date proof (e.g., a later version of out-of-band date proof 610) for certificate 214 from certification entity 210 to verify the date for certificate 214 and/or use both out-of-band date proof 610 for digital content 114 and the later out-of-band date proof for certificate 214 to ensure that it is digital content 114, and not malicious digital content 124 that is registered in blockchain 410. The use of widespread publicity and public records that are too widely dispersed, with too many copies, to be altered after dissemination, along with blockchain 410 being publicly inspectable provides a mechanism for c records as a mechanism to provide ongoing defense against a Byzantine fault. Even in the event that one of developer 110, certification entity 210, and permissioning entity 440 colludes with attacker 120 to substitute malicious digital content 124 for digital content 114, a data consumer 109 (e.g., producer 102 and/or user 108) would be able to detect this attempt and avoid inadvertently using malicious digital content 124 if 109. The use of digital signatures by developer 110, certification entity 210, and permissioning entity 440 within records of blockchain 410 further hardens this protection. The larger the community of data consumers (e.g., community 2120 of FIG. 21) that inspects blockchain 410 and verifies the integrity of records and blocks against out-of-band date proof 610, and verifies the digital signatures of developer 110, certification entity 210, and permissioning entity 440, the more robust blockchain 410 becomes against forgery attempts.

At this point, anyone will be able to ascertain with certainty that records (e.g., records 412 and 414) that appear within block 411a existed no later than provable date 642 (of FIG. 6B), but no such certainty may exist for any records (e.g., records 422 and 424) that only just first appeared within block 411b. Thus, out-of-band date proof 610 provides a way to differentiate between digital content 114 and malicious digital content 124.

Producer 102 adds a calendar test 633 to certificate test 231 and blockchain test 432, to create a three-stage test 630 for received digital content, to use in decision process 106. As will be described in relation to FIG. 7, calendar test 633 is able to differentiate between digital content 114 and malicious digital content 124.

Figure 7:
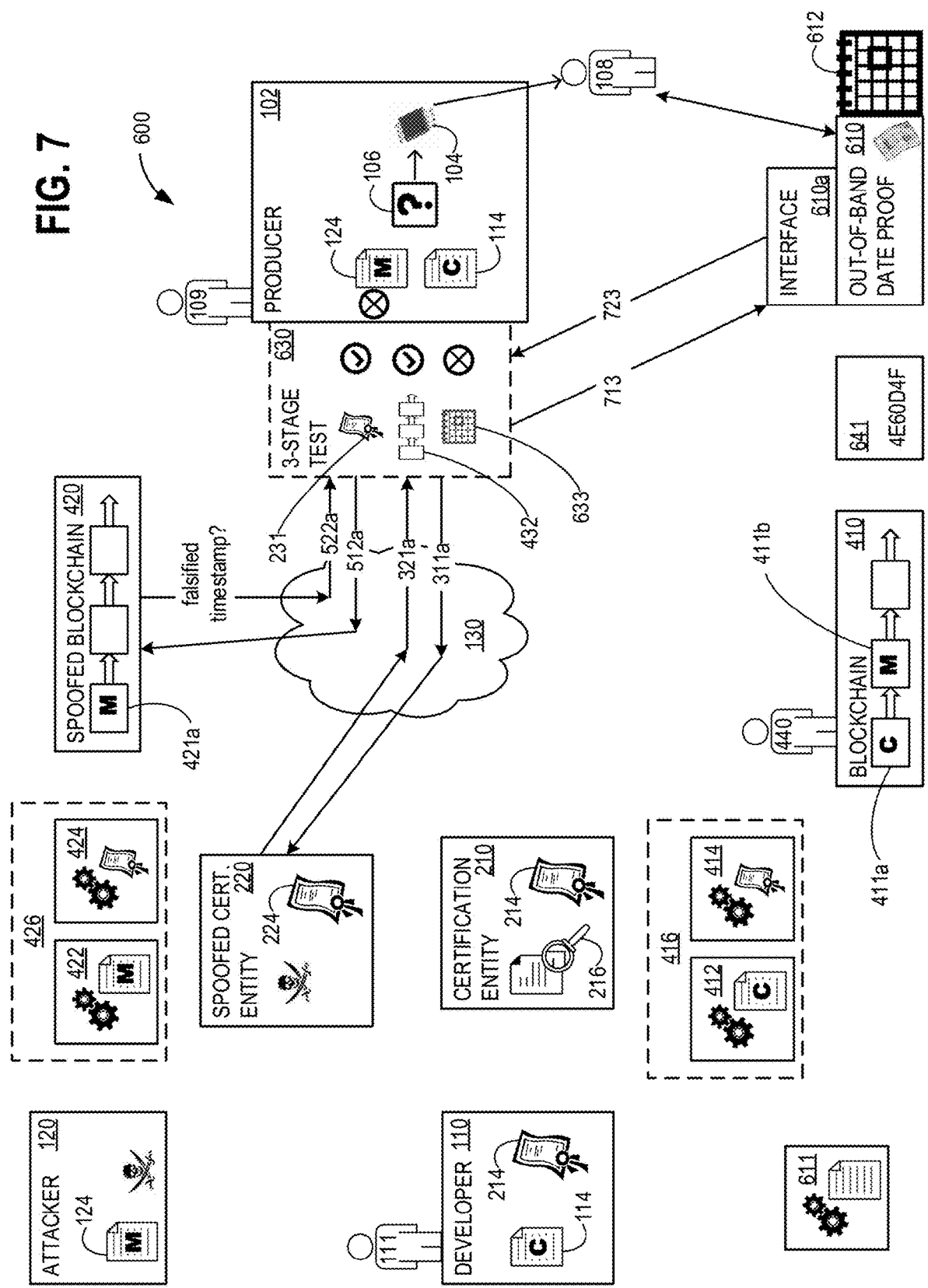
FIGS. 7 and 8 illustrate an exemplary scenario in which the producer detects the attacker's efforts and correctly decides to use the developer's digital content.
Figure 8:
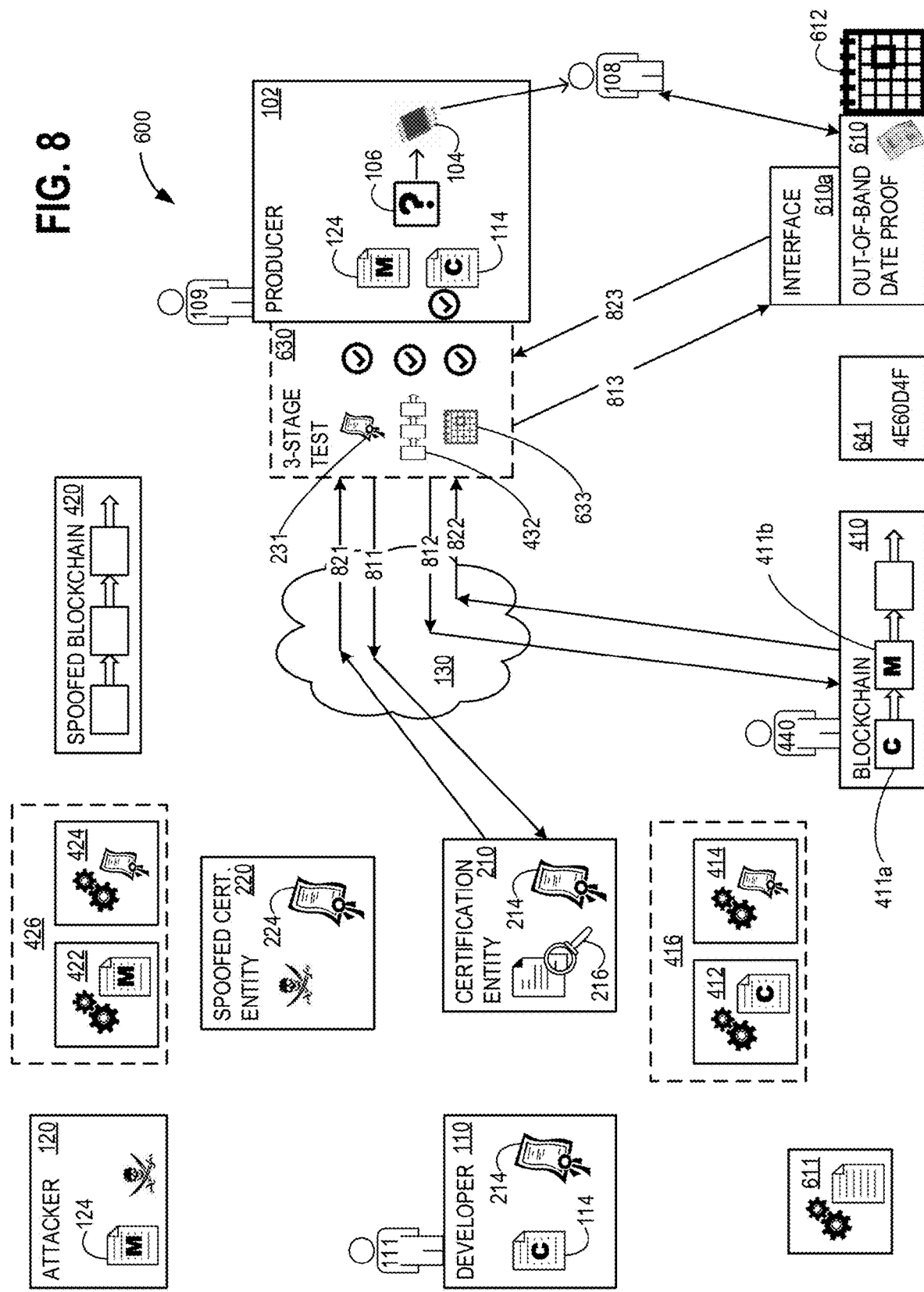

FIGS. 7 and 8 illustrate an exemplary scenario in which the producer detects the attacker's efforts and correctly decides to use the developer's digital content. FIG. 7 demonstrates how producer 102 leverages out-of-band date proof 610 to detect that attacker 120 is attempting to substitute malicious digital content 124 (with malicious logic) for clean digital content 114—even when attacker 120 expends sufficient effort to create plausible false certificate 224, false records 422 and 424, and/or spoofed blockchain 420 with falsified timestamps. In some examples, producer 102 queries out-of-band date proof 610 electronically, using electronic interface 610a, or using a published paper copy available at a library, or using a trusted repository of archived document that may be unknown to attacker 120. In some examples, producer 102 consults its own copy of out-of-band date proof 610 that it obtained per FIG. 6A. User 108 may also independently query out-of-band date proof 610, or use its own copy of out-of-band date proof 610.

Despite certificate test 231 and blockchain test 432 passing with malicious digital content 124, when calendar test 633 compares date information for malicious digital content 124 (e.g., a timestamp from spoofed blockchain 420) with out-of-band date proof 610, calendar test 633 fails. This may be because an inquiry 713 to out-of-band date proof 610 results in a response 723 that fails to provide confirmation of the relevant date. This may be because no message digest or specific date proof element 641 can be found to exist as of the date identified in publicity element 611, that links to malicious digital content 124. If any reference to malicious digital content 124 does exist within out-of-band date proof 610, it will be for a later block (e.g., block 411b).

FIG. 8 demonstrates how producer 102 is able to trust digital content 114, so that digital content 114 may be used in product 104. Certificate test 231 passes when an inquiry 811 to certification entity 210 results in a response 821 that identifies certificate 214. Blockchain test 432 passes when an inquiry 812 to blockchain 410 results in a response 822 that identifies records 412 and 414 and record link 416. Calendar test 633 passes when an inquiry 813 to out-of-band date proof 610 results in a response 823 that identifies specific date proof element 641 that matches publicity element 611.

FIGS. 9 and 10 illustrate a process of using arrangement 600, and should be viewed together, along with FIGS. 6 and 8. FIG. 9 is in a flowchart form, showing a flowchart 900, and FIG. 10 is in a message sequence form, showing a message sequence diagram 1000. In some examples, at least a portion of flowchart 900 may be performed using one or more computing devices 2600 of FIG. 26. Developer 110 develops digital content 114 at 902, and data owner 111 (which may be developer 110 or another entity acting as the primary data owner in place of developer 110) submits digital content 114 to certification entity 210 at 904. Certification entity 210 examines digital content 114 for malicious logic (using certification process 216) at 906 and, finding no malicious logic, certifies digital content 114 with certificate 214 at 908. Certification entity 210 sends certificate 214 to data owner 111 at 910.

Data owner 111 (or alternatively, certification entity 210) generates record 412 for digital content 114 at 912, generates record 414 for certificate 214 at 914, and links records 412 and 414 with record link 416 at 916. Data owner 111 (or alternatively, certification entity 210) generates publicity element 611 to publicize the date of the certification of digital content 114 and submits it to out-of-band date proof 610 at 918. At a later stage, publicity element 611 will provide the no-later-than date-of-existence for record 412, to which specific date proof element 641 will be compared. Thus, it may be preferable for data owner 111 to craft publicity element 611 to refer to provable date 642 for specific date proof element 641. This may require publishing publicity element 611 contemporaneously, or shortly after publishing specific date proof element 641. The shorter the delay between publishing specific date proof element 641 and publishing publicity element 611, the less time attacker 120 will have to race to completion of malicious digital content 124 with malicious logic. Data owner 111 (or alternatively, certification entity 210) submits records 412 and 414 and record link 416 to blockchain 410 (via permissioning entity 440) at 920.

Permissioning entity 440 approves records 412 and 414 and record link 416 for inclusion in blockchain 410 at 922 and enters them into (currently open) block 411a at 924. Permissioning entity 440 closes block 411a at 926 and publishes the latest version of blockchain 410 with block 411a at 928. In some examples, blocks are closed out on a schedule, such as hourly, daily, or upon the lapse of another set time period. At 930, permissioning entity 440 generates specific date proof element 641 for block 411a, which may be one or more message digests of block 411a that are used to chain block 411a with subsequent block 411b. Permissioning entity 440 also submits specific date proof element 641 for block 411a to out-of-band date proof 610 for publication and wide dissemination. Out-of-band date proof 610 is available to both producer 102 at 930a and user 108 at 930b, as shown in FIG. 10. Producer 102 and user 108 may retain their copies of out-of-band date proof 610 under their own control so that, at a later time, they may trust their own copies of out-of-band date proof 610 (at 940b and 948c, described below). Together, operations 902-930 form an integrity and date proof set-up operation 932.

Operations 934-948 together form an integrity and date verification operation 950. At 934, producer 102 receives digital content candidates, for example clean digital content 114 from data owner 111 and also malicious digital content 124 from attacker 120. At this point, producer 102 does not know which of digital content 114 and malicious digital content 124, if either, should be trusted. Producer 102 performs certificate test 231 at 936, for example determining whether certificate 214 exists for digital content 114. In some examples, producer 102 queries certification entity 210 directly, at 936a (FIG. 10), as part of certificate test 231. If certificate test 231 fails, producer 102 will reject the digital content candidate at 952, and move to the next digital content candidate. However, for the examples, digital content 114 and malicious digital content 124, certificate test 231 is passed. Producer 102 performs blockchain test 432 at 938, for example determining whether records for certificate 214 and digital content 114 may be found within blockchain 410 and are linked. In some examples, producer 102 queries blockchain 410 directly, at 938a (FIG. 10), as part of certificate test 2432. If blockchain test 432 fails, producer 102 will reject the digital content candidate at 950, and move to the next digital content candidate. However, for these examples, digital content 114 and malicious digital content 124, blockchain test 432 is passed (with malicious digital content 124 being found within spoofed blockchain 420).

Producer 102 performs calendar test 633 at 940, for example, determining whether specific date proof element 641 matches a provable no-later-than date-of-existence found in publicity element 611 that describes or identifies digital content 114. In some examples, producer 102 queries out-of-band date proof 610 directly, at 940a (FIG. 10), as part of calendar test 633. In some examples, producer 102 queries out-of-band date proof 610 electronically, using electronic interface 610a, or using a published paper copy available at a library, or using a trusted repository of archived document that may be unknown to attacker 120. In some examples, producer 102 consults its own copy of out-of-band date proof 610 that it obtained at 940b.

If calendar test 633 fails, producer 102 will reject the digital content candidate at 950, and move to the next digital content candidate. Malicious digital content 124 will fail at this point, because the earliest provable no-later-than dateof-existence is the date of block 411*b*, which is after the date of block 411*a*. However, for digital content 114, calendar test 633 is passed. Producer 102 identifies digital content 114 as clean from malicious logic at 942, uses digital content 114 in product 104 at 944, and delivers product 104 to user 108 at 946. At 948, user 108 is able to independently check that digital content 114, represented by producer to be within product 104 had been registered in blockchain 410 no later than the date indicated by out-of-band date proof 610. In some examples, user 108 queries blockchain 410 directly at 948*a* (FIG. 10) and then queries out-of-band date proof 610. In some examples, user 108 queries out-of-band date proof 610 directly, at 948*b*, for example electronically, using electronic interface 610*a*, or using a published paper copy available at a library, or using a trusted repository of archived document that may be unknown to attacker 120. In some examples, user 108 consults its own copy of out-of-band date proof 610 that it obtained at 948*c*.

Figure 11:
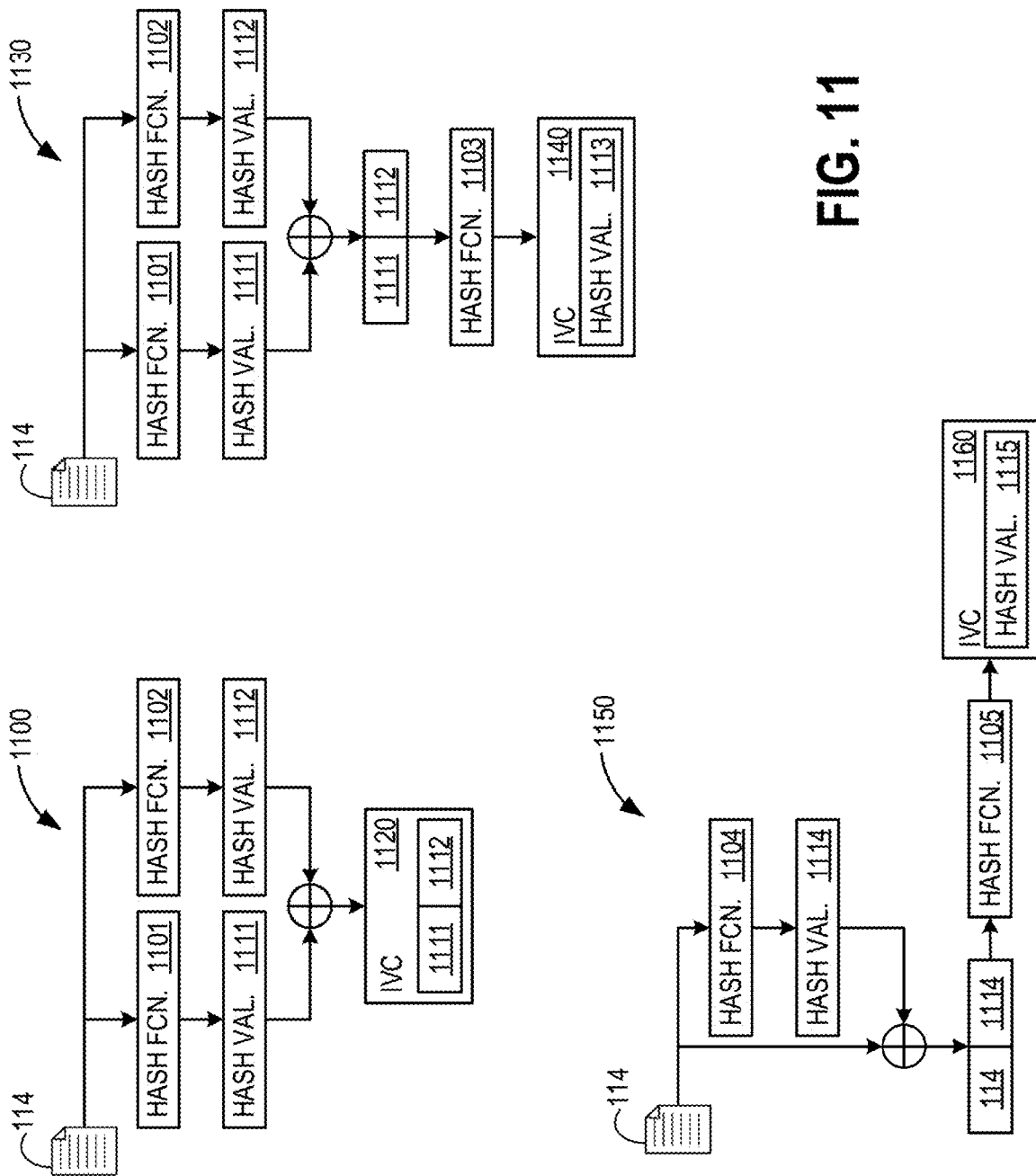
FIG. 11 illustrates various options for generating message digests (hash values) for digital content, to link records, and/or to link blocks.

FIG. 11 illustrates three generic arrangements for generating message digests (indicated in the figure as hash values) for digital content, to chain records, and/or to chain blocks of the blockchain. In an arrangement 1100, digital content 114 is passed to two hash functions, hash function 1101 and hash function 1102. Each of these may be, for example, any of the hash functions in the SHA family, such as the SHA-1, SHA-2 family, or SHA-3 family, or another hash function. In one example, hash function 1101 is the SHA-256 and hash function 1102 is the SHA-512. In some examples, hash function 1101 is the SHA-1. Although the SHA-1 has a shorter message digest than the SHA-256, and already has reported collisions, it uses a different computational structure than the SHA-512. In contrast, the computational structures of the SHA-256 and the SHA-512 are similar. There is a possibility that, if a computational exploit is found to shortcut a second preimage attack against the SHA-256 (as opposed to a brute force attack), there may be synergistic effects for a computational exploit to facilitate a second preimage attack against the SHA-512. Such a scenario means that a single computational exploit may weaken arrangement 1100 when hash function 1101 is the SHA-256 and hash function 1102 is the SHA-512. In contrast, without a computational exploit that is simultaneous for both the SHA-1 and the SHA-512, even if computational exploits are found for each hash function independently, the use of a computational exploit against one hash function may still require a brute force attack against the other. In such a scenario, the use of the SHA-1 as hash function 1101 and the SHA-512 as hash function 1102 may actually be a stronger combination than using the SHA-256 as hash function 1101.

Hash function 1101 outputs its message digest as hash value 1111, and hash function 1102 outputs its message digest as hash value 1112. These are concatenated to produce an integrity verification code (IVC) 1120. As used herein, an IVC may be a full message digest, a partial message digest, or a combination (e.g., concatenation, or other combination) of two or more message digests. For example, the SHA-224 has a truncated message digest (by 32 bits) relative to the SHA-256, and the SHA-384 has a truncated message (by 128 bits) digest relative to the SHA-512. In some examples, the first or final octet of hexadecimal values of a message digest may be used, or a larger portion. IVC is used herein interchangeably with the terms hash value and message digest.

An arrangement 1130 is similar, but with an extra step. The concatenation of hash values 1111 and 1112 are passed to a hash function 1103, which outputs its message digest as hash value 1113. Hash value 1113 is indicated as being represented interchangeably with an IVC 1140. Hash function 1103 may be the same or different as hash function 1101 or 1102. One potential advantage to using arrangement 1130 is that a successful second preimage attack for hash value 1113 may still requires successful second preimage attacks for both hash values 1111 and 1112, while still using the message digest length of only hash value 1113.

A variation of arrangement 1130 is shown as arrangement 1150 in which digital content 114 is hashed with hash function 1104 to produce hash value 1114, and hash value 1114 is concatenated with (appended to, or the reverse) digital content 114 to be hashed with hash function 1105 to produce hash value 1115 (IVC 1160). The concatenation of hash value 1114 and digital content 114 can occur in either order, with either hash value 1114 or digital content 114 being first or second. In some examples, digital content 114 is sandwiched between two different hash functions, and the concatenation of the three items is hashed. Hash function 1105 may be the same or different as hash function 1104. In some examples, arrangement 1150 may be quicker than arrangement 1130, because there are only two hash function calculations in arrangement 1150, whereas there are three hash function calculations in arrangement 1130. Even when hash function 1105 is the same as hash function 1104, resistance to a second preimage attack is increased over that of hash function 1104 alone (although perhaps not substantially for computational exploits). This is because not only must the second preimage attack for hash value 1114 be successful, but also the second preimage attack for the concatenation of digital content 114 with hash value 1114 (i.e., a second preimage attack against hash value 1115).

Figure 12:
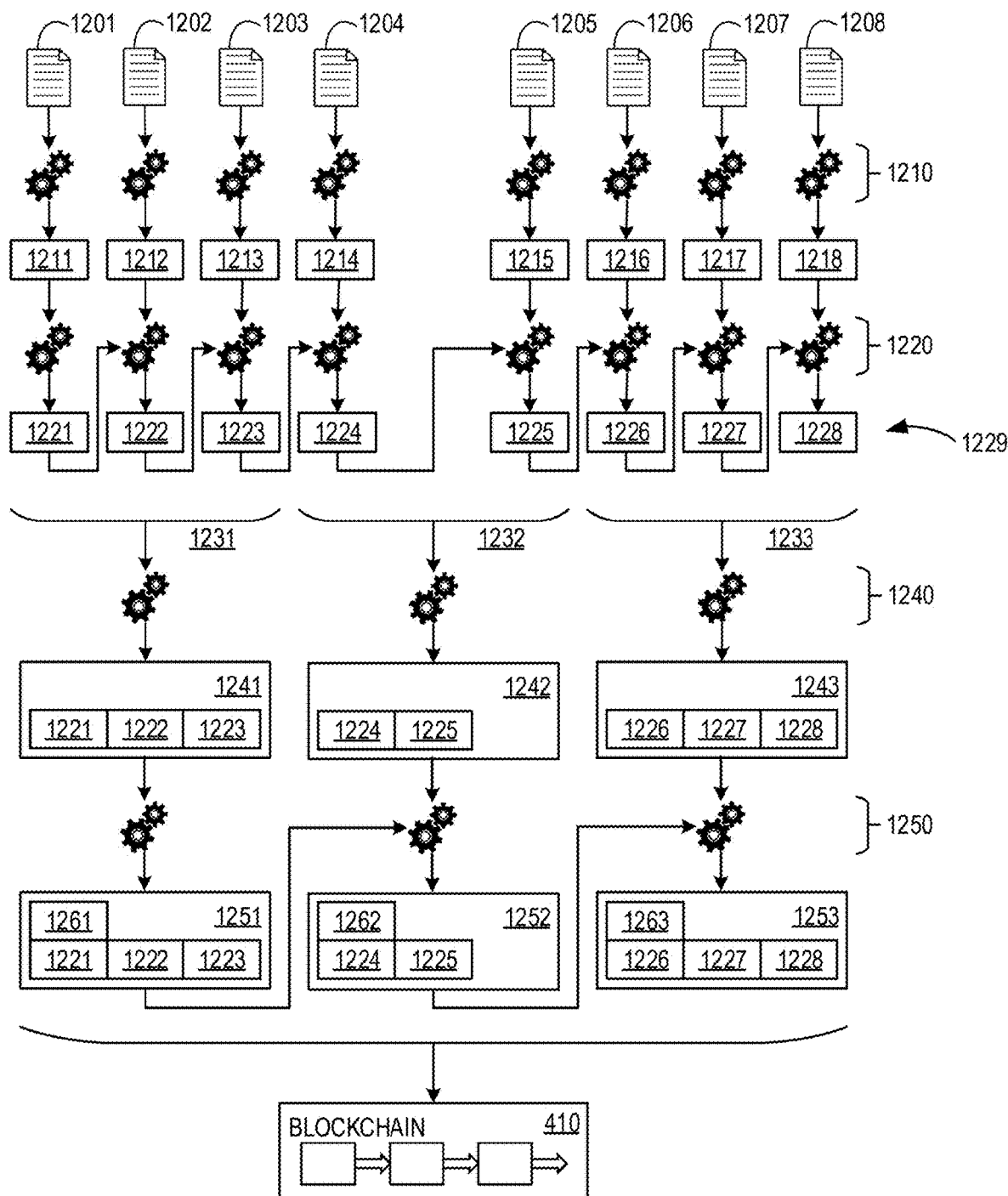
FIG. 12 illustrates a process of generating records for digital content, chaining records, assembling blocks, and chaining blocks to produce a blockchain with multi-tier chaining.

FIG. 12 illustrates a process of generating records for digital content, chaining records, assembling blocks, and chaining blocks to produce a blockchain with multi-tier chaining. Multi-tier chaining provides a level of defense for rendering blockchain operations resistant to advanced persistent threats (APTs) that may reside within a computer network 2030 of permissioning entity 440 (See FIGS. 4A and 20). If blockchain 410 is used for establishing trust in sufficiently significant digital content (e.g., high-value military-related information, attacker 120 may attempt to place malicious logic (e.g., an APT) within computer network 2030 used by permissioning entity 440 to generate blockchain 410. The specific action of this APT may be unpredictable, and it may remain undetected for an extended period of time. Therefore, at least some level of defense against a potential APT may be desirable.

The basic idea is that records, for various digital content, are chained together at a first chaining tier (creating a "record chain"), and the chained records are placed into blocks that are chained together at a second chaining tier (creating the blockchain, e.g., blockchain 410). The records for the digital content contain message digests (hash values, IVCs, which may be partial or full message digests, and may include combinations) for the digital content. The message digests for the digital content may be considered to be the primary record "payload" because the message digests provide an aspect of trust. Candidate fields for record content are illustrated in FIG. 15.

In some examples, the digital content is submitted to permissioning entity 440, and permissioning entity stores the digital content (acting as a data custodian) and generates the records. In some examples, the generator of the digital content (e.g., developer 110) generates the records and submits only the records to permissioning entity 440, and permissioning entity 440 does not see the digital content. In either case, permissioning entity 440 chains the individual records (similar to the Haber-Stornetta approach, although there may be some differences.) This provides a record of the order-of-arrival of the individual records.

The permissioning entity sets a block accumulation period, starting with the closing of the prior block, and lasting until the closing of the current block. Records that arrive during the current block accumulation period are assigned to the current block. The current block is chained to the prior block using a message digest, and in some examples, a record that has the same format (i.e., the same fields and length) as a record for digital content. Upon expiration of the current block accumulation period, the current block is closed, meaning that no new records are added to it. A message digest is generated for the current block, which will appear in the subsequent block, for example, as a record for the current block. Out-of-band date proof (e.g., out-of-band date proof 610) is generated using the message digest or record for the current block, and is publicized for data consumers 109.

Data consumers 109 may download copies of the blockchain, including the now-closed (formerly current) block. That block will cement the sequence of prior blocks, with its record (or message digest) of the immediately prior block, and will also indicate the order-of-arrival of the records within that block, as received by permissioning entity 440. In some scenarios, data consumers 109 may not obtain a copy of the blockchain until significant time has elapsed, for example, several years. Out-of-band date proof has an associated cost, and so in high-volume blockchain operations, (e.g., hundreds or thousands of records per day), it is not cost-effective to generate out-of-band date proof for each individual record. This is why the Haber-Stornetta solution generated classified advertisements on only a weekly basis, rather than as each new hash value was generated for each incoming document.

However, with blocks closed out on a schedule, such as once daily, three times daily, or even hourly (possibly during business hours during weekdays and less often during weekends and holidays), generating out-of-band date proof for each block is feasible. The blocks each provide proof for no-later-than date-of-existence assertions for all digital content that is represented by records with in that block. The trade-off is reduced time resolution for no-later-than date-of-existence (i.e., all records have the same provable date, no matter when they arrived during the block accumulation period) in exchange for external, independent verification by data consumers 109.

Thus, properly-informed data consumers 109 will only trust the date-of-existence of the now-closed (formerly current) block as of the provable date of the out-of-band date proof—and will not trust the order-of-arrival of the records within that block. This is because, even if permissioning entity 440 is perfectly honest, an APT on computer network 2030 of permissioning entity 440 may have attempted to maliciously alter the order-of-arrival information, or even the records themselves, during the block accumulation period. In some cases, for example, the APT may even generate a new record chain, so that the record chain appearing within the block appears to be legitimate. So, the order-of-arrival information indicated within the record chain has some informative value, and may be entirely accurate, but is not independently verifiable by data consumers 109, and should therefore not be fully trusted by data consumers 109.

One aspect of value for the record chaining, however, is enabling permissioning entity 440 to detect the presence of the APT. One possible approach is that, during the block accumulate period, permissioning entity 440 sends out the latest message digest that chains the most recently-received (or generated) record to the immediately prior one (i.e., the chaining message digest). For example, the chaining message digest may be sent to data owner 111 for the digital content that corresponds to the most recently-received (or generated) record, or to some other destination outside of computer network 2030 of permissioning entity 440. In some examples, this may be accomplished immediately upon the chaining message digest being generated, in order to minimize the time for the APT to enact malicious alterations.

When the block is closed and publicized, each data owner 111 that has digital content corresponding to a record within the now-closed block, should check that the record for their content is within the block, and that the record has the proper chaining message digest. If either of these conditions is not met, data owner 111 should inform permissioning entity 440. Such a detection mechanism may deter attacker 120 from exposing any APTs that may be present on computer network 2030 of permissioning entity 440. Even though permissioning entity 440 and all of data owners 111 may be satisfied that the now-closed block has correct order-of-arrival information for all of the records, this agreement among permissioning entity 440 and any data owners 111 nevertheless does not constitute a basis for data consumers 109 to trust order-of-arrival information for the records at a future date.

In the event that the detection fails, such as additional falsified records had been added into the block, the damage to trust in the blockchain is limited, because at least the legitimate records retain the proof for no-later-than date-of-existence. Note that a record being absent from a block (e.g., being altered or deleted by the APT), and thus losing its proof for no-later-than date-of-existence, is an easily-detectable condition by a vigilant data owner 111. The damage in such a scenario is that the no-later-than date-of-existence is delayed until the close-out of a subsequent block.

With more specific reference now to FIG. 12, a set of eight digital content files 1201-1208 are shown. For example, digital content 114 may be stored as one of digital content files 1201-1208. A record generator 1210 generates a set of corresponding records 1211-1218 that each includes a message digest for a respective one of digital content files 1201-1208, along with other information to improve the utility of the records. Further information regarding the content of records is provided in relation to FIG. 15. A record chainer 1220 inserts, into each of records 1211-1218, a message digest for the digital content file that had been received immediately prior, to produce a set of chained records 1221-1228. For example, digital content file 1201 is received first, and record 1211 is generated for digital content file 1201, with a message digest for digital content file 1201. No record had been generated or received earlier, so chained record 1221 has a set of padding zeros in the field within chained record 1221, in the field that is reserved for the message digest for the immediately prior record.

Digital content file 1202 is received, next, after digital content file 1201, and record 1212 is generated for digital content file 1202, with a message digest for digital content file 1202. Chained record 1221 had been generated earlier, so chained record 1222 has the message digest for chained record 1221 within chained record 1222, in the field that is reserved for the message digest for the immediately prior record. Digital content file 1203 is received, next, after digital content file 1202, and record 1213 is generated for digital content file 1203, with a message digest for digital content file 1203. Chained record 1222 had been generated earlier, so chained record 1223 has the message digest for chained record 1222 within chained record 1223, in the field that is reserved for the message digest for the immediately prior record. This continues on, until digital content file 1208 is received after digital content file 1207. Record 1218 is generated for digital content file 1208, with a message digest for digital content file 1208. Chained record 1227 had been generated earlier, so chained record 1222 has the message digest for chained record 1227 within chained record 1228, in the field that is reserved for the message digest for the immediately prior record. In this manner, chained records 1221-1228 are chained into a record chain 1229.

A block generator 1240 assembles chained records 1221, 1222, and 1223 into a block 1241, because they were generated during a block accumulation period 1231. Block accumulation period 1231 may be based on a schedule, such as an hour, a number of hours, a day (plus perhaps a weekend or holiday period), or some other criteria, such as a threshold number of records accumulating. See for example, the description of operation 926 of FIG. 9, which describes the termination (close-out) of a block accumulation period.

Similarly, chained records 1224 and 1225 are placed into a block 1242, because they are generated during a block accumulation period 1232, and chained records 1226, 1227, and 1228 are placed into a block 1243, because they are generated during a block accumulation period 1233. A block chainer 1250 chains blocks 1241, 1242, and 1243 to created chained blocks 1251, 1252, and 1253. Block chainer 1250 creates chaining records 1261, 1262, and 1263 for chained blocks 1251, 1252, and 1253 by generating a message digest for the immediately preceding chained block. In some examples, each of chaining records 1261, 1262, and 1263 resembles one of chained records 1221-1228, although with the payload message digest being for the prior chained block, rather than a digital content file. Chaining record 1261 may be largely padded with zeros, since there is not an immediately prior block.

Chaining record 1262 has a message digest for chained block 1251 (or, in some examples a header of chained block 1251), in which the message digest calculations include chaining record 1261. Chaining record 1263 has a message digest for chained block 1252 (or, in some examples a header of chained block 1252), in which the message digest calculations include chaining record 1262. This chains each of chained blocks 1251-1253 into at least a portion of blockchain 410. In some examples, blockchain 410 uses fixed-size records, with variable-sized blocks. In such examples, the sizes of the blocks depend on the number of records (or documents, for which records are generated) arriving during a block accumulation period.

FIG. 13 illustrates various options for the multi-tier chaining, for example relating chained records 1221-1228 with chaining records 1261-1263. In an arrangement 1301, chained records 1221-1228 and chaining records 1261-1263 are not interspersed, but instead show two parallel, independent chains. That is, chained records 1221-1228 are not altered, their original chaining remains intact, and chaining records 1261-1263 are chained directly together, using the field that is reserved for the message digest for the immediately prior record. For example, chaining record 1262 has a payload message digest for block 1251, but in the field that is reserved for the message digest for the immediately prior record (i.e., the corresponding field in which chained records 1221-1228 are chained) chaining record 1262 has a message digest for chaining record 1261. Thus, chaining record 1262 contains a first message digest for block 1251 (the payload), and a second message digest for chaining record 1261. Similarly, chaining record 1263 contains a first message digest for block 1252 (the payload), and a second message digest for chaining record 1262.

In an arrangement 1302, however, record chain 129 is interwoven with chaining records 1261-1263. That is, chained record 1221 is now chained to chaining record 1261, using the field that is reserved for the message digest for the immediately prior record. Chaining record 1262 is inserted between chained record 1223 and chained record 1224. Chaining record 1262 still has the same payload (the message digest for block 1251), but now has a message digest for chained record 1223 in the field that is reserved for the message digest for the immediately prior record. Chained record 1224 now has a message digest for chaining record 1262 in the field that is reserved for the message digest for the immediately prior record (in place of the message digest for chained record 1223). Similarly, chaining record 1263 is inserted between chained records 1225 and 1226. If chaining record 1262 is generated (e.g., when block 1251 is closed out) prior to the generation of chained record 1224, that is, chaining record 1262 is generated within the sequence of chaining records 1223 to 1224, then the field of chaining record 1224 that is reserved for the message digest for the immediately prior record will initially be populated with the message digest for chaining record 1262, and so does not need to be altered or changed.

Similarly, if chaining record 1263 is generated (e.g., when block 1252 is closed out) prior to the generation of chained record 1226, that is, chaining record 1263 is generated within the sequence of chaining records 1225 to 1225, then the field of chaining record 1225 that is reserved for the message digest for the immediately prior record will initially be populated with the message digest for chaining record 1263, and so does not need to be altered or changed. Note that, if chaining records 1261, 1262, and 1263 are generated at a later time (i.e., chaining record 1261 is generated after chained record 1221, chaining record 1262 is generated after chained record 1224, and chaining record 1263 is generated after chained record 1226), then each of chained records 1221, 1224, and 1226 will need to be changed, to substitute the message digests for chaining records 1261, 1262, and 1263, respectively. This will alter the message digests of each of chained records 1221, 1224 and 1226, resulting in a cascading need to re-accomplish the record chaining prior to closing out each of blocks 1251-1252. In order to preserve the APT detection, described above, it may be preferable to time the generation of chaining records 1261-1263 to occur interspersed with the generation of record chain 129.

FIG. 14 illustrates various options for deduplication with multi-tier chaining. In the illustrated examples, after generating chained record 1222, while block 1251 was still current (i.e., before block 1251 was closed), permissioning entity 440 discovered that digital content file 1202 was a duplicate of digital content file 1201. Similarly, after generating chained record 1225, while block 1252 was still current (i.e., before block 1252 was closed), permissioning entity 440 discovered that digital content file 1205 was a duplicate of digital content file 1204 (or another file). Thus, chained records 1222 and 1225 are superfluous, because the payloads of chained records 1222 and 1225 appear within earlier chained records. In some examples, deduplication is performed only within blocks, rather than across blocks. In some examples, deduplication is not performed, and chained records 1222 and 1225 remain.

In some examples, however, chained records 1222 and 1225 are removed. Options exist for the chaining of the subsequent records, chained record 1223 and chaining record 1263, respectively. In an arrangement 1401, the record chaining is simply broken. This may occur if permissioning entity 440 decides that the record chaining (during the block accumulation periods) served its purpose of deterring an APT from disrupting blockchain operations (i.e., generating blockchain 410), and is no longer needed, because the blocks are still properly chained. However, in an arrangement 1402, the record chaining is updated to compute new message digests in order to repair the chain. In the illustrated example, chained record 1223 has the message digest for chained record 1221, and chaining record 1263 has the message digest for chained record 1224.

FIG. 15 illustrates various options for record content. An exemplary record 1500 contains the content fields indicated and may represent record 412 and/or record 414 shown in prior figures. As illustrated, record 1500 has multiple portions, illustrated as grouped into field categories, although it should be understood that some of the illustrated fields are optional, and the order of the fields may vary. A primary payload portion 1510 includes a message digest field 1511 having the message digest (see FIG. 11 for variations) for the subject digital content, such as digital content 114. A record chaining portion 1520 includes a message digest field 1521 having the message digest (see FIG. 11 for variations) for the prior record, with the possible exception of some or all of administrative field portion 1570, as noted below. Record chaining portion 1520 also includes a record chain index 1522, which is an index of the current record (not the prior record, for which the message digest of message digest field 1521 was calculated) in record chain 1229. Because record chain index 1522 does not reset for each block (that a record index 1574, described below, does), record chain index 1522 may need to be either a larger integer (with a wider bit field), or else blockchain 410 may need to be able to handle the eventual wrapping of the value of record chain index 1522 around the maximum integer value.

Three additional portions, a data owner fields portion 1530, a data custodian fields portion 1540, and a permissioning entity fields portion 1550 are illustrated having corresponding fields for information submitted by various entities associated with digital content 114 and/or blockchain 410. Multiple types of record link fields are described below as being useful to locate additional records that may be related to the current record being examined by a data user (e.g., a data owner or a data consumer). However, if records contain only message digests, then knowledge of only the message digest requires additional data for data consumer 109 to determine the significance of the information that is the subject of that other (linked) record.

In one scenario, data consumer 109 may have access to a large cache of documents, and must determine the message digest for each, in order to determine which is associated with the chained record. An alternative is the use of data owner fields portion 1530, data custodian fields portion 1540, and/or permissioning entity fields portion 1550 to provide some clues to enable data consumer 109 to locate the document that is the subject of the chained record. In some examples, data custodian fields portion 1540 may be replaced with a certification entity fields portion, or a certification entity fields portion may additional to those shown in FIG. 15.

In some examples, data owner fields portion 1530 includes a data owner digital signature field 1531 which may hold the data owner's digital signature of the subject digital content (e.g., digital content 114 signed by data owner 111), and/or the data owner's digital signature of other material, such as the message digest (e.g., within message digest field 1511) of digital content 114. In some examples, data owner fields portion 1530 includes a timestamp field 1532 which may hold the data owner's timestamp for when the subject digital content was created, and/or when data owner 111 created the original record for submission to permissioning entity 440 (e.g., record 1211 of FIG. 12). In some examples, data owner fields portion 1530 includes an identification of the subject digital content in a digital content identification field 1533, so that data consumer 109 may be able to locate the digital content that is the subject of record 1500. This may be used when record 1500 had been located via searching based on record link fields, as is described below, and data consumer 109 wishes to determine whether record 1500 is for a certification, a certification revocation, or a later version of the subject digital content.

There may be scenarios in which using cleartext file names for some digital content creates a security risk. In such scenarios, a reference list may be created, similar to pseudonymization, and the list withheld from public distribution. Information enabling location of the digital content (e.g., a file name, date, and or storage path location) is identified with a random number, and the random number is placed within digital content identification field 1533. When data consumer 109, with the proper credentials, identifies record 1500, the list may be used to point the date user to the subject matter of record 1500. In some examples, a reserved other field 1534 may be placed in data owner fields portion 1530 for additional administrative data and/or as a placeholder for future (as of yet) unidentified needs.

In some examples, data custodian fields portion 1540 includes a data custodian digital signature field 1541 (for a data custodian's digital signature of information related to record 1500); a timestamp field 1542; a digital content identification field 1543; and a reserved other field 1544. The fields of data custodian fields portion 1540 may be used similarly to the manner of use described for data owner fields portion 1530, if it is expected that a data custodian will supply additional information beyond that supplied by data owner 111. Some examples may omit data custodian fields portion 1540 in favor of using only data owner fields portion 1530.

In some examples, permissioning entity fields portion 1550 includes a permissioning entity digital signature field 1551 which may hold the permissioning entity's digital signature of the subject digital content (e.g., digital content 114), and/or the permissioning entity's digital signature of other material, such as record 1500 in the state in which it was received (i.e., prior to permissioning entity fields portion 1550 being populated). In some examples, permissioning entity fields portion 1550 includes a timestamp field 1552 which may hold the permissioning entity's timestamp for when record 1500 was received and/or updated (e.g., by populating record link fields described below and/or populating permissioning entity fields portion 1550). In some examples, permissioning entity fields portion 1550 also includes an identification of the subject digital content in a digital content identification field 1553, and a reserved other field 1544.

A linking field portion 1560 includes a first versioning link field 1561, a second versioning link field 1562, a first certification link field 1563, a second certification link field 1564, and other general record link fields 1565-1568. In some examples, other general record link fields 1565-1568 contain blockchain addresses of other records (if any) that are related to record 1500. For example, if the subject digital content of record 1500 is a later version of earlier digital content, for which blockchain 410 holds a prior record, versioning link field 1561 or 1562 will contain the blockchain address of (or other pointer to) that earlier record.

With brief reference back to FIG. 4A, when data consumer 109 (e.g., producer 102 or user 108) examines blockchain 410, and finds record 412 (which may be in the format of record 1500) for digital content 114, data consumer 109 may wish to determine whether digital content 114 has been superseded by a later version. Data consumer 109 may then search later in blockchain 410 for a mention of the blockchain address of record 412, and find it within versioning link field 1561 of a later record. Data consumer 109 may then determine that at least one later version of digital content 114 exists, and repeat this searching process until no later records are identified. This versioning information is then available within blockchain 410, thereby increasing the utility of blockchain 410 by helping to reduce the likelihood that obsolete digital content will be used. That is, in some examples, blockchain 410 not only provides assurance of the integrity and no-later-than date-of-existence of digital content 114, but is also able to provide a form of a warning to data consumers 109 when digital content 114 should perhaps not be used.

If the subject digital content of record 1500 has been certified by certification entity 210 (see FIG. 2A), certification link field 1563 or 1564 will contain the blockchain address of a record associated with that certification event, thereby acting as record link 416 of FIG. 4A. In some examples, a blockchain address may differ, based on whether the address is within the same block or a prior block. When referencing another record in a prior block, the blockchain address may be the block number, plus the index of the record within that block (e.g., a record index 1574, described below, but for that other record). The block number may be a simple numerical count of the block within the sequence of blocks within blockchain 410. When referencing another record in the same block, the blockchain address may have the same format as when referencing another record in a prior block, with the block number being set to the block number of the same block. During the block accumulation for that block (i.e., prior to that block being closed out), the number is the anticipated number, because that block has not yet been added to blockchain 410. In some examples, however, when referencing another record in the same block, the blockchain address may instead comprise a flag to indicate that the record is within the same block, and the record index (e.g., record index 1574) but for that other record.

With continued reference back to FIG. 4A, digital content 114 is certified with certificate 214 by certificate entity 210, and records 412 and 414 are generated for digital content 114 and certificate 214, respectively. In this example, both of records 412 and 414 are in the format of record 1500, having at least certification link field 1563. If both records 412 and 414 are submitted approximately simultaneously, certification link field 1563 in record 412 may be filled in to reference record 414, and certification link field 1563 in record 414 may be filled in to reference record 412. If, in an unlikely situation that record 414 for certificate entity 210 is submitted to permissioning entity 440, and included in a closed-out block prior to the submission of record 412 for digital content 114, then when record 412 is submitted at a later time, its certification link field 1563 may be populated to indicate the blockchain address of record 414.

However, in the more likely scenario that record 412 for digital content 114 is submitted and included in a closed-out block while certificate entity 210 is still studying digital content 114, then when record 414 (for certificate 214) is submitted at a later time, its certification link field 1563 may be populated to indicate the blockchain address of record 412. When data consumer 109 (e.g., producer 102 or user 108) is examining blockchain 410, finds record 412 for digital content 114, and wishes to determine whether digital content 114 is certified, data consumer 109 may then search later in blockchain 410 for a mention of the blockchain address of record 412, and find it within record 414 for certificate 214. In this way, data consumer 109 is able to identify that some associated information (e.g., possibly a certificate or a later version) is available—using information contained within blockchain 410, and therefore trusted by data consumer 109.

Fortunately, similar to the versioning information process, data consumer 109 may search further in blockchain 410 for a mention of the blockchain address of record 412 or 414. In some scenarios, after certification entity 210 has generated certificate 214, submitted record 414, and record 414 has been linked with record 412, certification entity 210 (or another entity) may discover that digital content 114 had a latent problem. Certification entity 210 may then revoke certificate 214. However, since record 412 cannot be changed within blockchain 410, a new record for the revocation of certificate 214 may be generated, and a record for that revocation submitted into blockchain, referencing record 412 and/or record 414. In this manner, blockchain 410 not only provides data consumers 109 with notice of the certification of digital content, but also is able to alert data consumers 109 when digital content 114 has lost its certification and so should not be used.

In some scenarios, after record 414 for certificate 214 has been submitted to blockchain 410, data owner 111 may submit a new record for digital content 114 that references record 412 in certification link field 1563. In some examples, the new record may further reference record 412 in certification link field 1563 to reflect that the new record is a resubmission for the purpose of establishing a certification link (e.g., record link 416). If digital content 114 has multiple certifications, certification link field 1564 may also be used for another certification link, although some examples may omit a second certification link field. In some examples, there are no dedicated record link fields, and any record link, whether for versioning, certification, or other reasons is placed within some allotted space within linking field portion 1560. Other reasons for linking records are to indicate a relationship between the subject digital content. For example, if a particular project includes multiple documents that together make a complete package, such that anyone possessing a copy of one document should also possess the others, then the records for those associated project documents may be linked using other one or more of other general record link fields 1565-1568.

An administrative field portion 1570 includes a first software version field 1571, a second software version field 1572, an administrative data field 1573, and a record index 1574. In some examples, software version field 1571 indicates a version number of the software used to generate record 1500, and may, in some examples, also indicate the source of the software. In some examples, software version field 1572 indicates a version number of other software used for generating data within blockchain 410. Other administrative data field 1573 contains additional administrative information that may be useful to data consumers 109 who are using blockchain 410 to assess the validity and/or integrity of digital content 114.

For example, if record 1500 is used as the record chaining different blocks (e.g., any of chaining records 1261, 1262, and 1263 of FIG. 12) administrative data field 1573 may contain the block number of the prior block and/or the block number of the current block. These are the block numbers used in the blockchain addresses, for example, as described above for record link fields 1561-1568. Record index 1574 is an index, such as the count of the record within the sequence of records within its same block. In some examples, if a chaining record is the first record appearing within a block, and the record indexing uses 1-based indexing (rather than 0-based indexing), record index 1574 is set to the value of 1. In such examples, the second record within that same block will be the first chained record (e.g., one of chained records 1221, 1224, or 1225) for referenced digital content (e.g., malicious digital content 124). In some examples, because record index 1574 may be determined after record chain 1229 is formed (see FIG. 12), some or all of administrative field portion 1570 for one record may be excluded in the calculation of the message digest that chains records, and which appears in message digest field 1521. Some examples use both record index 1574 and record chain index 1522. Some examples may use record index 1574 for the record chain index value (i.e., record index 1574 acts as described above for record chain index 1522 value) until the current block is closed out, and then the record chain index value is replaced with the block index value in record index 1574.

Referencing now FIGS. 12 and 13, in view of FIG. 15, certain record fields may be described in further detail. Block 1251 is assigned the block number 1, and there is no prior block. For chaining record 1261, message digest field 1511 is padded with zeros because there is no prior block; message digest field 1521 is padded with zeros because there is no prior record; administrative data field 1573 holds a value of 0 indicating the prior block number (which does not exist), a value of 1 indicating its own block number, and possibly other relevant information. The blockchain address of chaining record 1261 (using 8 characters for each of the block number and record index 1574) is 00000001 00000001.

For chained record 1221, message digest field 1511 has the message digest for its subject digital content (e.g., digital content 114); message digest field 1521 has the message digest for chaining record 1261, possibly excluding all or some of administrative field portion 1570 for chaining record 1261; administrative data field 1573 holds information that is relevant to chained record 1221 and/or the subject digital content. The blockchain address of chained record 1221 is 00000001 00000002. For chained record 1222, message digest field 1511 has the message digest for its subject digital content; message digest field 1521 has the message digest for chained record 1221 (possibly excluding all or some of administrative field portion 1570 for chained record 1221); administrative data field 1573 holds information that is relevant to chained record 1222 and/or the subject digital content. The blockchain address of chained record 1222 is 00000001 00000003.

Continuing this scheme, block 1252 is assigned the block number 2. For chaining record 1262, message digest field 1511 has the message digest for block 1251, because block 1251 is the subject digital content of chaining record 1262; message digest field 1521 has the message digest for chained record 1223 (using arrangement 1302); administrative data field 1573 holds a value of 1 indicating the prior block number (for block 1251), a value of 2 indicating its own block number, and possibly other relevant information. The blockchain address of chaining record 1262 is 00000002 00000001. For chained record 1224, message digest field 1511 has the message digest for its subject digital content; message digest field 1521 has the message digest for chaining record 1262; administrative data field 1573 holds information that is relevant to chained record 1224 and/or the subject digital content. The blockchain address of chained record 1224 is 00000002 00000002. This scheme continues for further records and blocks, building out blockchain 410.

With brief reference back to FIGS. 6A and 13, message digest field 1511 of chaining records (e.g., chaining records 1261, 1262, and 1263) may provide a portion of publicity element 611 and/or date proof element 641 for out-of-band date proof 610. That is, in some examples, out-of-band date proof 610 advertises the message digests that chain the blocks. Returning now to FIG. 15, it can be appreciated that record 1500 may easily grow to lengths of 1 KB or more, depending upon which fields are used, and how long the fields are.

In some examples, record 1500 is stored and distributed as binary data, although in some examples, record 1500 (and the blocks of blockchain 410) are stored and distributed as ASCII text files, to facilitate independent examination by data consumers 109 without requiring special software. The ASCII encoding typically imposes a penalty of doubling the size of the stored file (for the same amount of data). In some examples, message digest field 1511 may be 256 bits, and be represented as 64 characters (with an 8-bit byte and ASCII encoding), for example if the message digest is expressed as a SHA-256 message digest (e.g., one of IVCs 1120, 1140, or 1160 of FIG. 11). In some examples, message digest field 1511 may be 512 bits, and be represented as 128 characters (e.g., using the SHA-512) or 768 bits represented as 192 characters if both SHA-512 and SHA 256 are used to output the final message digest (e.g., IVC 1120, 1140, or 1160). In some examples, message digest field 1521 is the same length as message digest field 1511, although in some examples, they may be different lengths.

In some examples, digital signature fields 1531, 1541, and 1551 are 64 bits. In some examples, timestamp fields 1532, 1542, and 1552 are 64 bits. In general, the size of each of record link fields 1561-1568 depends on the number of bits used to represent a blockchain address. Although examples described above used 8 characters to represent both the block number and record index 1574, some examples my truncate these numbers. Permissioning entity 440 (see FIG. 4A) may prefer to stop accumulating records in a single block prior to reaching 2^64 records. As a result, record index 1574 may be represented using a shorter set of bits, although using bit fields that are an integer multiple of 8 may be preferable. In some examples, the set of fields used, and their lengths, and even additional fields and padding, are selected to set the length of record 1500 to an integer power of 2, such as 1024, 2048, 4096, or 8192 bits.

Versioning link fields 1561 and 1562 and/or certification link fields 1563 and 1564 may be used as illustrated in FIG. 16. In a versioning scenario 1600, a digital content 1601 and a digital content 1602 (either of which may be equivalent to digital content 114) are merged into a digital content 1603, in a merge event 1610. Digital content 1603 is revised, in a revision event 1611, to produce the current version of digital content 1604. A record 1621 is generated for digital content 1601, and a record 1622 is generated for digital content 1602. After merge event 1610, a record 1623 is generated for digital content 1603. Because digital content 1603 is a merge of digital content 1601 and 1602, versioning link fields 1561 and 1562 of record 1623 are populated with record links 1633*a* and 1633*b*, respectively. Record link 1633*a* points to record 1621, for example using the blockchain address of record 1621, and record link 1633*b* points to record 1622, for example using the blockchain address of record 1622.

After revision event 1611, a record 1624 is generated for digital content 1604. Because digital content 1604 is a later version of digital content 1603, versioning link field 1561 of record 1624 is populated with a record link 1634. Data consumer 109, attempting to locate record 1621, may search blockchain 410 to find record link 1633*a*, which is a reference to (e.g., the blockchain address of) record 1621 within record 1623. This is possible, because the blockchain address of record 1621 is known to data consumer 109. Examining record 1623, data consumer 109 is then able to find record link 1633*b*, which is a reference to record 1622. Data consumer 109 may then search blockchain 410 to find record link 1634, which is a reference to record 1623 (because the blockchain address of record 1623 is known). This enables data consumer 109 to identify that data content 1601 has later versions (e.g., digital content 1603 and 1604) by using information contained within blockchain 410. Similarly, data consumer 109, first finding record 1624 for digital content 1604, is able to determine the pedigree of digital content 1604 as being derived from digital content 1601, 1602, and 1603. Pedigree information may have value in some scenarios in which a certain portion of some digital content is known to have particular properties or risks that are of interest to data consumer 109.

In a certification scenario 1640, a certificate 1642 is created for a digital content 1641 (which may be equivalent to digital content 114), but later revoked in a revocation event 1643, for example when a new security risk is discovered within digital content 1641. A record 1651 is generated for digital content 1641, and a record 1652 is generated for certificate 1642. Because record 1652 represents a certification of digital content 1641, certification link field 1563 of record 1652 is populated with a record link 1662 that points to record 1651.

After revocation event 1643, a record 1653 is generated for revocation event 1643 (e.g., some document generated by certification entity 210). Because revocation event 1643 revokes certificate 1642 for digital content 1641, certification link fields 1563 and 1564 of record 1653 are populated with record links 1663*a* and 1663*b*, respectively. Record link 1663*a* points to record 1651, for example using the blockchain address of record 1651, and record link 1663*b* points to record 1652, for example using the blockchain address of record 1652. Record links 1621-1624 and 1651-1654 may be equivalent to record link 416.

Figure 17:
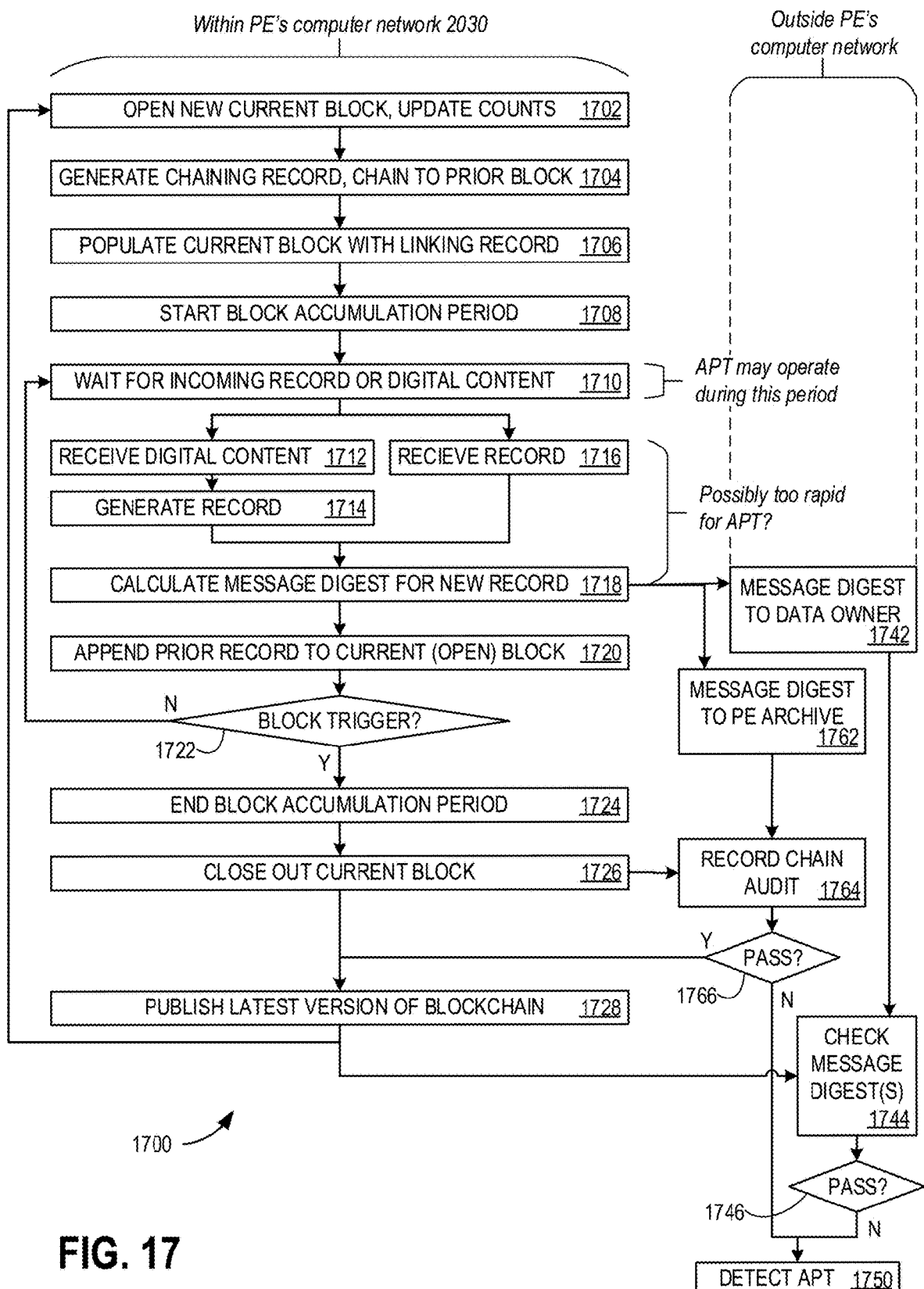
FIG. 17 illustrates a flowchart of exemplary operations associated with rendering blockchain operations resistant to advanced persistent threat (APTs).

FIG. 17 illustrates a flowchart 1700 of exemplary operations associated with disclosed examples of blockchain operations, for example, rendering blockchain operations resistant to APTs. In some examples, at least a portion of flowchart 1700 may be performed using one or more computing devices 2600 of FIG. 26. In general, with a sufficiently sophisticated APT, detection of the APT may be aided by having reference information that is outside the access of the APT, for example on a different computer network. Therefore, if an APT is on computer network 2030 that permissioning entity 440 uses to assemble blockchain 410 (see FIG. 20), it may be beneficial to have reference information outside that network. As indicated, certain operations in flowchart 1700 are performed within computer network 2030 operated by permissioning entity 440 (e.g., operations 1702-1728), and some (e.g., operations 1742-1766) are performed outside computer network 2030 (e.g., on a data owner's computer network 2010, see FIG. 20) or in an isolate portion.

A new block is opened at 1702 and certain numbers associated with blockchain 410 are updated, such as the block count, the record count, and the record index (within the current block) are updated. A new chaining record (e.g., chaining record 1262) is generated at 1704, which will be used to chain the current (new) block to the prior block (e.g., chaining record 1262 chains block 1251 to block 1251 in FIG. 13). The new chaining record is put into the new block at 1706. This starts the current block accumulation, denoted as operation 1708. Permissioning entity 440 waits for incoming records or digital content at 1710.

In some examples, there are options for growing blockchain 410: Data owners 111 (e.g., developers 110 of FIG. 1 and/or other entities acting as data owner 111) submit digital content or only message digests (or at least partially complete records) that represent digital content, while withholding the digital content itself. Flowchart 1700 shows both options, and some examples of blockchain operations may permit both options, although some examples may only permit one option or the other. Digital content (e.g., digital content 114) is received at 1712, and a record is generated for the digital content by either permissioning entity 440, or perhaps data custodian 112 (of FIG. 1), at 1714. Alternatively, the record is received at 1716. The new (or newly received) record is chained to the immediately prior record by inserting the message digest of the immediately prior record into message digest field 1521 of the new record, and the message digest for the new record is calculated (generated). The message digest of the immediately prior record is already known due to an earlier iteration of operation 1718 for that immediately prior record.

The message digest of the new record is immediately returned to the submitter (e.g., data owner 111) at 1742, which places a copy of the message digest of the new record outside computer network 2030 of permissioning entity 440. The purpose of doing this is that, if an APT does reside within computer network 2030 of permissioning entity 440, the copy sent to data owner 111 cannot be reached by the APT (unless the data owner's computer network 2010 hosts a second conspiring APT). Thus, any alteration of records on computer network 2030 of permissioning entity 440 may be detected at a later time (using the data owner's copy of the message digest for the new record), revealing the activity of the APT on computer network 2030 of permissioning entity 440. In some examples, at 1762, another copy of the message digest of the new record is sent to a data archive used by permissioning entity 440, which is hopefully somewhat insulated from an APT that operates on computer network 2030 that assembles blockchain 410.

Preferably, even if the APT is able to perform malicious activity (e.g., altering or deleting records) during the block accumulation period, operations 1712-1718, plus operations 1742 and 1762 occur so rapidly that the APT is unable to alter the message digest that is sent to data owner 111 and/or is sent to the insulated data archive. In some examples, permissioning entity 440 may segment its computer network 2030 so that the portion that processes new records has more restricted access than does the portion that assembles and distributes blocks, and upstream communication between the different portions it tightly constrained.

The prior record now has the message digest of the new record, and so may be sufficiently complete to append to the currently open block, at 1720. In some examples, operation 1720 corresponds to operation 924 of FIG. 9. Decision operation 1722 determines whether a trigger condition for closing the current block accumulation period has occurred, such as a timer, a calendar event, or a threshold number of record have accumulated. In some examples, blocks are closed out on a schedule, such as hourly, daily, or upon the lapse of another set time period. If the trigger condition has not been met, flowchart 1700 returns to 1710 to wait for the next record. What had been the new record will become the immediately prior record, when the new record arrives.

If the trigger condition has been met, the block accumulation period ends (terminates), as indicated by 1724, and permissioning entity 440 closes the current block at 1726 (corresponding to operation 926 of FIG. 9). Permissioning entity 440 may then take a copy of the newly-closed block to an insulated computer network and perform an audit of the portion of record chain (e.g., the portion of record chain 1229) that appears within the newly-closed block, at 1764. If the audit passes, at decision operation 1766, the newly-closed block is appended to blockchain 410, which is published at 1728 (corresponding to operation 928 of FIG. 9). In some examples, when flowchart 1700 returns to operation 1702 and then operation 1702, what had been the new record will become the immediately prior record for the new chaining record (e.g., chained record 1225 is the immediately prior record to chaining record 1263).

If, however, an APT on computer network 2030 of permissioning entity 440 had altered records during the block accumulation period, the audit in operation 1764 may fail and be detected in decision operation 1766. Operation 1750 then detects the possibility of an APT being present within computer network 2030 of permissioning entity 440. Additionally, each data owner 111, who submitted digital content or records that are covered in the newly published block, may independently perform its own audit at 1744, using the message digests received at 1742. If decision operation 1746 does not detect failure, no action may be performed (in some examples), although if a failure is detected, operation 1750 has another opportunity to detect the possibility of an APT being present within computer network 2030 of permissioning entity 440. Operation 1750 includes alerting permissioning entity 440, if necessary.

Figure 18:
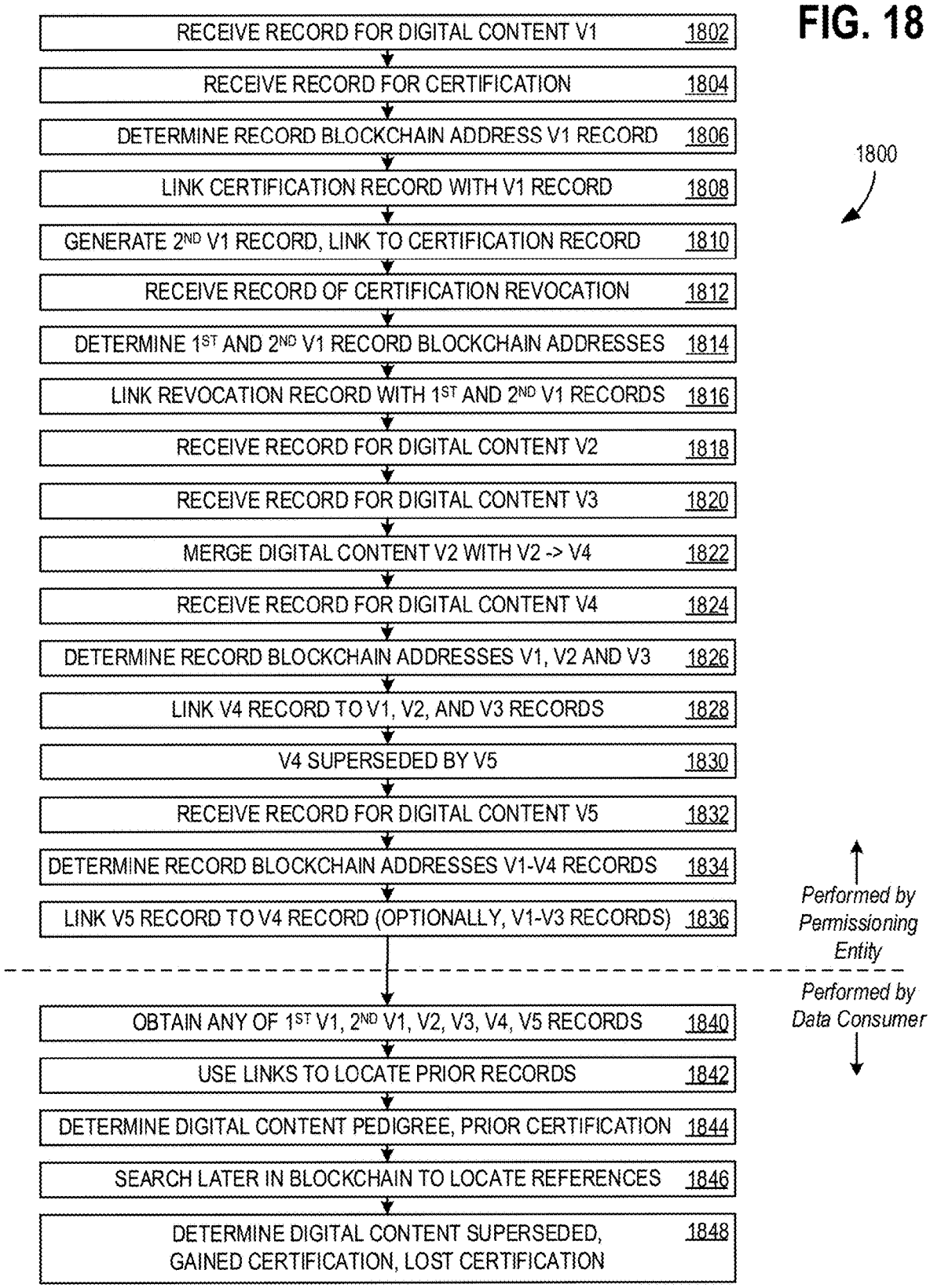
FIG. 18 illustrates a flowchart of exemplary operations associated using linking blockchain records to identify certification, track pedigree, and/or identify superseded digital content.

FIG. 18 illustrates a flowchart 1800 of exemplary operations associated with disclosed examples of blockchain operations, for example, using linking blockchain records to identify certification, track pedigree, and/or identify superseded digital content. In some examples, at least a portion of flowchart 1800 may be performed using one or more computing devices 2600 of FIG. 26. Operations 1802-1836 set up records within blockchain 410 so that data consumer 109 is able to parse up and down blockchain 410 in operations 1840-1848 to identify relevant events associated with some particular digital content that is captured within blockchain 410. A first record for version 1 of some digital content (e.g., digital content 114) is received at 1802. The digital content is certified (e.g., by certification entity 210), and record for the certification (e.g., certificate 214) is received at 1804. In some scenarios, the record for the digital content is published in blockchain 410 before the record for the certification is received. In such scenarios, operation 1806 determines the blockchain address of the digital content record in a prior block. Operation 1808 annotates the record for the certification with the blockchain address of the digital content record, thereby linking the two records.

With a brief reference back to FIG. 4A, this may be an example of the generation of record link 416 for record 412 (the digital content record) and record 414 (the certification record). In some examples, a second record for version 1 of the digital content is generated at 1810 and linked to the certification record. In some alternative scenarios, operations 1802 and 1804 occur in sufficiently rapid succession that both records will appear within the same block. In such alternative scenarios, operation 1806 determines the blockchain address of the digital content record within the same block, and a second record for the digital content is not needed because operation 1810 is instead updating the first digital content record with a link to the certification record.

The certification for version 1 of the digital content is revoked, and a record of the revocation is received at 1812. In order to link the revocation record to the prior certification record and the digital content record(s), the blockchain addresses of these prior records are determined at 1814. The revocation record is annotated with the blockchain addresses, thereby linking the revocation record with the records for the digital content and the certification records at 1816. The linked revocation record is published in blockchain 410, also in operation 1816. The intent is that, if data consumer 109 looks to blockchain 410 to identify whether some digital content is certified as being safe to use, then blockchain 410 should also be configured to alert data consumer 109 when the certification is no longer valid. This is described below, for operations 1840-1848.

Version 2 of the digital content is generated, superseding version 1, and a record for version 2 is received at 1818. Supplemental digital content is generated in a version 3, for which a record is received at 1820. The records are published in blockchain 410. At some later time, version 2 and version 3 of the digital content are merged, thereby producing a version 4, at 1822. A record for version 4 of the digital content is received at 1824. In order to link the version 4 record to the prior version records, the blockchain addresses of the prior version records are determined at 1826. The version 4 record is annotated with the blockchain addresses of version 1, version 2, and version 3, thereby linking the version 4 record with the records for the earlier versions, at 1828. The linked version 4 record is published in blockchain 410, also in operation 1828. The intent is to configure blockchain 410 to alert data consumers 109 when digital content is superseded, and also to permit data consumers 109 to investigate pedigree of digital content. This is also described below, for operations 1840-1848.

At some later time, version 4 of the digital content is superseded by version 5 at 1830, and a record for version 5 of the digital content is received at 1832. In order to link the version 5 record to the prior version records, the blockchain addresses of the version 4 record and (optionally) the other prior version records are determined at 1834. The version 5 record is annotated with the blockchain addresses of version 4 and (optionally) additional versions, thereby linking the version 5 record with at least one records for an earlier version, at 1836. The linked version 5 record is published in blockchain 410, also in operation 1836.

When data consumer 109 is planning to use a version of the digital content, in operation 1840, data consumer 109 obtains at least one of the records identified in operations 1802-1836. Using the linking fields in operation 1842, data consumer 109 is able to locate any prior records related to the digital content. Based on the starting point, data consumer 109 is able to determine the prior versions (e.g., determine the pedigree), as well as identify that version 1 had been certified at one time, at 1844.

Also, by searching blockchain 410 for any references to the blockchain address of any known records (associated with the digital content), in operation 1846, data consumer 109 is able to locate any later records that link to the known records. This enables data consumer 109 to identify whether the digital content has been superseded, and also whether any certification has been achieved or lost. That is, in operations 1846 and 1448, data consumer 109 may search within blockchain 410 for references to known records, and finding no later records linked to some digital content, determine that the most recent record is for the current version of the digital content.

Figure 19:
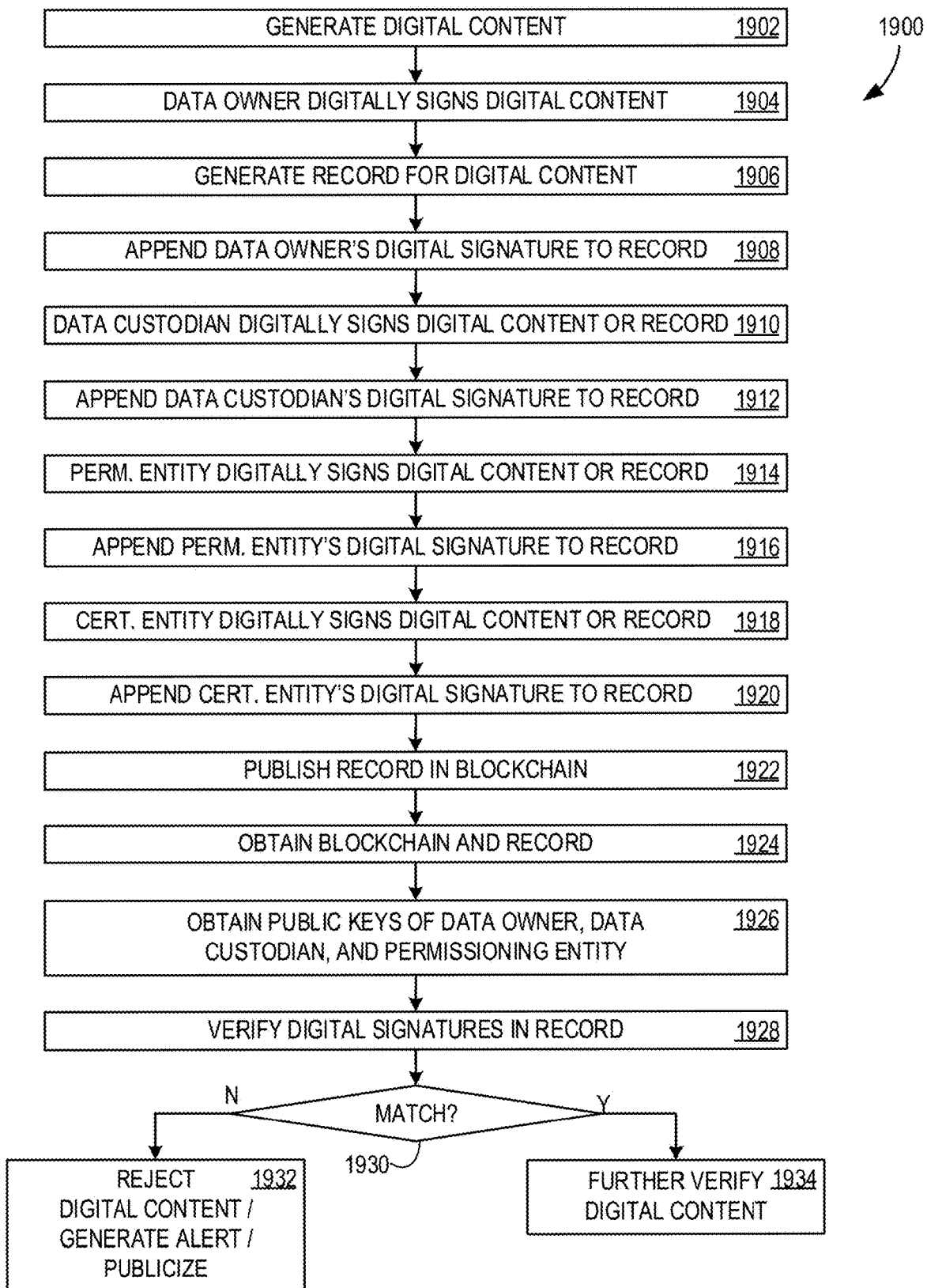
FIG. 19 illustrates a flowchart of exemplary operations associated with using blockchain records with third party digital signatures as a trust element for high-risk digital content.

FIG. 19 illustrates a flowchart 1900 of exemplary operations associated with disclosed examples of blockchain operations, for example, using blockchain records with third party digital signatures as a trust element for high-risk digital content. In some examples, at least a portion of flowchart 1900 may be performed using one or more computing devices 2600 of FIG. 26. Digital content is generated at 1902, and data owner 111 (e.g., developer 110) digitally signs it at 1904. A record for the digital content is generated at 1906, and the data owner's digital signature is appended to the record at 1908. Data custodian 112 digitally signs the digital content and/or the record at 1910, and the digital signature(s) of data custodian 112 are appended to the record at 1912.

Permissioning entity 440 digitally signs the digital content and/or the record at 1914, and the digital signature(s) of permissioning entity 440 are appended to the record at 1916. Certification entity 210 digitally signs the digital content and/or the record at 1918, and the digital signature(s) of certification entity 210 are appended to the record at 1920. The record is published with the digital signatures in blockchain 410, at 1922.

At 1924, data consumer 109 obtains a copy of the record, and possibly a copy of the blockchain 410, or at least the block containing the record. Data consumer 109 obtains the public keys of all of the signatories at 1926, and verifies the digital signatures at 1928. If any of the digital signatures do not match at decision operation 1930, data consumer 109 rejects the digital content at 1932. Data consumer 109 should further generate an alert for permissioning entity, developer 110, any other data owners 111, and certification entity 216. In some scenarios, data consumer 109 may even publicize the digital signature mismatch in order to trigger further and ongoing attestation of data stored outside blockchain 410. Otherwise, data consumer 109 has not yet detected a reason to reject the digital content, and so performs further verification operations on the digital content (e.g., operation 950 of flowchart 900, and operations 1840-1848 of flowchart 1800.

Figure 20:
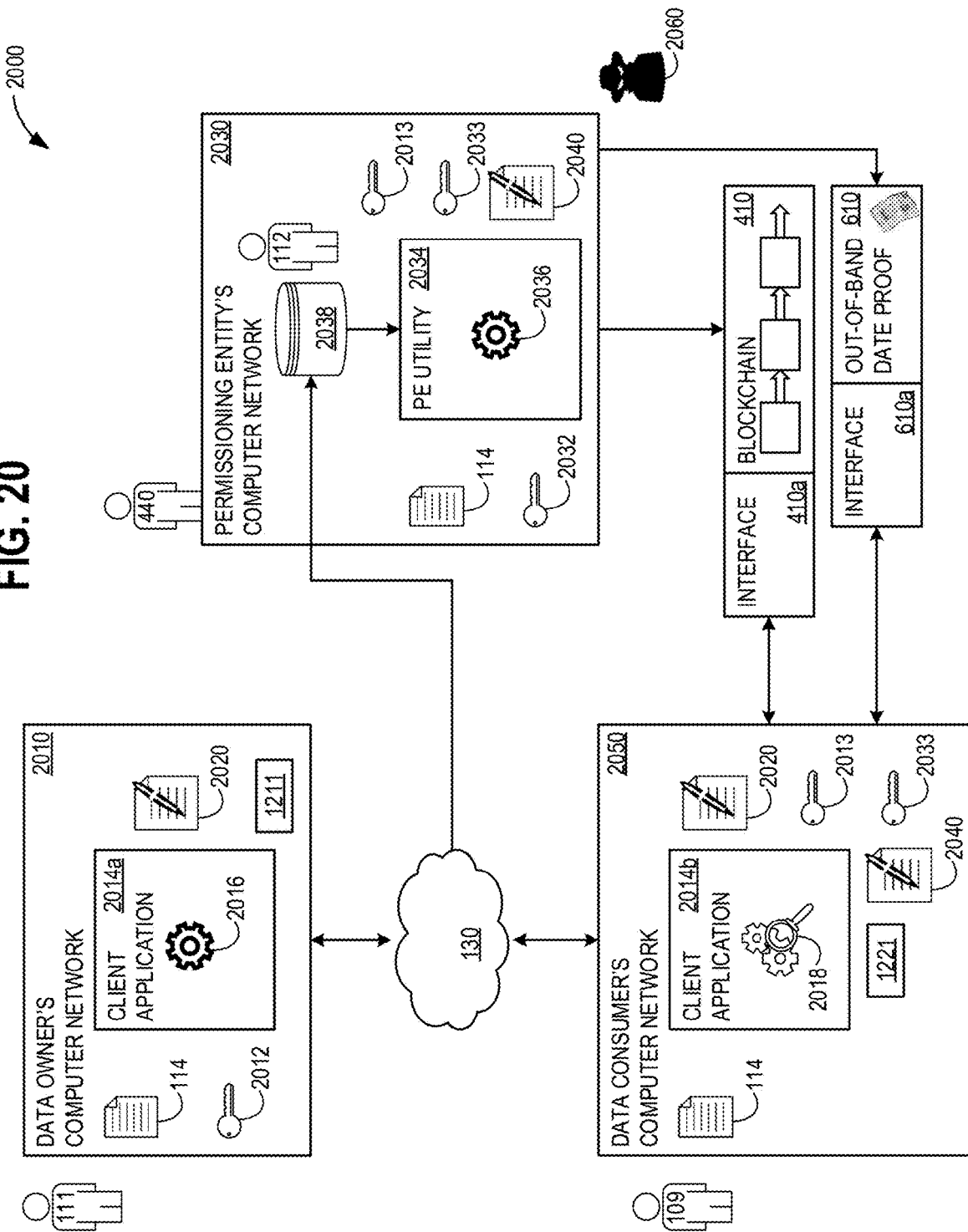
FIG. 20 illustrates an exemplary arrangement that implements aspects of blockchain operations described in referenced to other figures herein.

FIG. 20 illustrates an exemplary arrangement 2000 that may perform blockchain operations, as disclosed herein, for example in accordance with FIG. 6A and later figures. In arrangement 2000, permissioning entity 440 also acts as data custodian 112 (see FIG. 1), although it should be understood that another entity may instead act as data custodian 112. Arrangement 2000 uses a storage 2038, operated by permissioning entity 440, as a central data storage solution. Storage 2038 is accessed by users who upload data, files or information (e.g., data owners 111) and users who download such data, files or information (e.g., data consumers 2050). A user may take the role of data owner 111 or data consumer 109, interchangeably, and even simultaneously.

In some examples, storage 2038 may be implemented as a cloud solution and may be portable among various cloud platform solutions. In some examples, storage 2038 may be implemented as a local (off-cloud) or hybrid solution. In some examples, storage 2038 supports user identity management, such that data owners 111, storage platform administrators (e.g., permissioning entity 440, or data custodian 112), and/or an external service assign access and/or visibility permission to data consumers 109 for resources on storage 2038.

A permissioning entity utility 2034, which may be hosted on storage 2038, or on a different platform, manages generation of blockchain 410. In some examples, permissioning entity utility 2034 is implemented as software that runs on data owner's computer network 2030, for example on storage 2038, or on a separate independent server. In some examples, another entity, not affiliated with storage 2038, may host and maintain permissioning entity utility 2034. In some examples, blockchain 410 is implemented using a database that is able to add and query information from blockchain 410. In some examples, storage 2038 is able to store and maintain transactions (e.g., records) prior to permissioning entity 440 committing them to a block. Permissioning entity 440 acts as a central gatekeeper to accept transactions (e.g., records, see FIG. 12) and commit them to blockchain 410. In some examples, permissioning entity 440 publishes the current state of blockchain 410, from a single transaction in a single block, up through all transactions across all blocks, through an interface 410a that is accessible to data owners 111 and data consumers 109.

In some examples, permissioning entity 440 permits data owners 111 and data consumers 109 to access some aspects of permissioning entity utility 2034 through an application programming interface (API). The API includes endpoints that enable data owners 111 and data consumers 109 to carry out protocol steps indicated below. In some examples, the functionality of this API includes:

- an ability to register a public key 2013 of a data owner 111 with permissioning entity 440;
- an ability to view instructions or download software that locally computes a message digest (e.g., IVC, see FIG. 11) of a file (e.g., digital content 114), and or to create a record (e.g., record 1211) for the file (i.e., the software includes a version of record generator 1210 of FIG. 12);
- an ability to query storage 2038 for a message digest;
- an ability to submit trust verification, with a digital signature protected by a private key 2012 of data owner 111, that corresponding to registered public key 2013, to certify that a file uploaded to storage 2038 is actually the file data owner 111 intended to upload for sharing;
- an ability to search and retrieve transactions on blockchain 410 that may be present but not yet added as transactions (e.g., not yet added to an open block);
- an ability to download a desired amount of information from blockchain 410;
- endpoints (subject to compatibility) allowing users to manually or programmatically upload files to storage 2038;
- an ability to query registered public key 2013 (associated with private key 2012 used by data owner 111 to sign the trust verification); and/or
- an ability to query a registered public key 2033 of permissioning entity 440, that is associated with a private key 2038 of permissioning entity 440.

Examples of software capable of performing some of these functions are a client application 2014a, executing on computer network 2010 of data owner 111, and a client application 2014b, executing on a computer network 2050 of data consumer 109. In some examples, client application 2014a and client application 2014b are the same application, having the same functionality, just used differently by different classes of users (e.g., data owners versus data consumers). Client application 2014a intakes a file (e.g., digital content 114) and private key 2012 of data owner 111, and uses computational capability 2016 in client application 2014*a* to generate a digital signature 2020 of data owner 111 and a record for the file (e.g., record 1211).

The file (e.g., digital content 114), digital signature 2020, and the record (e.g., record 1211) are uploaded to storage 2038. In some examples, permissioning entity 440 also digitally signs the submitted file and/or the submitted record using private key 2032 of permissioning entity 440, to produce a digital signature 2040. In some examples, permissioning entity 440 generates the record (rather than data owner 111) and digitally signs the record. In some examples, permissioning entity 440 uses permissioning entity utility 2034 to generate records, and/or sign items, in addition to constructing blockchain 410. In some examples, data custodian 112 (in this illustrated case, also permissioning entity 440) makes public keys 2013 and 2033 available for download by data consumer 109. In some examples, public keys 2013 and 2033 are available from a registry, rather than from data custodian 112.

Data consumer 109 obtains the file (e.g., digital content 114) from storage 2038, and extracts the record for the file (e.g., chained record 1221, which is the chained version of record 1211) from blockchain 410, for example, using interface 410*a*. Data consumer 109 may compare the block containing the record for the file with out-of-band-date proof 610, for example, using interface 610*a*. Data consumer 109 may also obtain digital signature 2020 (of data owner 111), digital signature 2040 (of permissioning entity 440), public key 2013 (for data owner 111) and public key 2033 (for permissioning entity 440). Data consumer 109 uses computational capability 2018 in client application 2014*b* to verify digital signatures 2020 and 2040, and that the file corresponds to the record (e.g., that the message digest of digital content 114 is within chained record 1221).

Permissioning entity 440 handles the construction and population of blockchain transaction entries upon a data owner submitting a file, a record, and/or trust verification for the file. For example, permissioning entity may populate data owner digital signature field 1531 with digital signature 2020 and populate permissioning entity digital signature field 1551 with digital signature 2040 (see FIG. 15). In some examples, new transactions are created when a user submits trust verification for an updated version of a file that had previously been uploaded to storage 3032. Permissioning entity 440 may restrict editing of contents of records of open blocks, however, to ensure configuration control and quality of blockchain 410. In some examples, permissioning entity 440 uses access control measures to authenticate users, and limit submissions to blockchain 410 and access to API functions that lead to transaction creation. In some examples, permissioning entity 440 communicates with data owner 111, data consumer 109, and any remote nodes (e.g., when storage 2038 is stored in a cloud location), using encryption. In some examples, however, despite strict controls on who may contribute to blockchain 410 and/or access storage 2038, blockchain 410 itself, and out-of-band date proof 610 are available for public inspection and examination.

In some examples, blockchain 410 is implemented as a relational database, a NoSQL database, a graph database, as a binary file, as a flat text file, or as another structured or unstructured data file. In some examples, actions on the database are verified for correctness in format and data contents by permissioning entity 440. In some examples, the database contains of blocks of transactions created on a regular basis by permissioning entity 440 (e.g., at the end of block accumulation periods 1231, 1232, and 1233 of FIG. 12). In some examples, transactions created but not yet composed into a block are securely stored by permissioning entity 440 in storage 2038. In some examples, such transactions are chained together by including a message digest of the prior transaction processed (e.g., in record chain 1229). In some examples, chained, timestamped transactions, not yet committed to a block, are configured to provide ready indications of tampering by an insider threat or an APT (e.g., APT 2060) that may be lurking within computer network 2030, but not yet detected by permissioning entity 440.

Example protocol implementations may include data upload and trust verification, queueing and protecting unblocked transactions, creating blocks, trust verification check for unblocked transactions, trust verification check for blocked transactions, trust verification check for blocked transactions, retrieving the public blockchain record, and verifying the integrity of the blockchain. Examples of these protocols are described below:

Data Upload and Trust Verification: When uploading a file, a user first authenticates to storage 2038 and to permissioning entity utility 2034. For example, data owner 111 uploads a file to storage 2038 through available means, such as over network 130. Data owner 111 computes, on a local copy of the file, a message digest using a hash function that is resistant to pre-image attacks. Data owner 111 then downloads the file hosted on storage 3032. Data owner 111 computes the message digest of the downloaded file and verifies that the message digests are identical. Once complete, data owner 111 validates that the file on storage 3032 is actually the file intend for sharing, and that the file as downloaded is equivalent to the file uploaded based on the message digest match. After validation, data owner 111 submits digital signature 220 (using private key 2012) to permissioning entity 440. Permissioning entity 440 composes a transaction that includes the event timestamp, links it to the previous transaction and queues the transaction for inclusion in a block.

Queueing and protecting unblocked transactions: Transactions awaiting inclusion in in a block are in the queue of permissioning entity 440. Queued transactions may be managed by some of the following protocols. Creating blocks: During regular intervals (e.g., block accumulation periods), queued transactions are loaded into a block. A block may include a variable number of records, with a minimum of one record, the chaining record that chains a newly-closed block to the prior block. Periodic blocking of a collection of transactions is preferable to blocking one transaction at a time because it facilitates independent, external validation. For example, a single out-of-band date proof 610 establishes a no-later-than date-of-existence of the item for which it contains the message digest. It may be impractical to create an out-of-band date proof 610 for each of thousands of items. Thus, if message digests for the thousands of items are contained within a single block, and the message digest for that block is within out-of-band date proof 610, verification of any one of the items requires only two message digest calculations—no matter how many items are represented by the block. That is, data consumer 109 does not need to attempt reconstructing the entirety of record chain 1229, going back thousands of records, but instead needs to compute only the message digest for the item of interest and the message digest for the block. A block may contain chained transactions that had been queued during the block accumulation period, along with chaining records. Upon close-out of a block the queued transactions may be removed from the queue, to start the queue over with the next batch of incoming transactions.

Trust verification check for unblocked transactions: Data consumer 109 verifies the trustworthiness of a file downloaded from storage 2038 by comparing the message digest of the file against the message digest present in an unblocked transaction managed by permissioning entity 440. Data consumer 109 queries permissioning entity utility 2034 to fetch the transaction corresponding to the file. In some examples, data consumer 109 alternatively requests from permissioning entity utility 2034 the collection of all not yet blocked transactions. Data consumer 109 then verifies that the computed message digest of the file matches the message digest of the file stored in the transaction. Data consumer 109 obtains public key 2013 of the alleged data owner (data owner 111, whose identity may not yet be trusted by data consumer 109) that is marked in the transaction. Data consumer 109 uses public key 2013 to verify that the trust signature of the file was placed by the genuine data owner.

Trust verification check for blocked transactions: Data consumer 109 verifies the trustworthiness of a file downloaded from storage 2038 by comparing the message digest of the file against the message digest present in an unblocked transaction managed by permissioning entity 440. Data consumer 109 queries permissioning entity utility 2034 to fetch the transaction corresponding to the file. In some examples, data consumer 109 alternatively requests from permissioning entity utility 2034 the collection of all not-yet-blocked transactions. Data consumer 109 then verifies that the computed message digest of the file matches the message digest of the file stored in the transaction. Data consumer 109 obtains public key 2013 of the alleged data owner that is marked in the transaction. Data consumer 109 uses public key 2013 to verify that the trust signature of the file was placed by the genuine data owner.

Retrieving the public blockchain record: Data consumer 109 or data owner 111 sends a request from client application 2014*a* or 2014*b* using querying capability of the client function (e.g., computational capability 2016 or 2018). This request is sent to permissioning entity utility 2034 which retrieves blockchain 410 (or a specifically-requested portion of blockchain 410) stored in storage 2038, and packages the requested data into a data interchange format. The interchange format may be JavaScript Object Notation (JSON), comma-separated value (CSV) file, flat text, binary or other form. The packaged blockchain is sent back to client application 2014*a* or 2014*b* and stored locally on data owner's computer network 2010 or data consumer's computer network 2050.

Verifying the integrity of the blockchain: After blockchain 410 (or a portion) is retrieved and stored locally, or if blockchain 410 is being viewed using a web interface, data consumer 109 may use out-of-band date proof 610, which is externally published and managed, to verify that the message digest published in out of band proof 610 matches an independent calculation that is performed by data consumer 109. This verifies for data consumer 109 that the message digest being viewed locally has the same value as what everyone else should see. Data consumer 109 may then uses the locally stored copy of blockchain 410, as needed, for example to verify the integrity of additional data sets that had been registered in blockchain 410. In some examples, computational capability or 2018 (or computational capability 2016 for data owner 111) recalculates every message digest used to link blocks of blockchain 410. In some examples, computational capability or 2018 (or computational capability 2016 for data owner 111) also recalculates message digests used to link records within blocks of blockchain 410. If a message digest independently calculated by data consumer 109 (or data owner 111) does not match the corresponding message digest in blockchain 410, this is a signal that the copy of blockchain 410 may not be correct (i.e., the integrity of the copy blockchain 410 has been compromised) and so is invalid.

If, however, if the local copy blockchain 410 has been verified against out-of-band date proof 610, client application 2014*a* or 2014*b* uses its querying capability to send a request to permissioning entity utility 2034 to retrieve various blocks and their message digests (which are also stored in the subsequent blocks) from a centrally hosted copy of blockchain 410 (located on permissioning entity's computer network 2030, or elsewhere). Client application 2014*a* or 2014*b* verifies that the returned message digests from the centrally hosted copy of blockchain 410 match those independently calculated (generated) by data consumer 109 (or data owner 111) using the local copy of blockchain 410. If these values all match, data consumer 109 (or data owner 111) has some level of confidence that their local copy of blockchain 410 matches the centrally hosted copy of blockchain 410. If the values do not match, data consumer 109 (or data owner 111) becomes aware of a potential error in either their local copy of blockchain 410 or the centrally hosted copy of blockchain 410, and may contact permissioning entity 440 to alert permissioning entity 440.

In some examples, the mismatch between message digests independently calculated by data consumer 109 and message digests retrieved by data consumer 109 from across network 130 may occur due to the effect of APT 2060 on computer network 2030 (as-yet undetected by permissioning entity 440) or because data consumer 109 had retrieved a copy of spoofed blockchain 420. It is here that out-of-band date proof 610 provides value, be assisting data consumer 109 in ascertaining which scenario is more likely. If out-of-band date proof 610 matches the independently calculated message digests, APT 2060 may be operating on computer network 2030. If, however, out-of-band date proof 610 matches those provided over network 130, data consumer 109 may have instead retrieved spoofed blockchain 420 (rather than a legitimate copy of blockchain 410).

Centrally managed blockchain 410 enables those who have shared information, and others who are arbitrators of information, to apply secure signatures attesting to information authenticity (origin) and veracity (correctness). Using public/private key encryption technology as barriers to forgery, signatures may be cryptographically verified by others. This blockchain approach solves the problem of determining the level of trust to place in information and data that are shared through third-party repositories. Considering current cloud-based examples, information that is shared through such services may carry the name of a purported sharing entity (e.g. a user name or other source identification). However, outside the use of a blockchain, attempt to verify that the retrieved information and data had not been forged may be burdensome or incomplete. Further, mechanisms for sharing parties to verify that their uploaded information and data has not been altered or replaced (either intentionally or accidentally), by the data sharing service, may also be burdensome or incomplete. Solutions disclosed herein solve these challenges. Those who share information may now digitally attest to the correctness of the information on a data sharing platform, by signing data as a proclamation: "This shared information was verified to be correct, complete, and is exactly the information I intended to share". Information consumers may use the digital signatures to ascertain the sharing entity's intent, to verify that the authenticity of the data sharer, and to further impart confidence in the information by reviewing additional signatures applied by information arbiters. This establishes a level of trust in shared data that may be useful for sensitive information and when parties sharing and consuming information have not established a mutually-trusted data exchange channel.

Figure 21:
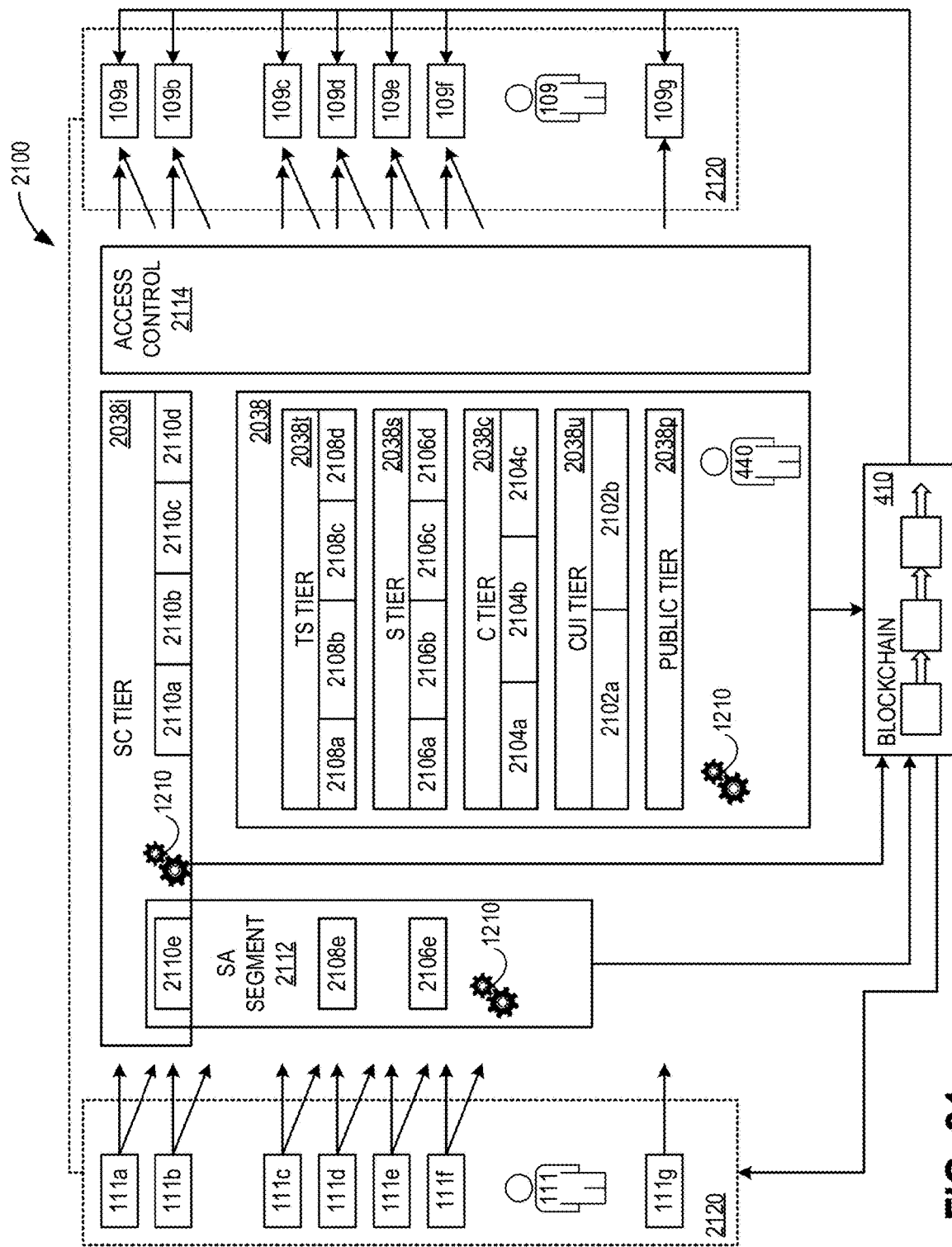
FIG. 21 illustrates a stratified and segmented storage solution suitable for use with various classification levels of information registered with a common blockchain.

FIG. 21 illustrates a stratified and segmented storage solution 2100 suitable for use with various classification levels of information that is all registered with blockchain 410. A plurality of data owners 111a-111g register their digital content with blockchain 410, even though the digital content itself may have distribution limitations. A community 2120 of data consumers 109a-109g and data owners 111a-111g all may access blockchain 410, and are each able to identify forgery attempts of any blocks or records in blockchain 410 (e.g., by checking message digests), even though of data consumers 109a-109g are unable to actually receive all of the digital content registered with blockchain 410. This example demonstrates an advantageous aspect of off-chain storage, in which in the blockchain does not contain content from the digital content files.

Storage solution 2100 has a public tier 2038p that stores information that is publicly available, without distribution limitation. Although public tier 2038p is illustrated as being within storage 2038 (which is operated by permissioning entity 440), public tier 2038p may be larger than merely what is within storage 2038, and may extend outside the control of permissioning entity 440. A controlled unclassified information (CUI) tier 2038u is segmented into segment 2102a and segment 2102b, based on the types of information (e.g., personal identifiable information (PII), a.k.a. personal information (PI), or proprietary information). This permits selective access to information by data consumers 109a-109g, according to the type of information. Thus, storage 2038 is stratified and segmented according to access limitations.

A confidential tier (C tier) 2038c holds information that is classified at the confidential level, in different segments (e.g., segment 2104a, segment 2104b, and segment 2104c), to permit selective access to information by data consumers 109a-109f, according to the type of information. A secret tier (S) tier 2038s holds information that is classified at the secret level, in different segments (e.g., segment 2106a, segment 2106b, segment 2106c, and segment 2106d), to permit selective access to information by data consumers 109a-109f, according to the type of information. A top secret (TS) tier 2038t holds information that is classified at the top secret level, in different segments (e.g., segment 2108a, segment 2108b, segment 2108c, and segment 2108d), to permit selective access to information by data consumers 109a-109d, according to the type of information. A sensitive compartmented (SC) tier 2038i holds information that is concerning or derived from sensitive intelligence sources, methods, or analytical processes, in different compartments (e.g., segment 2110a, segment 2110b, segment 2110c, and segment 2110d), to permit selective access to information by data consumers 109a and 190b. A special access (SA) segment 2112 holds information that is subject to special access requirements, and which itself may be at different classification tiers, such as an SC segment 2110e, a TS segment 2108e, and a S segment 2106e. In some examples, different hardware storage solutions are used for the different tiers and segments.

In operation, data owner 111a and data owner 111b are permitted to write to any segments in SC tier 2038i, TS tier 2038t, S tier 2038s, C tier 2038c, and CUI tier 2038u for which they have privileges, and also public tier 2038p. Any of the digital content written by data owners 111a and 111b to those storage locations may be registered, via records, in blockchain 410. Data consumer 109a and data consumer 109b are permitted to read from any segments in SC tier 2038i, TS tier 2038t, S tier 2038s, C tier 2038c, and CUI tier 2038u for which they have privileges, and also public tier 2038p. Data owner 111c and data owner 111d are permitted to write to any segments in TS tier 2038t, S tier 2038s, C tier 2038c, and CUI tier 2038u for which they have privileges, and also public tier 2038p. Any of the digital content written by data owners 111c and 111c to those storage locations may be registered, via records, in blockchain 410. Data consumer 109c and data consumer 109d are permitted to read from any segments in TS tier 2038t, S tier 2038s, C tier 2038c, and CUI tier 2038u for which they have privileges, and also public tier 2038p.

Data owner 111e and data owner 111f are permitted to write to any segments in S tier 2038s, C tier 2038c, and CUI tier 2038u for which they have privileges, and also public tier 2038p. Any of the digital content written by data owners 111e and 111f to those storage locations may be registered, via records, in blockchain 410. Data consumer 109e and data consumer 109f are permitted to read from any segments in S tier 2038s, C tier 2038c, and CUI tier 2038u for which they have privileges, and also public tier 2038p. Data owner 111g is permitted to write to only public tier 2038p, and register the digital content in blockchain 410. Data consumer 109g is permitted to read from only public tier 2038p.

As indicated, a record generator 1210 is available in multiple locations to permit data owners 111a-111g to create their own records for digital content. This permits permissioning entity 440 to accept records and include them within blockchain 410, even when permissioning entity 440 does not store the digital content. That is, three modes of operation are available: (1) permissioning entity 440 receives digital content and generates records for blockchain 410; (2) permissioning entity 440 receives only records for inclusion in blockchain 410, but does not receive the digital content itself, or (3) permission entity 440 receives the digital content for storage and also receives records that had been generated by the data owners.

All of data owners 111a-1116 may access blockchain 410 to verify that records corresponding to stored (or otherwise registered) digital content appear within blockchain 410. Similarly, all of data consumers 109a-109g (and in some examples, even the general public) may also access the entirety of blockchain 410, despite access limitations on the digital content itself. This scheme enlarges community 2120 (data consumers 109a-109g and data owners 111a-111g) that is able to identify forgery attempts of any blocks or records in blockchain 410. In contrast, a blockchain that uses on-chain storage must be limited in distribution to only data owners and data consumers who have access to the digital content, curtailing the size of the community that is able to detect forgery attempts.

An access control 2114 authenticates each of data owners 111a-111g and data consumers 109a-109g to selectively permit accessing various portions of storage solution 2100 (or storage 2038) by tier and segment, and may also log access events such as writing and reading. In some examples, access control 2114 requires stricter levels of authentication for more restricted access conditions (e.g., higher classification level tiers or SA segment 2112). For example, little (if any) control may be required for reading from public tier 2038p (although writing to public tier 2038p may be more strictly controlled to prevent malicious or careless parties from bloating public tier 2038*p* with material that is not registered in blockchain 410), whereas a hardware token may be required for reading from C tier 2038*c* and higher tiers (e.g., 2038*s*, 2038*t*). In some examples, SC tier 2038*i*, SA segment 2112, and any other storage not controlled by permissioning entity 440 may have a separate access control solution.

Figure 22:
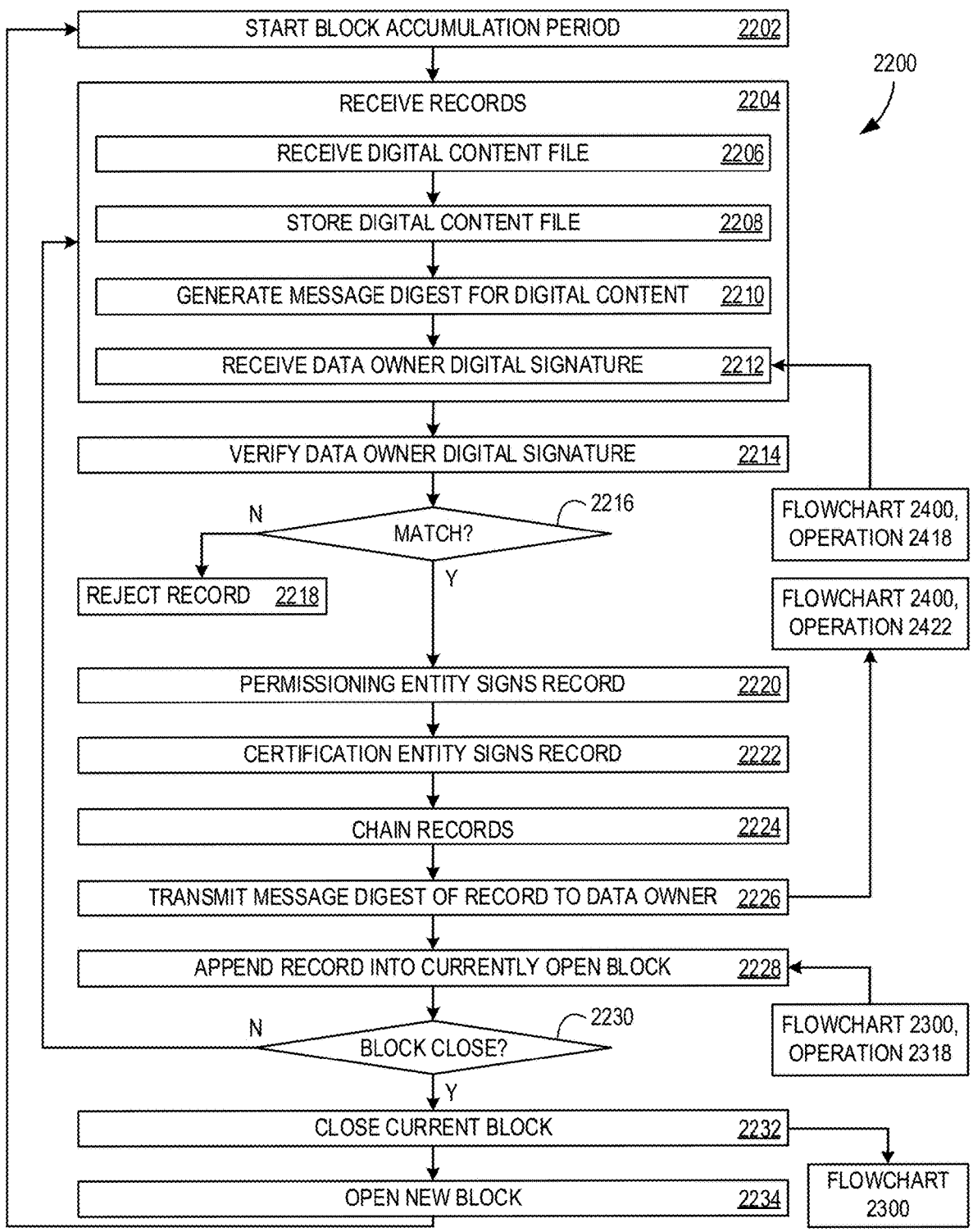
FIGS. 22-25 illustrate flowcharts of exemplary operations associated with disclosed examples of blockchain operations.
Figure 23:
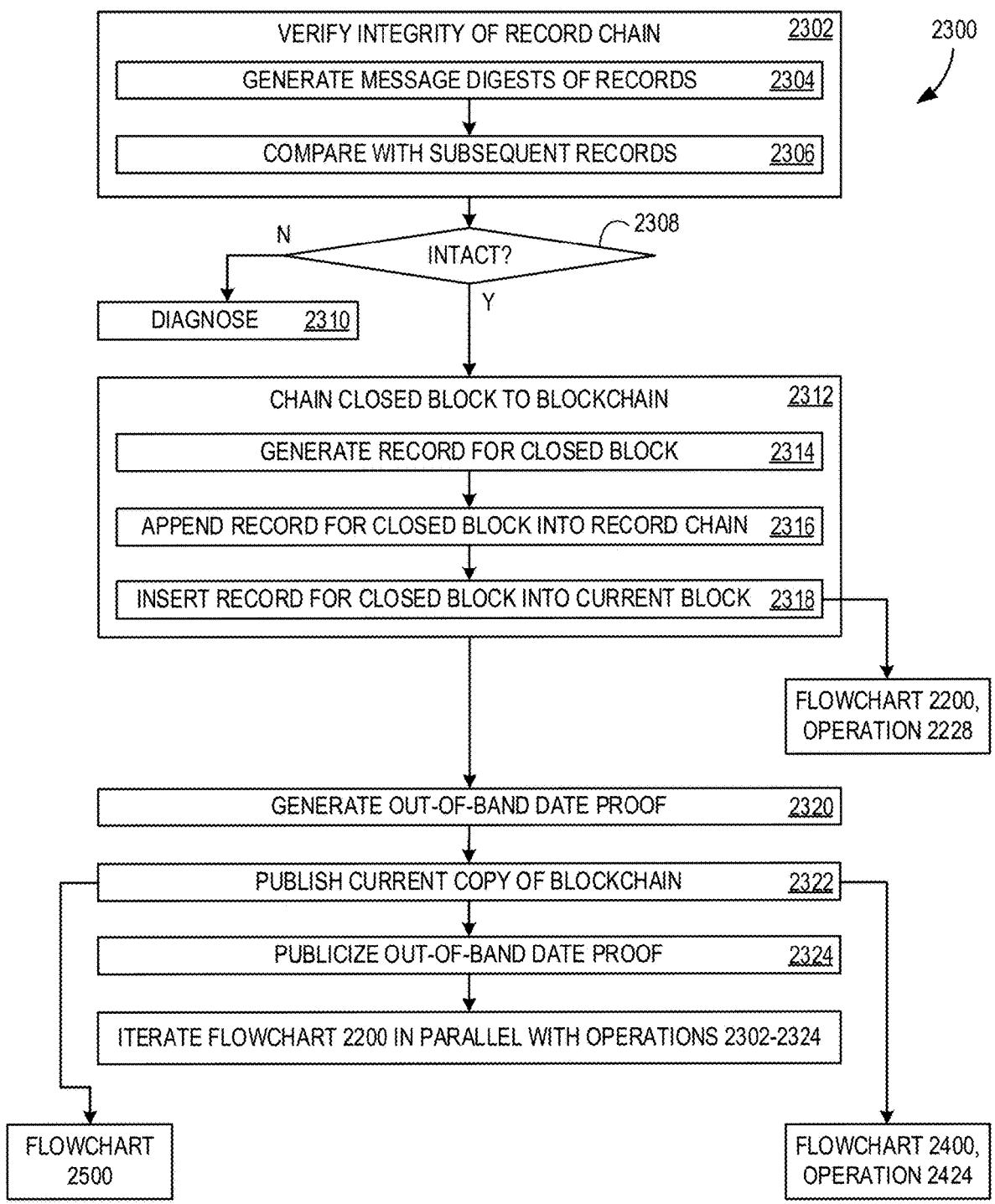
Figure 24:
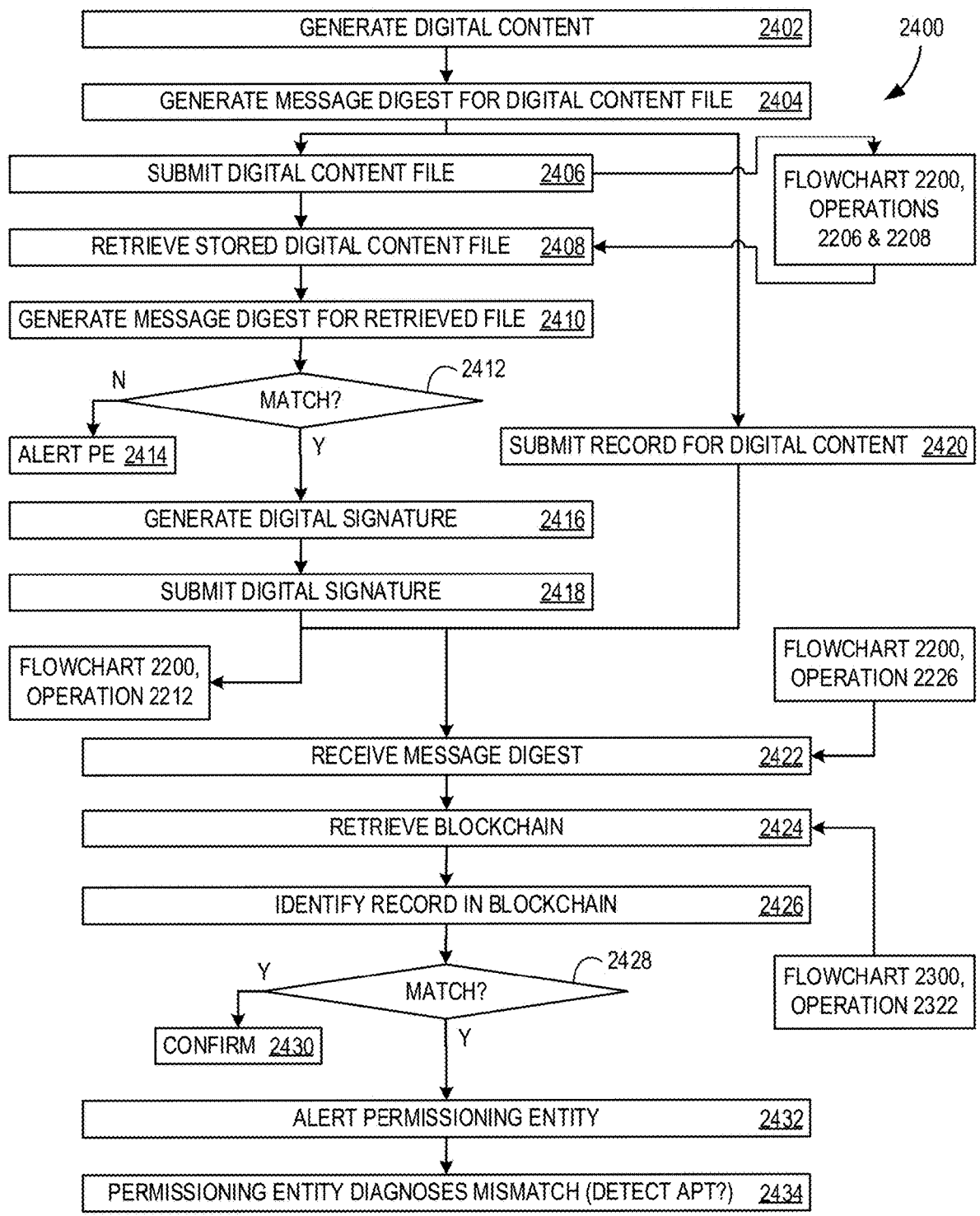
Figure 25:
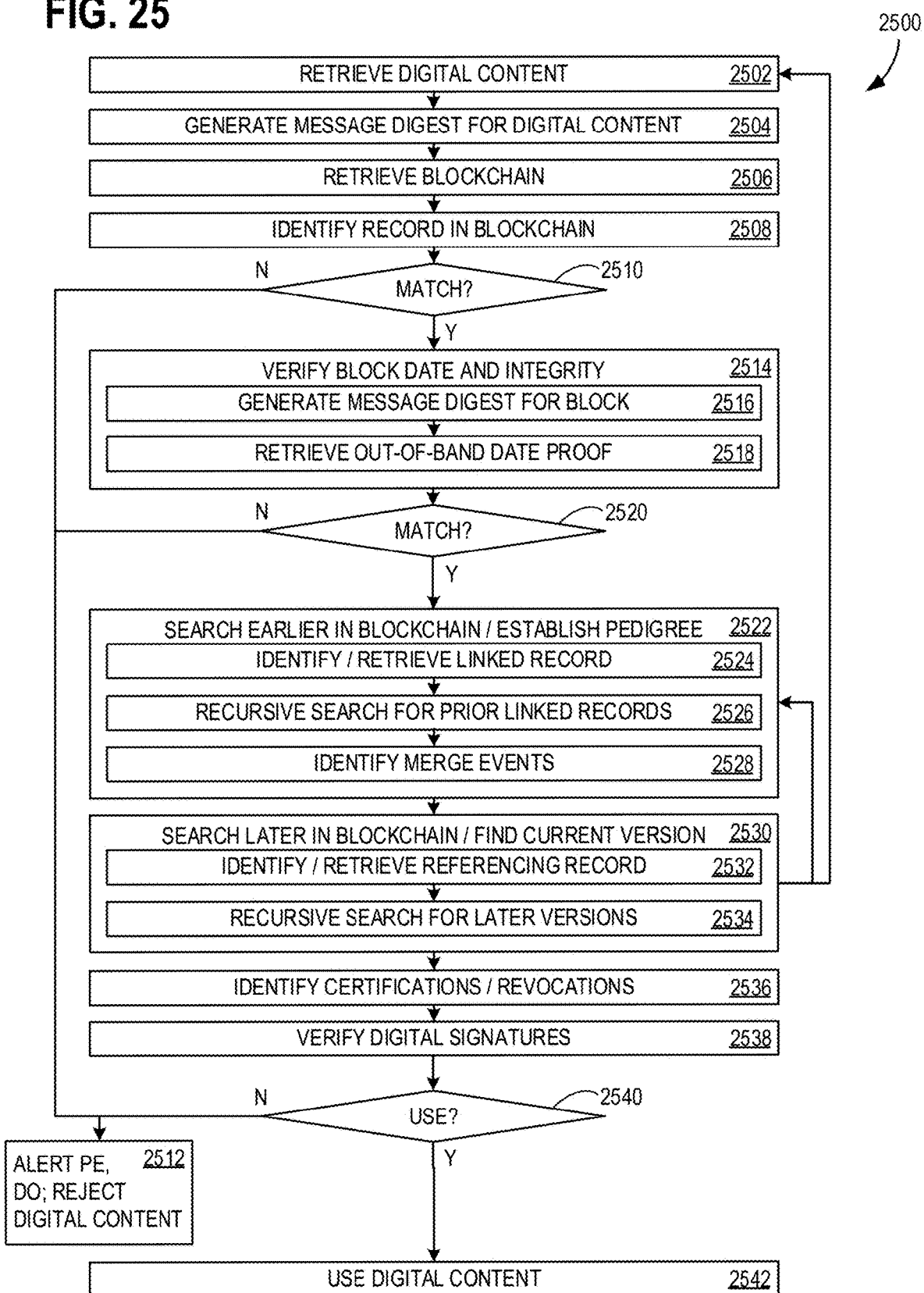

FIGS. 22-25 illustrate flowcharts of exemplary operations associated with disclosed examples of blockchain operations. Specifically, FIG. 22 illustrates a flowchart 2200 of assembling blocks of blockchain 410; FIG. 23 illustrates a flowchart 2300 of verifying the integrity of a recently closed block prior to chaining it to blockchain 410; FIG. 24 illustrates a flowchart 2400 of actions by data owner 111 when submitting a record or digital content 114 for registration in blockchain 410; and FIG. 25 illustrates a flowchart 2500 of actions by data consumer 109 when using blockchain 410 to ensure integrity of digital content 114. Flowcharts 2200, 2300, 2400, and 2500 all operate in an ongoing cooperative manner, in parallel. In some examples, flowcharts 2200, 2300, 2400, and 2500 show processes that are equivalent to, and/or have corresponding operations as flowcharts 900, 1700, 1800, and 1900, and message sequence diagram 1000. That is, disclosed blockchain operations may reference enumerated operations from among any mixed set of the flowcharts and message sequence diagram shown herein. In some examples, at least a portion of each of flowcharts 2200, 2300, 2400, and 2500 may be performed using one or more computing devices 2600 of FIG. 26.

Turning first to FIG. 22, flowchart 2200 may be performed by permissioning entity 440, in some examples. Operation 2202 starts a block accumulation period (e.g., block accumulation period 1231), and subsequent operations 2204-2230 occur during the block accumulation period. Operation 2204 includes receiving a plurality of records in a sequence, each record of the plurality of records respectively comprising a record for a digital content file and including a message digest for the digital content file. In some examples, a data owner (e.g., data owner 111) submits the record directly, and not the digital content. In such examples, receiving the record for the digital content file may further comprises receiving the digital signature of the digital content file by the data owner of the digital content file (i.e., the record arrives with the date owner's digital signature). In other examples, however, operation 2204 is accomplished via operations 2206-2212.

Operation 2206 includes receiving the digital content file, operation 2208 includes storing the digital content file as a stored digital content file, and operation 2210 includes generating, for the digital content file, the message digest that is included within the record for the digital content file. In some examples, the initial record in a new block is the record for the preceding block (see FIGS. 13 and 14 and their descriptions). In some examples, the message digest comprises at least a portion of a SHA function message digest. In some examples, the message digest comprises at least a portion of a first message digest from a first hash function and at least a portion of a second message digest from a second hash function. In some examples, the message digest comprises a first message digest for a concatenation of the digital content file with a second message digest for the digital content. In some examples, the message digest comprises a portion, less than the entirety, of a message digest from a hash function.

Operation 2212 includes receiving the digital signature of the digital content file by the data owner of the digital content file. This is the output of operation 2418 of flowchart 2400. The entity that generates the blockchain (e.g., permissioning entity 440) verifies the data owner's digital signature as 2214. There are options for the data owner's digital signature: the data owner may sign the message digest or the digital content itself. Thus, some examples of operation 2214 include verifying that the message digest for the digital content file within the record for the digital content file matches an independently-generated message digest for the digital content file. Decision operation 2216 determines whether there is a match. If there is no match, the record is rejected in operation 2218, and not included in the block. Otherwise, the entity that generates the blockchain (permissioning entity 440) digitally signs the record at 2220. Operation 2220 includes, based on at least the message digest for the digital content file within the record for the digital content file matching the independently-generated message digest for the digital content file, inserting a digital signature of the digital content file by the entity that generates the blockchain into the record for the digital content file.

To accomplish this, operation 2220 includes generating a digital signature of the digital content file by the entity that generates the blockchain (or in some cases, the record chain). In some examples, operation 2220 includes, prior to generating a digital signature of the digital content file by the entity that generates the blockchain, verifying that the message digest for the digital content file within the record for the digital content file matches an independently-generated message digest for the digital content file. In some examples, operation 2220 includes, prior to generating the digital signature of the digital content file by the entity that generates the blockchain, verifying the digital signature of the digital content file by the data owner of the digital content file.

The records may include digital signatures of not only the data owner and/or the permissioning entity (the entity that generates the blockchain), but also a digital certification entity's signature (e.g., certification entity 210). The certification entity signs the record in operation 2222. Operation 2222 includes inserting a digital signature of the digital content file by a certification entity into the record for the digital content file. In some examples, at least one record of the plurality of records further includes, in addition to the message digest for the digital content file and the message digest for the earlier record, a digital signature of the digital content file by a data owner of the digital content file, and/or a digital signature of the digital content file by an entity that generates the blockchain. In some examples, at least one record of the plurality of records further comprises a digital signature of the digital content file by a certification entity, indicating that the digital content file has been examined for trustworthiness. In some examples, at least one record of the plurality of records further comprises a certification linking field indicating, by its position within the record for the digital content file that, when the certification linking field references another record, the digital content file comprises at least one file selected from the list consisting of: a certification for another digital content file, a revocation of certification for another digital content file, and content for which another digital content file provides certification, wherein the reference to the other record comprises a blockchain address of a record for the first prior-version digital content file. Alternatively, certification may be indicated by a separate record (e.g., record 414 of FIG. 4A).

The records may also include timestamps (see FIG. 15). In some examples, at least one record of the plurality of records further comprises a digital content timestamp indicating a time for the digital content file. In some examples, at least one record of the plurality of records further comprises a record timestamp indicating a time for the record for the digital content file. In some examples, the digital content timestamp is included within a digital signature by the data owner. In some examples, the record timestamp is included within a digital signature by the data owner. In some examples, the record timestamp indicates a time of the receiving of the record.

The records may also include linking fields (see FIGS. 15 and 16). In some examples, at least one record of the plurality of records further comprises a first linking field indicating, by its position within the record for the digital content file that, when the first linking field references a first other record, the digital content file comprises a later version of a first prior-version digital content file, wherein the first other record comprises a record for the first prior-version digital content file. In some examples, the reference to the first other record comprises a blockchain address of a record for the first prior-version digital content file. In some examples, the blockchain address comprises an index of the record for the prior-version digital content file within a block in which the record for the prior-version digital content file appears. In some examples, at least one record of the plurality of records further comprises a second linking field indicating, by its position within the record for the digital content file that, when the first linking field references the first other record and the second linking field references a second other record, the digital content file comprises a merge of the first prior-version digital content file and a second first prior-version digital content file, wherein the second other record comprises a record for the second prior-version digital content file. In some examples, the block in which the record for the prior-version digital content file appears is the block in which the record for the digital content file appears. In some examples, the block in which the record for the prior-version digital content file appears is earlier within the blockchain than the block in which the record for the digital content file appears.

Operation 2224 includes chaining the plurality of records using message digests, to produce a record chain. Chaining records comprises inserting a message digest for an earlier record into a subsequent record. In some examples, the subsequent record is the immediately subsequent record. In some examples, chaining the received plurality of records comprises chaining the received plurality of records according to the sequence of receiving, to produce a record chain. Operation 2226 includes, during the block accumulation period in which the record for the digital content file is received, transmitting, over a network, to a data owner of the digital content file, a message digest of the record for the digital content file that is used for chaining a record subsequent to the record for the digital content file to the record for the digital content file in the record chain. The output of operation 2226 is an input to operation 2422 of flowchart 2400. Operation 2228 includes appending the plurality of records into a currently open block of a blockchain. In some examples, the first record in an open block is the output of operation 2318 of flowchart 2300. Appending the plurality of records into the currently open block comprises appending the record chain into the currently open block.

Decision operation 2230 determines whether a trigger condition has occurred to end the block accumulation period, such as the date, time of day, or reaching an accumulated number of records. Upon the end of the block accumulation period, operation 2232 includes closing the currently open block to additional records, rendering the currently open block into a closed block, and triggering the start of a cycle of flowchart 2300 (of FIG. 23). Operation 2234 includes opening a new current block into which a future plurality of records may be appended. Flowchart 2200 returns to operation 2202 to iterate for the next block. Flowchart 2200 remains ongoing, triggering flowchart 2300 at the end of each block accumulation period.

Turning now to FIG. 23, showing flowchart 2300 (which may also be performed by permissioning entity 440, in some examples), operation 2302 includes verifying that the record chain has not been altered. This is accomplished by iterating operations 2304 and 2306 along the record chain. Operation 2304 includes generating new message digests for records within the record chain; and operation 2306 includes comparing the new message digests with message digests in subsequent records that are used for chaining records in the record chain. (See FIG. 15, specifically message digest field 1521). Decision operation 2310 determines whether the record chain is intact (i.e., no mismatches).

If the record chain is not intact, this may be due to the presence of an APT operating on computing network 2030, but may also be due to non-malicious causes, such as data or record errors. The failure if diagnosed in operation 2310, which may also include remedying the source of errors and restarting operation 2302 with a rebuilt record chain.

If the record chain is intact, operation 2312 includes chaining the closed block to the blockchain, wherein chaining blocks to the blockchain comprises inserting a message digest for an earlier block (the recently closed block) into a subsequent block. In some examples, the subsequent block is the immediately subsequent block. Operation 2312 may be accomplished using operations 2314-2318. Operation 2314 includes generating a record for the closed block (the earlier block than the now-current block). The record for the earlier block includes a message digest for the earlier block. In some examples, the record for the earlier block includes a digital signature of the earlier block by the entity that generates the blockchain. Operation 2316 includes appending the record for the closed block into the record chain. In some examples, this includes inserting the record for the earlier block (the closed block) into the record chain, so that the record for the earlier block further includes a message digest of a final record of the record chain within the earlier block. In this manner, the record chain provides a first chaining tier and chaining the multiple blocks provides a second chaining tier.

Operation 2318 includes inserting the record for the earlier block into the subsequent block. This ties flowchart 2300 back to flowchart 2200, because the output of operation 2318 of flowchart 2300 is an input to operation 2228 of flowchart 2200. Operation 2320 includes generating, for the closed block, an out-of-band date proof, the out-of-band date proof comprising a message digest for the closed block that is used for chaining a block subsequent to the closed block to the closed block in the blockchain.

The current copy of the blockchain, with the new block, is published in operation 2322 for public inspection. This enables flowcharts 2400 and 2500 to run with the new blockchain version, specifically operation 2424 of flowchart 2400. The out-of-band date proof is publicized in operation 2324. Flowchart 2300 then iterates operations 2302-2320 in parallel with the iteration of flowchart 2200, while flowcharts 2400 and 2500 operate on an as-needed basis for data owners and data consumers.

FIG. 24 shows flowchart 2400, which is performed by data owners (e.g., data owner 111), except for final operation 2434. Operation 2302 includes generating or obtaining digital content (e.g., digital content 114). Operation 2404 includes generating a message digest for the digital content file. There are two options for the data owner. The data owner may either generate the record and submitting it (operation 2420, below) or submitting the digital content as a digital content file so that permissioning entity 440 generates the record (operations 2406-2418).

With the digital content submission option, operation 2406 includes submitting the digital content as a digital content file. This is the input to operation 2206 of flowchart 2200 (not shown on flowchart 2200 due to space constraints). Operation 2408 includes retrieving, over a network, by the data owner, the stored digital content file. This occurs after operation 2208 of flowchart 2200 (also not shown on flowchart 2200 due to space constraints). Operation 2410 includes generating a message digest for the retrieved stored digital content file, and decision operation 2412 includes comparing message digests from operations 2304 and 2308. If there is not a match, the data owner alerts the permissioning entity as part of operation 2414. This condition indicates that there may be errors or an APT in permissioning entity's system. Otherwise, the data owner digitally signs the digital content file or the message digest of the digital content file, in operation 2416. The data owner's digital signature is submitted in operation 2418, which is an input to operation 2212 of flowchart 2200.

Alternatively, the data owner holds the digital content itself (which may be the case for certain information, as indicated in FIG. 21), and operation 2420 includes submitting the record for the digital content to the permissioning entity. In some cases, the record for the digital content (submitted by the data owner) contains a digital signature by the data owner of the digital content file or the message digest of the digital content file.

When flowchart 2200 reaches operation 2226 and transmits the message digest for the completed record (the same message digest that is used in the record chain), the data owner receives the message digest in operation 2422. Operation 2422 includes receiving, by the data owner of the digital content file, the transmitted message digest. When flowchart 2300 reaches operation 2322, and the new version of blockchain 410 is published, the data owner retrieves the blockchain in operation 2424. Operation 2424 includes retrieving, over the network, a copy of at least a portion of the blockchain, the portion of the blockchain comprising the closed block in which the record for the digital content file is included.

Operation 2426 includes identifying, within the blockchain, the record for the digital content. Decision operation 2428 includes comparing the transmitted message digest with the message digest within the record for the digital content file within the closed block that is used for chaining the record subsequent to the record for the digital content file to the record for the digital content file. If there is a match, the data owner may confirm this to the permissioning entity in operation 2430, or may just note that the integrity proof for the digital content is proceeding properly. Otherwise, operation 2432 includes, responsive to a mismatch between the transmitted message digest with the message digest within the record for the digital content file within the closed block that is used for chaining the record subsequent to the record for the digital content file to the record for the digital content file, generating an alert for the entity that generates the blockchain and/or an entity that generates the blockchain. In operation 2434, the permissioning entity diagnoses the cause of the mismatch, possibly identifying the presence of an APT (e.g., APT 2060).

FIG. 25 shows flowchart 2500, which is performed by data consumers (e.g., data consumer 109). Operation 2524 includes retrieving, by a data consumer, a copy of the retrieved content. In some examples, the digital content is retrieved from storage 2038; in some examples, it is retrieved directly from a data owner. Operation 2504 includes generating a message digest for the retrieved stored digital content file. Operation 2506 includes retrieving, over a network, by a data consumer, a copy of at least a portion of the blockchain, the portion of the blockchain comprising the closed block in which the record for the digital content file is included. Operation 2508 includes identifying, within the blockchain, the record for the digital content. Decision operation 2510 determines whether the message digest found in the record for the digital content matches the message digest computed by the data owner in operation 2504. That is, operation 2510 includes comparing the generated message digest for the retrieved stored digital content file with the message digest for the digital content file within the record for the digital content file within the closed block.

If there is a mismatch, the data consumer should alert the permissioning entity, the data owner, and publicizes the failure to warn others that the downloaded digital content may not be trustworthy. Additionally, the data consumer should reject the digital content, and not use it. This occurs in operation 2512. Otherwise, the data consumer proceeds to operation 2514 to verify the integrity and no-later-date-of-existence of the block. Operation 2514 includes operations 2516 and 2518. Operation 2516 includes generating a message digest for the retrieved closed block, and operation 2518 includes retrieving the out-of-band date proof comprising a message digest for the closed block. A decision operation 2520 determines whether the message digest calculated in operation 2516 matches the out-of-band date proof (e.g., out-of-band-date proof 610) by comparing the generated message digest for the retrieved closed block with the message digest from the out-of-band date proof. A mismatch directs flowchart 2500 to operation 2512.

Otherwise, with the independently-calculated message digest of the block matching the message digest found in the out-of-band date proof, and the independently-calculated message digest of the digital content matching the message digest found in the record within the block, the data consumer may have confidence that the digital content has a no-later-than date-of-existence as of the date of out-of-band date proof. At this point, the data consumer may wish to check the digital signatures. For example, data consumer 109 may wish to verify digital signature 2020 (of data owner 111) using public key 2013 (for data owner 111), digital signature 2040 (of permissioning entity 440) using public key 2033 (for permissioning entity 440), and any digital signature of certification entity 210. This will be accomplished in operation 2538, and the data consumer has the option to perform such checks, now.

However, the data consumer may prefer to verify that the retrieved digital content is the latest version, examine its, pedigree, and identify whether any certifications (e.g., absence of malicious logic, fitness for a particular purpose, or other) have been issued and are valid. Thus, operation 2522 (comprising operations 2524-2528) searches earlier in the blockchain for records of prior versions of the digital content to establish a pedigree of the digital content. Operation 2524 includes identifying, within the record for the digital content a reference to a first other record within a first linking field (see linking fields portion 1560 of record 1500, specifically linking fields 1561 and 1652 in FIG. 15). The first linking field indicates, by its position within the record for the digital content file that, when the first linking field references a first other record, the digital content file comprises a later version of a first prior-version digital content file, wherein the first other record comprises a record for the first prior-version digital content file. Operation 2524 also includes retrieving, from the blockchain, the first other record.

With that other record retrieved, the search for prior linked records may be repeated recursively, until the earliest record is located and retrieved. Operation 2526 includes searching, within the first other record for a linking field reference to an earlier prior-version record, and iteratively searching the blockchain for prior version records to establish a pedigree of the digital content file. Operation 2528 identifies merge events, as described above. Merge events may also be identified recursively, for example if a plurality of files were merged in a plurality of merge events to produce the current digital content.

The blockchain may also be traversed later in time, to identify superseding versions, and ultimately, the latest (current) version of the digital content, in operation 2530. This may be accomplished for searching, within the blockchain for any later records that have, within their linking field, the address of the current record. This process may also be performed recursively, until the latest record is identified. Operation 2530 includes operations 2532 and 2434. Operation 2532 includes searching, within blocks of the blockchain that are subsequent to the closed block in which the record for the digital content file appears, for references to the record for the digital content file. The records are also retrieved. Operation 2534 includes, responsive to identifying a reference to the record for the digital content file in a referencing record, determining whether determining whether the referencing record comprises a record for a later version of the digital content file. Operation 2534 also includes, responsive to determining that the referencing record comprises the record for the later version of the digital content file, iteratively searching the blockchain for further later versions of the digital content file.

For any later versions identified, operation 2522 may be performed to establish the pedigree of that later version and to identify whether that later version is the result of a merge event. Additionally, all versions identified may also be verified for integrity and no-later-than date-of-existence before returning to operation 2502 for the other versions located.

At this point, the data consumer now has some certainty that the digital content is the current version (if version control was thorough), and has established its pedigree. All of this is accomplished without needing to go outside of the blockchain (blockchain 410), and worrying that such versioning information may have been lost (if stored elsewhere). And, simultaneously, the blockchain itself has not disclosed the actual digital content, because the date consumer could only access the digital content by accessing the proper storage location and possessing the proper access privileges (see FIG. 21). And further, the permissioning entity (permissioning entity 440) has been alerted if any APT (APT 2026) has been corrupting waiting records (that have not yet been placed into blockchain 410) or files (on storage 2038). All of these benefits have accrued in a blockchain architecture that is compact (i.e., no bloating with large files) and is not threatened by a consensus community that may be hijacked by hostile, well-funded entities.

Further benefits of this blockchain architecture are manifest in following operations 2536 and 2538. Operation 2536 includes identifying certifications and certification revocations. This permits the data consumer to have some degree of confidence that an expert entity has examined the digital content and deemed it to be unsafe, or if that had occurred and the digital entity then revoked the certification, the data consumer will be alerted. For example, operation 2536 may include identifying, within the record for the digital content, a reference to a third other record within a certification linking field, the certification linking field indicating, by its position within the record for the digital content file that, when the certification linking field references a third other record, the digital content file comprises a record of a certification for the digital content file or a record of a revocation of the certification for the digital content file. Alternatively, operation 2536 may include identifying, within the record for the digital content, a digital signature of a certification entity. Operation 2536 may also include iteratively searching the blockchain for other certifications or certification revocations. Referencing FIG. 15, certifications and revocations of certifications may be indicated using digital signature and time stamp fields, similar to those in data custodian fields portions 1540 and permissioning entity fields portions 1550 replacing Operation 2538 verifies digital signatures in the record(s) located. For example, data consumer 109 verifies digital signature 2020 (of data owner 111) using public key 2013 (for data owner 111), digital signature 2040 (of permissioning entity 440) using public key 2033 (for permissioning entity 440), and any digital signature of certification entity 210. This operation enables identification of collusion attempts of any of data owner 111, permissioning entity 440, and certification entity 210 with attacker 120. These additional benefits further distinguish the value of the architecture of blockchain 410.

Decision operation 2540 determines whether all of the factors thus far examined point toward the digital content (digital content 114) being safe to use. If not, flowchart 2500 moves to operation 2512. Otherwise, the digital content is used in a product in operation 2542. For example, operation 2542 may include, responsive to a match between the generated message digest for the retrieved stored digital content file and the message digest for the digital content file within the record for the digital content file within the closed block, inserting digital content from the digital content file into a product. In some examples, inserting digital content from the digital content file into a product comprises responsive to both a match between the generated message digest for the retrieved stored digital content file and the message digest for the digital content file within the record for the digital content file within the closed block, and a match between the generated message digest for the retrieved closed block and the message digest for the closed block within the out-of-band date proof, inserting digital content from the digital content file into a product.

Figure 26:
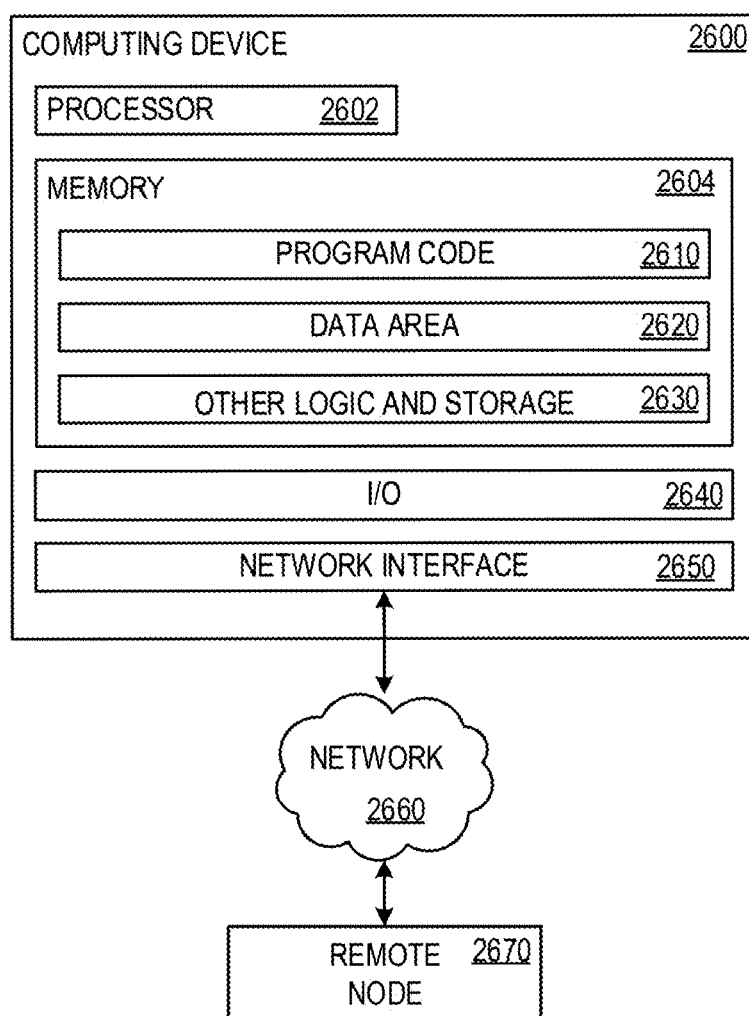
FIG. 26 illustrates a block diagram of a computing device suitable for implementing various aspects of the disclosure.

FIG. 26 illustrates a block diagram of computing device 2600 that may be used as any component described herein that may require computational or storage capacity. Computing device 2600 has at least a processor 2602, and a memory 2604 that holds program code 2610, data area 2620, and other logic and storage 2630. Memory 2604 is any device allowing information, such as computer executable instructions and/or other data, to be stored and retrieved. For example, memory 2604 may include one or more random access memory (RAM) modules, flash memory modules, hard disks, solid-state disks, persistent memory devices, and/or optical disks. Program code 2610 comprises computer executable instructions and computer executable components including any instructions necessary to perform operations described herein. Data area 2620 holds any data necessary to perform operations described herein. Memory 2604 also includes other logic and storage 2630 that perform or facilitate other functions disclosed herein or otherwise required of computing device 2600. An input/output (I/O) component 2640 facilitates receiving input from users and other devices and generating displays for users and outputs for other devices. A network interface 2650 permits communication over a network 2660 with a remote node 2670, which may represent another implementation of computing device 2600.

ADDITIONAL EXAMPLES

An example method of establishing integrity of digital content comprises: during a block accumulation period: receiving a plurality of records in a sequence, each record of the plurality of records respectively comprising a record for a digital content file and including a message digest for the digital content file; chaining the plurality of records using message digests, to produce a record chain, wherein chaining records comprises inserting a message digest for an earlier record into a subsequent record; and appending the plurality of records into a currently open block of a blockchain; upon an end of the block accumulation period: closing the currently open block to additional records, rendering the currently open block into a closed block; and opening a new current block into which a future plurality of records may be appended; chaining the closed block to the blockchain, wherein chaining blocks to the blockchain comprises inserting a message digest for an earlier block into a subsequent block; and iteratively opening, appending, and chaining multiple blocks across multiple block accumulation periods to produce the blockchain, wherein the record chain provides a first chaining tier and chaining the multiple blocks provides a second chaining tier, and wherein the blockchain does not contain content from the digital content file.

Another example method of establishing integrity of digital content comprises: during a block accumulation period: receiving a plurality of records in a sequence, each record of the plurality of records respectively comprising a record for a digital content file and including a message digest for the digital content file; and appending the plurality of records into a currently open block of a blockchain; upon an end of the block accumulation period: closing the currently open block to additional records, rendering the currently open block into a closed block; and opening a new current block into which a future plurality of records may be appended; chaining the closed block to the blockchain, wherein chaining blocks to the blockchain comprises inserting a message digest for an earlier block into a subsequent block; and iteratively opening, appending, and chaining multiple blocks across multiple block accumulation periods to produce the blockchain, wherein the blockchain does not contain content from the digital content file, and wherein at least one record of the plurality of records further comprises: a digital signature of the digital content file by a data owner of the digital content file and a digital signature of the digital content file by an entity that generates the blockchain.

Another example method of establishing integrity of digital content comprises: during a block accumulation period: receiving a plurality of records in a sequence, each record of the plurality of records respectively comprising a record for a digital content file and including a message digest for the digital content file; and appending the plurality of records into a currently open block of a blockchain; upon an end of the block accumulation period: closing the currently open block to additional records, rendering the currently open block into a closed block; and opening a new current block into which a future plurality of records may be appended; chaining the closed block to the blockchain, wherein chaining blocks to the blockchain comprises inserting a message digest for an earlier block into a subsequent block; and iteratively opening, appending, and chaining multiple blocks across multiple block accumulation periods to produce the blockchain, wherein the blockchain does not contain content from the digital content file, and wherein at least one record of the plurality of records further comprises: a first linking field indicating, by its position within the record for the digital content file that, when the first linking field references a first other record, the digital content file comprises a later version of a first prior-version digital content file, wherein the first other record comprises a record for the first prior-version digital content file.

An example system for establishing integrity of digital content comprises: a processor; and a computer-readable medium storing instructions that are operative upon execution by the processor to: during a block accumulation period: receive a plurality of records in a sequence, each record of the plurality of records respectively comprising a record for a digital content file and including a message digest for the digital content file; chain the plurality of records using message digests, to produce a record chain, wherein chaining records comprises inserting a message digest for an earlier record into a subsequent record; and append the plurality of records into a currently open block of a blockchain; and upon an end of the block accumulation period: close the currently open block to additional records, rendering the currently open block into a closed block; and open a new current block into which a future plurality of records may be appended; chain the closed block to the blockchain, wherein chaining blocks to the blockchain comprises inserting a message digest for an earlier block into a subsequent block; and iteratively open, append, and chain multiple blocks across multiple block accumulation periods to produce the blockchain, wherein the record chain provides a first chaining tier and chaining the multiple blocks provides a second chaining tier, and wherein the blockchain does not contain content from the digital content file.

Another example system for establishing integrity of digital content comprises: a processor; and a computer-readable medium storing instructions that are operative upon execution by the processor to: during a block accumulation period: receive a plurality of records in a sequence, each record of the plurality of records respectively comprising a record for a digital content file and including a message digest for the digital content file; and append the plurality of records into a currently open block of a blockchain; upon an end of the block accumulation period: close the currently open block to additional records, rendering the currently open block into a closed block; and open a new current block into which a future plurality of records may be appended; chain the closed block to the blockchain, wherein chaining blocks to the blockchain comprises inserting a message digest for an earlier block into a subsequent block; and iteratively open, append, and chain multiple blocks across multiple block accumulation periods to produce the blockchain, wherein the blockchain does not contain content from the digital content file, and wherein at least one record of the plurality of records further comprises: a digital signature of the digital content file by a data owner of the digital content file and a digital signature of the digital content file by an entity that generates the blockchain.

Another example system for establishing integrity of digital content comprises: a processor; and a computer-readable medium storing instructions that are operative upon execution by the processor to: during a block accumulation period: receive a plurality of records in a sequence, each record of the plurality of records respectively comprising a record for a digital content file and including a message digest for the digital content file; and append the plurality of records into a currently open block of a blockchain; upon an end of the block accumulation period: close the currently open block to additional records, rendering the currently open block into a closed block; and open a new current block into which a future plurality of records may be appended; chain the closed block to the blockchain, wherein chaining blocks to the blockchain comprises inserting a message digest for an earlier block into a subsequent block; and iteratively open, append, and chain multiple blocks across multiple block accumulation periods to produce the blockchain, wherein the blockchain does not contain content from the digital content file, and wherein at least one record of the plurality of records further comprises: a first linking field indicating, by its position within the record for the digital content file that, when the first linking field references a first other record, the digital content file comprises a later version of a first prior-version digital content file, wherein the first other record comprises a record for the first prior-version digital content file.

Alternatively, or in addition to the other examples described herein, examples include any combination of the following:

generating, for the closed block, an out-of-band date proof, the out-of-band date proof comprising a message digest for the closed block that is used for chaining a block subsequent to the closed block to the closed block in the blockchain;

verifying that the record chain has not been altered by iteratively: generating new message digests for records within the record chain and comparing the new message digests with message digests in subsequent records that are used for chaining records in the record chain;

chaining the closed block to the blockchain comprises: responsive to the new message digests matching the message digests in subsequent records, chaining the closed block to the blockchain;

receiving the record for the digital content file comprises: receiving the digital content file and generating, for the digital content file, the message digest that is included within the record for the digital content file;

receiving the record for the digital content file further comprises receiving the digital signature of the digital content file by the data owner of the digital content file;

storing the digital content file as a stored digital content file;

retrieving, over a network, by a data consumer, the stored digital content file;

generating a message digest for the retrieved stored digital content file;

retrieving, over the network, a copy of at least a portion of the blockchain, the portion of the blockchain comprising the closed block in which the record for the digital content file is included;

comparing the generated message digest for the retrieved stored digital content file with the message digest for the digital content file within the record for the digital content file within the closed block;

responsive to a match between the generated message digest for the retrieved stored digital content file and the message digest for the digital content file within the record for the digital content file within the closed block, inserting digital content from the digital content file into a product;

generating a message digest for the retrieved closed block;

retrieving an out-of-band date proof comprising a message digest for the closed block;

comparing the generated message digest for the retrieved closed block with the message digest from the out-of-band date proof;

inserting digital content from the digital content file into a product comprises: responsive to both a match between the generated message digest for the retrieved stored digital content file and the message digest for the digital content file within the record for the digital content file within the closed block, and a match between the generated message digest for the retrieved closed block and the message digest for the closed block within the out-of-band date proof, inserting digital content from the digital content file into a product;

at least one record of the plurality of records further includes, in addition to the message digest for the digital content file and the message digest for the earlier record, a digital signature of the digital content file by a data owner of the digital content file, a digital signature of the message digest for the digital content file by a data owner of the digital content file, a digital signature of the digital content file by an entity that generates the blockchain, and/or a digital signature of a certification entity;

prior to generating a digital signature of the digital content file by an entity that generates the blockchain, verifying that the message digest for the digital content file within the record for the digital content file matches an independently-generated message digest for the digital content file;

prior to generating the digital signature of the digital content file by the entity that generates the blockchain, verifying the digital signature of the digital content file by the data owner of the digital content file;

verifying, by the entity that generates the blockchain, that the message digest for the digital content file within the record for the digital content file matches an independently-generated message digest for the digital content file;

based on at least the message digest for the digital content file within the record for the digital content file matching the independently-generated message digest for the digital content file, inserting a digital signature of the digital content file by the entity that generates the blockchain into the record for the digital content file;

the digital signature of the digital content file by the certification entity indicates that the digital content file has been examined for trustworthiness;

during the block accumulation period in which the record for the digital content file is received, transmitting, over a network, to a data owner of the digital content file, a message digest of the record for the digital content file that is used for chaining a record subsequent to the record for the digital content file to the record for the digital content file in the record chain;

receiving, by the data owner of the digital content file, the transmitted message digest;

retrieving, over the network, a copy of at least a portion of the blockchain, the portion of the blockchain comprising the closed block in which the record for the digital content file is included;

comparing the transmitted message digest with the message digest within the record for the digital content file within the closed block that is used for chaining the record subsequent to the record for the digital content file to the record for the digital content file;

responsive to a mismatch between the transmitted message digest with the message digest within the record for the digital content file within the closed block that is used for chaining the record subsequent to the record for the digital content file to the record for the digital content file, generating an alert for the entity that generates the blockchain and/or an entity that generates the record chain;

chaining the received plurality of records comprises chaining the received plurality of records according to the sequence of receiving;

chaining records comprises inserting a message digest for an earlier record into a subsequent record;

appending the plurality of records into the currently open block comprises appending the record chain into the currently open block;

the record chain provides a first chaining tier and chaining the multiple blocks provides a second chaining tier;

appending the plurality of records into the currently open block comprises appending the record chain into the currently open block;

inserting the message digest for the earlier block into the subsequent block comprises: generating a record for the earlier block, the record for the earlier block including the message digest for the earlier block and inserting the record for the earlier block into the subsequent block;

inserting the record for the earlier block into the record chain, so that the record for the earlier block further includes a message digest of a final record of the record chain within the earlier block;

the record for the earlier block includes a digital signature of the earlier block by an entity that generates the blockchain;

at least one record of the plurality of records further comprises a digital content timestamp indicating a time for the digital content file;

at least one record of the plurality of records further comprises a record timestamp indicating a time for the record for the digital content file;

the digital content timestamp is included within a digital signature by the data owner;

the record timestamp is included within a digital signature by the data owner;

the record timestamp indicates a time of the receiving of the record;

the reference to the first other record comprises a blockchain address of a record for the first prior-version digital content file;

the blockchain address comprises an index of the record for the prior-version digital content file within a block in which the record for the prior-version digital content file appears;

at least one record of the plurality of records further comprises: a second linking field indicating, by its position within the record for the digital content file that, when the first linking field references the first other record and the second linking field references a second other record, the digital content file comprises a merge of the first prior-version digital content file and a second first prior-version digital content file, wherein the second other record comprises a record for the second prior-version digital content file;

at least one record of the plurality of records further comprises: a certification linking field indicating, by its position within the record for the digital content file that, when the certification linking field references another record, the digital content file comprises at least one file selected from the list consisting of: a certification for another digital content file, a revocation of certification for another digital content file, and content for which another digital content file provides certification, wherein the reference to the other record comprises a blockchain address of a record for the first prior-version digital content file;

searching, within blocks of the blockchain that are subsequent to the closed block in which the record for the digital content file appears, for references to the record for the digital content file; responsive to identifying a reference to the record for the digital content file in a referencing record, determining whether determining whether the referencing record comprises a record for a later version of the digital content file;

responsive to determining that the referencing record comprises the record for the later version of the digital content file, iteratively searching the blockchain for further later versions of the digital content file;

retrieving, over a network, by a data consumer, a copy of at least a portion of the blockchain;

retrieving, from the blockchain, the first other record;

searching, within the first other record for a linking field reference to an earlier prior-version record;

iteratively searching the blockchain for prior version records to establish a pedigree of the digital content file;

the subsequent record is the immediately subsequent record;

the subsequent block is the immediately subsequent block;

the message digest comprises at least a portion of a first SHA function message digest;

the message digest comprises at least a portion of a first message digest from a first hash function and at least a portion of a second message digest from a second hash function;

the message digest comprises a first message digest for a concatenation of the digital content file with a second message digest for the digital content; and the message digest comprises a portion, less than the entirety, of a message digest from a hash function.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A method of establishing integrity of digital content, the method comprising:
   during a block accumulation period, receiving a plurality of records, each record of the plurality of records respectively comprising a record for a digital content file and including an integrity verification code (IVC) for the digital content file;
   appending the plurality of records into a currently open block of a blockchain;
   at an end of the block accumulation period, closing the currently open block to additional records, rendering the currently open block into a closed block;
   opening a new current block into which a future plurality of records may be appended;
   chaining the closed block to the blockchain, wherein chaining the closed block to the blockchain comprises inserting an IVC for an earlier block of the blockchain into the closed block;
   iteratively opening, appending, and chaining multiple blocks across multiple block accumulation periods to generate the blockchain, wherein the blockchain does not contain content from the digital content files, and wherein each record of the plurality of records further comprises a digital signature of the digital content file by a data owner of the digital content file or a digital signature of the digital content file by an entity that generates the blockchain; and
   submitting the IVC for the closed block to a printed publication, wherein publication of the IVC for the closed block in the printed publication comprises an out-of-band date proof for the closed block.

2. The method of claim 1 wherein each record of the plurality of records comprises the digital signature of the digital content file by the data owner of the digital content file and the digital signature of the digital content file by the entity that generates the blockchain.

3. The method of claim 1 further comprising:
   storing the digital content files as stored digital content files.

4. The method of claim 3 further comprising:
   retrieving, over a network, by a data consumer, at least one stored digital content file;
   generating an IVC for the retrieved digital content file;
   retrieving, over the network, a copy of at least a portion of the blockchain, the portion of the blockchain comprising the closed block in which the record for the retrieved digital content file is included;
   comparing the generated IVC for the retrieved digital content file with the IVC for the retrieved digital content file within the record for the retrieved digital content file within the retrieved closed block; and
   responsive to a match between the generated IVC for the retrieved digital content file and the IVC for the retrieved digital content file within the record for the retrieved digital content file within the retrieved closed block, inserting digital content from the retrieved digital content file into a product.

5. The method of claim 4 further comprising:
   generating an IVC for the retrieved closed block;
   retrieving an out-of-band date proof comprising an IVC for the retrieved closed block;
   comparing the generated IVC for the retrieved closed block with the IVC from the out-of-band date proof; and
   wherein inserting digital content from the retrieved digital content file into a product comprises:
   responsive to both a match between the generated IVC for the retrieved digital content file and the IVC for the retrieved digital content file within the record for the retrieved digital content file within the retrieved closed block, and a match between the generated IVC for the retrieved closed block and the IVC for the retrieved closed block within the out-of-band date proof, inserting digital content from the digital content file into a product.

6. The method of claim 1 wherein receiving the plurality of records by the entity that generates the blockchain comprises receiving the plurality of records over a network;
   wherein the blockchain is a permissioned blockchain; and
   wherein the entity that generates the blockchain is a permissioning entity for the blockchain.

7. The method of claim 1 wherein at least one record of the plurality of records further comprises:
   a digital content timestamp indicating a time for the digital content file; or
   a record timestamp indicating a time for the record for the digital content file.

8. The method of claim 1 wherein at least one record of the plurality of records further comprises a digital signature of the digital content file by a certification entity, indicating that the digital content file has been examined for trustworthiness.

9. The method of claim 1 wherein:
   a digital content timestamp is included within a digital signature by the data owner; or
   a digital content timestamp is included within a digital signature by the certification entity; or
   a record timestamp is included within a digital signature by the entity that generates the blockchain.

10. The method of claim 1 further comprising:
    chaining the plurality of records using IVCs according to a sequence of receiving each record of the plurality of records, to produce a record chain, wherein chaining records comprises inserting an IVC for an earlier record into a subsequent record, wherein appending the plurality of records into the currently open block comprises appending the record chain into the currently open block, and wherein the record chain provides a first chaining tier and chaining the multiple blocks provides a second chaining tier.

11. The method of claim 10 further comprising:
    verifying that the record chain has not been altered by iteratively:
       generating new IVCs for records within the record chain; and
       comparing the new IVCs with IVCs in subsequent records that are used for chaining records in the record chain; and
    wherein chaining the closed block to the blockchain comprises:
       responsive to the new IVCs matching the IVCs in subsequent records, chaining the closed block to the blockchain.

12. The method of claim 10 further comprising:
    transmitting, over a network, to a data owner of a digital content file for which a record of the plurality of records has been received, an IVC of the record that is used for chaining the record to a subsequent record in the record chain.

13. The method of claim 12 further comprising:
receiving, by the data owner of the digital content file, the transmitted IVC;
retrieving, over the network, a copy of at least a portion of the blockchain, the portion of the blockchain comprising the closed block in which the record for the digital content file is included;
comparing the transmitted IVC with the IVC within the record for the digital content file within the closed block that is used for chaining the record to the subsequent record in the record chain; and
responsive to a mismatch between the transmitted IVC with the IVC within the record for the digital content file within the closed block that is used for chaining the record to the subsequent record in the record chain, generating an alert.

14. The method of claim 1 wherein the IVCs each comprises at least a portion of a first secure hash algorithm (SHA) function message digest.

15. The method of claim 1 wherein the IVCs each comprises at least a portion of a first message digest from a first hash function and at least a portion of a second message digest from a second hash function.

16. The method of claim 1 wherein the IVCs each comprises a first IVC for a concatenation of the digital content file with a second IVC for the digital content.

17. The method of claim 1 wherein the IVCs each comprises a portion, less than the entirety, of a message digest from a hash function.

18. The method of claim 1 wherein the earlier block of the blockchain is the immediately prior block of the blockchain.

19. A system for establishing integrity of digital content, the system comprising:
a processor; and
a computer-readable medium storing instructions that are operative upon execution by the processor to:
during a block accumulation period, receive a plurality of records, each record of the plurality of records respectively comprising a record for a digital content file and including an integrity verification code (IVC) for the digital content file;
append the plurality of records into a currently open block of a blockchain;
at an end of the block accumulation period, close the currently open block to additional records, rendering the currently open block into a closed block;
open a new current block into which a future plurality of records may be appended;
chain the closed block to the blockchain, wherein chaining the closed block to the blockchain comprises inserting an IVC for an earlier block of the blockchain into the closed block;
iteratively open, append, and chain multiple blocks across multiple block accumulation periods to generate the blockchain, wherein the blockchain does not contain content from the digital content files, and wherein each record of the plurality of records further comprises a digital signature of the digital content file by a data owner of the digital content file or a digital signature of the digital content file by an entity that generates the blockchain; and
submit the IVC for the closed block to a printed publication, wherein publication of the IVC for the closed block in the printed publication comprises an out-of-band date proof for the closed block.

20. The system of claim 19 wherein each record of the plurality of records comprises the digital signature of the digital content file by the data owner of the digital content file and the digital signature of the digital content file by the entity that generates the blockchain.

* * * * *